US012804363B2

(12) United States Patent
Audet et al.

(10) Patent No.: US 12,804,363 B2
(45) Date of Patent: Nov. 17, 2026

(54) WIRELESS INTERFACING SYSTEM AND ASSOCIATED METHOD

(71) Applicant: GPHY INC., Quebec (CA)

(72) Inventors: Hubert Audet, Quebec (CA); Anthony Blais, Quebec (CA); Pier-Etienne Lehoux, Montmagny (CA); Myrik Hervieux-Gaudreau, Saint-Raymond (CA)

(73) Assignee: GPHY INC., Quebec (CA)

( * ) Notice: Subject to any disclaimer, the term of this patent is extended or adjusted under 35 U.S.C. 154(b) by 300 days.

(21) Appl. No.: 18/715,291

(22) PCT Filed: Dec. 2, 2022

(86) PCT No.: PCT/CA2022/051766
§ 371 (c)(1),
(2) Date: May 31, 2024

(87) PCT Pub. No.: WO2023/097401
PCT Pub. Date: Jun. 8, 2023

(65) Prior Publication Data

US 2025/0048064 A1 Feb. 6, 2025

Related U.S. Application Data

(60) Provisional application No. 63/264,872, filed on Dec. 3, 2021.

(51) Int. Cl.
*H04W 4/33* (2018.01)
*H02J 50/00* (2016.01)

(52) U.S. Cl.
CPC ............... *H04W 4/33* (2018.02); *H02J 50/00* (2016.02)

(58) Field of Classification Search
CPC .......... H02J 50/00; H04W 4/029; H04W 4/33
(Continued)

(56) References Cited

U.S. PATENT DOCUMENTS 9,380,417 B1 * 6/2016 Boyle .................. H04W 4/023
9,622,208 B2 4/2017 Mycek
(Continued)

OTHER PUBLICATIONS

International Search Report from patent PCT/CA2022/051766. 3 pages. Feb. 27, 2023.
(Continued)

*Primary Examiner* — Robert J Lopata
(74) *Attorney, Agent, or Firm* — FisherBroyles, LLP; Craig W. Mueller

(57) ABSTRACT

Systems and methods for wirelessly locating users in a venue via their respective portable device are taught. Wireless transmitter devices positioned at different locations in the venue are used. Each transmitter device transmits an identifier to the portable device. Some transmitter devices can be part of a wireless-power transmitter that is additionally capable of charging portable devices. A software on the portable device is able to determine the closest transmitter device and, by finding its identifier in a database, its location within the venue. Once the portable device is aware of its location, it can be used to control nearby external devices. Through information stored in the database, the software is also able to display the location of other users and usage statistics of the venue. Different methods of ensuring that portable devices are paired with the closest transmitter device are taught.

40 Claims, 22 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 9,949,085 | B2 | 4/2018 | Freeman-Baer | |
| 10,194,278 | B1 * | 1/2019 | Kusens | G01S 1/08 |
| 10,757,672 | B1 * | 8/2020 | Knas | H04W 40/244 |
| 11,715,563 | B1 * | 8/2023 | Fox | G06Q 40/08<br>705/2 |
| 2016/0259027 | A1 * | 9/2016 | Said | H04W 4/029 |
| 2016/0309303 | A1 * | 10/2016 | Svenér | G01S 5/0258 |
| 2017/0055113 | A1 * | 2/2017 | Kusens | G01S 1/042 |
| 2017/0055118 | A1 * | 2/2017 | Ciecko | H04W 4/21 |
| 2017/0230883 | A1 * | 8/2017 | Dang | H04W 36/04 |
| 2017/0356744 | A1 * | 12/2017 | Klipp | G01C 21/1654 |
| 2018/0018473 | A1 * | 1/2018 | Knibbe | G06F 21/6218 |
| 2019/0234743 | A1 * | 8/2019 | Roy | H04W 4/20 |
| 2020/0386848 | A1 * | 12/2020 | Wirola | G01S 5/02523 |
| 2022/0086605 | A1 * | 3/2022 | Muller | G01S 1/024 |
| 2023/0140805 | A1 * | 5/2023 | Chari | H04W 40/12<br>370/329 |

OTHER PUBLICATIONS

Written Opinion from patent PCT/CA2022/051766. 4 pages. Feb. 27, 2023.

* cited by examiner

WIRELESS INTERFACING SYSTEM AND ASSOCIATED METHOD

This application is a national stage application under 35 U.S.C. 371 and claims the benefit of PCT Application No. PCT/CA2022/051766, having an international filing date of Dec. 2, 2022, which designated the United States, and which claims the benefit of U.S. Provisional Patent Application No. 63/264,872, filed Dec. 3, 2021, the disclosure of each of which are incorporated by reference herein.

TECHNICAL FIELD

The present invention generally relates to methods and systems adapted to precisely locate individuals in a venue. The users are locatable via pairing of their portable devices with wireless transmitter devices, which may be provided with wireless charging capacities. Data related to occupancy of the venue and user habits may also be provided.

BACKGROUND

Charging of portable devices generally comprises having a power cable connecting the portable devices to a power source. Other methods also include wireless inductive charging, wherein a portable device generally must be laid on a charging device in order to initiate charging. The portable device must generally be equipped with integrated circuitry allowing it to be charged wirelessly.

Wireless chargers can be installed in various venues such as restaurants, coffee shop, offices, schools, food courts, and many others. Thus, customers or employees are provided with wireless charging services to enhance their experience. Owners or managers of establishments may ask for additional functionalities to justify the investment of adding multiple wireless chargers to their establishment. Certain such functionalities are also relevant in venues that host persons using portable devices even when wireless charging capabilities are not available.

For example, there may be a need for owners or managers of the establishments to acquire data on the usage of their spaces and furniture. Furthermore, owners or managers may want to use data to predict or monitor attendance and control various systems based on this localization or occupancy information. There is also a need to localize users at their current working stations in offices and/or working environment to address some challenges related to unassigned or shared desks. These challenges include reservation of places, such as working stations or offices, and localization of colleagues in large working environments. There may also be a need for the users to adjust electrical standing desk to a preferred height, for example, or other preferences such as local temperature, ventilation, and lighting, that can become cumbersome upon arriving at a working station or when switching working stations.

Consequently, there is a need for a system and a method that can address at least some of the above-mentioned needs.

SUMMARY

According to an aspect, a wireless powering and interfacing station is provided, for wirelessly charging or powering a portable device and communicating therewith. The station comprises a wireless-power transmitter, which includes a wireless power transmission module and a wireless communication module. The wireless power transmission module is for generating an alternating field to transfer power to a power receiving module, so as to wirelessly power or charge the portable device when located within a charging zone of the wireless power transmitter. The power receiving module is either distinct or integrated within the portable device.

The wireless communication module is for sending identification-related information allowing the portable device to establish a wireless communication with one or more external devices. The one or more external devices are external from both the wireless power transmitter and the portable processing device.

In possible embodiments, the wireless power transmission module comprises a power antenna to generate the alternating field, the alternating field being a magnetic oscillating field.

In possible embodiments, the wireless power transmission module comprises a power conversion module including a power input for receiving an input power signal from a power source, and power-conditioning circuitry to regulate, condition and/or amplify the input power signal into a converted power signal prior to being directed to the power antenna.

In possible embodiments, the wireless communication module comprises an emitting communication antenna, distinct from the power antenna, adapted to send standard wireless signals such as Wi-Fi, Bluetooth, Bluetooth Low Energy (BLE) and the likes.

In possible embodiments, the wireless-power transmitter comprises a controller for controlling the operating functions of the wireless power transmission module and/or of the wireless communication module.

In possible embodiments, the controller comprises or has access to storage means for storing the identification-related information, the identification-related information comprising at least one of a wireless station identification or an external device identification.

In possible embodiments, the wireless power transmission module and the wireless communication module form a single module, the power antenna being adapted to send the identification-related information through signal modulation.

According to another aspect, a wireless powering and interfacing system is provided. The system comprises the wireless-power transmitter, described above, and a wireless-power receiver. The wireless-power transmitter comprises a power connector connectable to a power source, for receiving an input power signal from the power source; an input power conversion module comprising power-conditioning circuitry for converting the input power signal into a converted power signal; a power-transmitting antenna configured for wirelessly emitting the converted power signal; transmitter communication means for sending identification-related information allowing the portable device to establish a wireless communication with one or more devices; and a transmitter-controller for controlling the input power conversion module and/or the communication means. The wireless-power receiver comprises corresponding modules, including a power-receiving antenna, for wirelessly receiving the converted power signal; an output power conversion module, comprising power-conditioning circuitry for converting the converted power signal into a device-compatible power signal, for charging or powering the portable device; a receiver communication module for receiving the identification-related information from the transmitter communication means; and a receiver-controller for controlling the output conversion module and/or the receiver communication module, the receiver-controller being further configured to communicate the identification-related information to the portable device, enabling the wireless communication of the portable device with the one or more external devices.

In possible implementations, a software application module runs on, or is executable from, the portable device, for managing communications between the wireless-power receiver, the portable device, the database and/or the external devices. The communications may include requesting, modifying, updating, and creating data entries of the database, and connections between the portable device and the external devices.

In possible implementations, the system is configured to automatically attempt connecting the portable device to one or more of the external devices associated to the identification-related information received from the wireless-power transmitter and send control signals to it.

In possible implementations, the software application module comprises a user interface allowing users to create or update user preferences, manually update the database, manually connect the portable device to one or more of the external device(s), confirm a connection between the portable device and an external device, and disconnect the external device from the portable device.

According to yet another aspect, a method for wirelessly transferring power to a portable device and for communicating therewith is provided. The method comprises wirelessly pairing a wireless-power transmitter with a wireless-power receiver, the wireless-power receiver being built-in or connectable to the portable device, and wirelessly transferring power from the wireless-power transmitter to the wireless-power receiver, for charging the portable device, wirelessly sending identification-related information allowing the portable device to establish a wireless communication with one or more external devices.

In a possible implementation of the method, the portable device is configured to automatically attempt connecting to one or more of the external devices associated with the identification-related information received from the wireless-power transmitter, for example to cast digital information from the portable device to a wireless monitor.

In yet another embodiment, a wireless powering and interfacing system for wirelessly transferring power to a portable device and localizing said portable device is provided, the system comprising: a wireless-power transmitter comprising: a wireless power transmission module having a power-transmitting antenna configured for wirelessly emitting a power signal; a transmitter communication module for wirelessly exchanging identification-related information allowing the portable device to establish a wireless connection with one or more external devices associated with the wireless-power transmitter; and a transmitter-controller for controlling at least one of the wireless power transmission module and the transmitter communication module. The system also comprises a wireless-power receiver comprising: a wireless power receiving module having a power-receiving antenna for receiving the power signal emitted from the wireless power transmission module and transferring the power from the power signal to the portable device; a receiver communication module for receiving the identification-related information from the transmitter communication module; and a receiver-controller for controlling at least one of the wireless power receiving module and the receiver communication module, the receiver-controller being further configured to communicate the identification-related information to the portable device. The system further comprises a database storing additional information being indicative of the one or more external devices associated with the wireless-power transmitter and of a physical location of the wireless-power transmitter; and a software application module in communication with the database and the portable device and configured to establish the wireless connection with the one or more external devices using the additional information associated with the identification-related information retrieved in the database; and create or update an entry in the database indicative of a connection between the portable device and the wireless-power transmitter, the entry allowing to physically locate the portable device.

According to a further aspect, a system for wirelessly locating a plurality of users in a venue via their respective portable device is provided. The system comprises: a plurality of wireless transmitter devices positioned at different locations in the venue, each configured to transmit at least a corresponding identifier; a database accessible by each of the portable devices; and a software application module, each portable device being configured to execute the software application module, the software application comprising: a login submodule configured to identity the user using the portable device, a transmitter detection submodule configured to detect nearby wireless transmitter devices by the portable device, a transmitter selection submodule configured to select a closest wireless transmitter device among the nearby wireless transmitter devices, a registration submodule configured to store at least one of the identifier corresponding to the closest wireless transmitter device and an arrival timestamp in the database, and a graphical user interface configured to display respective positions within the venue of at least some of the users, a given user being locatable based on the closest wireless transmitter device selected by the portable device of the given user.

In some embodiment, the system comprises at least one external device associated with a corresponding wireless transmitter device, the software application module comprising an external device control submodule configured to control each external device associated with the closest wireless transmitter device.

In some embodiment, the system comprises at least one gateway configured to receive instructions for an external device from the external device control submodule, to translate the instructions to a wireless communication protocol supported by the external device, and to transmit the translated instructions to the external device.

In some embodiment, the gateways are configured to allow for mesh communication.

In some embodiment, the database is configured to store user preferences associated with the user, the external device control submodule being further configured, in response to the closest wireless transmitter device being selected, to adjust settings of each external device associated with the closest wireless transmitter device according to the user preferences.

In some embodiment, wherein the at least one external device comprises at least one of: a light; an adjustable desk; and an air-temperature unit, and wherein the settings comprise at least one of: a light intensity, a light colour, a desk height and a temperature.

In some embodiment, the wireless transmitter devices are configured to broadcast their corresponding identifiers at a set frequency; the transmitter detection submodule is configured to detect identifiers broadcast by the nearby wireless transmitter devices and measure a signal strength associated with each broadcast during at least one time period; and the transmitter selection submodule is configured to compute an indication of the strongest signal received from the nearby wireless transmitter devices for each time period and, in response to one of the nearby wireless transmitter devices having the strongest average signal over at least one of the time periods, to select said one nearby wireless transmitter as the closest wireless transmitter device.

In some embodiment, the transmitter selection submodule is configured to select one of the nearby wireless transmitter devices having the strongest average signal over at least a configurable proportion of the time periods.

In some embodiment, the transmitter selection submodule is configured to avoid selecting the nearby wireless transmitter devices having the signal strength below a minimal configurable strength threshold.

In some embodiment, the signal strength associated with each broadcast corresponds to a received signal strength indicator (RSSI).

In some embodiment, the transmitter detection submodule is configured to determine, from the set frequency and the detected broadcasts, a number of broadcasts that were undetected and, in response to the number of undetected broadcasts being above a configurable threshold, to increase a duration of each time period.

In some embodiment, the transmitter detection submodule is configured to continuously detect the nearby wireless transmitter devices and wherein, in response to a new transmitter device being the closest, the transmitter selection submodule is configured to select the new closest wireless transmitter device and the registration submodule is configured to store at least one of the identifier corresponding to the new closest wireless transmitter device and a new arrival timestamp in the database.

In some embodiment, the transmitter detection submodule is configured to detect an absence of nearby wireless transmitter devices and the registration submodule is further configured to store at least one an indication that the user has left the venue in the database and a departing timestamp.

In some embodiment, the database is an organizational database, wherein the registration submodule is configured to transmit at least the identifier corresponding to the closest wireless transmitter device and at least one of an identifier corresponding to the portable device and an identifier corresponding to the user to the organizational database, and the database is configured to store at least one of the transmitted identifiers and the arrival timestamp.

In some embodiment, the registration submodule is configured to transmit a keepalive message to the organizational database on a regular basis and the organizational database is configured, in response to a configurable number of keepalive messages being missed, to store at least one of an indication that the user has closed the portable device and a closing timestamp.

In some embodiment, the software application module comprises a centralized control module configured to perform at least one function selected from the group consisting of: processing a reservation of one of the locations within the venue; displaying usage statistics about the venue; displaying usage statistics about one of the users; displaying usage statistics about a group of the users; displaying usage statistics about one of the portable devices; displaying usage statistics about a group of the portable devices; and displaying a location within the venue of a plurality of users in real-time.

In some embodiment, at least one of the usage statistics is computed from identifiers and timestamps stored in the database with respect to a specifiable time interval, and wherein the usage statistics about the venue comprise an occupancy rate of a plurality of venue locations and the usage statistics about at least the one of the users, the group of users, the one of the portable devices and the group of portable devices comprise at least one of an indication of time spent at the venue, a minimal arrival time, a maximal arrival time, a minimal departure time, a maximal departure time, an indication of time spent in meeting rooms, an indication of a preferred location within the venue, an indication of a preferred type of desk, and an indication of a preferred type of room.

In some embodiment, the system comprises a plurality of wireless interfacing devices, each wireless interfacing device comprising: one of the wireless transmitter devices; and a wireless power transmission module having a power-transmitting antenna configured for wirelessly emitting a power signal; wherein at least some of the portable devices are each operably coupled with a wireless power receiving module having a power-receiving antenna for: detecting the power signals, the wireless power receiving module implementing the transmitter detection submodule, and initiating communication between the receiving module and the wireless interfacing device; receiving the power signal emitted from the wireless power transmission module to power the portable device.

In some embodiment, a given one of the wireless interfacing devices is configured to pair with any one of the portable devices, wherein: the wireless power transmission module of the wireless interfacing device is configured to send one or more power beacons; the wireless power receiving module coupled to the portable device is configured to broadcast advertisement signals in response to said one or more power beacons to pair the portable device with the wireless interfacing device; the wireless transmitter device of the wireless interfacing device is configured to transmit the corresponding identifier to the coupled portable device in response to a validation of the pairing; and the transmitter selection submodule is configured to select the wireless interfacing device as the closest wireless transmitter in response to the coupled portable device receiving the identifier.

In some embodiment, at least one of the wireless interfacing devices and the transmitter selection submodule is configured to measure at least one time difference between: a moment when one of the wireless interfacing devices detects at least one event; and a moment when a corresponding portable device detects the at least one event, the pairing between the wireless interfacing devices and the corresponding portable device being validated in response to at least one condition being verified, the condition being selected from the group consisting of: a first configurable proportion of the time differences are below a threshold; a second configurable proportion of the time differences with respect to the one of the wireless interfacing devices are lower than the corresponding time difference with respect to other wireless interfacing devices.

In some embodiment, the at least one event comprise the wireless interfacing device transferring power to power the wireless power receiving module.

In some embodiment, the at least one event comprise the wireless interfacing device transferring power to power the portable device.

In some embodiment, the at least one event comprise the wireless interfacing device and the portable device exchanging timing information.

In some embodiment, at least one of the plurality of the wireless interfacing devices and the portable device is configured to measure at least one of a time difference between one of the power beacons and one of the advertisement signals, a time difference between a power increase of the wireless power transfer compatible with charging the portable device and the power transfer to the portable device, and a signal strength of a signal received from the other device; each of the wireless interfacing devices is configured to transmit, by the wireless transmitter device, the at least one time difference and the signal strength to at least one of the portable device and each of the other wireless interfacing devices; at least one of each of the wireless interfacing devices and the portable device is configured to receive, from the wireless transmitter device, the at least one time difference and the signal strength from each of the other wireless interfacing devices; at least one of the transmitter selection submodule of the portable device and one or more of the wireless interfacing devices is configured to compute a location of the wireless power receiving module within the venue by triangulation and to determine a closest wireless interfacing device; and a pairing between the portable device and the closest wireless interfacing device is validated and pairings between the portable device and each of the other wireless interfacing devices are invalidated.

In some embodiment, the pairing is validated in response to an impedance change being measured at the power-transmitting antenna.

In some embodiment, the pairing is validated in response to a match of at least one of a signal strength of the advertisement signals, a power sent by a communication module of the wireless power receiving module, and a gain of the power-receiving antenna.

In some embodiment, the pairing is validated in response to the signal strength of the advertisement signals received by the wireless interfacing device being at least one of below an advertisement signal strength threshold and stronger than a signal strength of the advertisement signals received by the other wireless interfacing devices.

In some embodiment, the signal strength of the advertisement signals corresponds to a received signal strength indicator (RSSI).

In some embodiment, the wireless power transmission module is configured to vary a power parameter and the wireless power receiving module is configured to detect the variation, wherein the validated pairing is confirmed in response to the variation being detected by the power receiving module.

In some embodiment, the power parameter is one of voltage and current.

In some embodiment, the validated pairing is confirmed in response to a power efficiency measure of the power transfer is within a configurable range.

In some embodiment, the power efficiency measure is a proportion that power transferred by the wireless power transmission module is of power received by the wireless power receiving module.

According to yet a further aspect, a method for wirelessly locating a plurality of users in a venue via their respective portable device is provided. The method comprises: transmitting, by each of a plurality of wireless transmitter devices positioned at different locations in the venue, a corresponding identifier; identifying, by each portable device, the user using the portable device; detecting, by each portable device, nearby wireless transmitter devices; selecting, by each portable device, a closest wireless transmitter device among the nearby wireless transmitter devices; and storing at least one of the identifier corresponding to the closest wireless transmitter device selected by each portable device and an arrival timestamp in a database; and displaying, in a graphical user interface, respective positions within the venue of at least some of the users, based on the closest wireless transmitter device selected by the portable device of the given user.

In some embodiment, the method comprises controlling by each portable device at least one external device associated with the closest wireless transmitter device.

In some embodiment, the method comprises sending by a portable device instructions for an external device to at least one gateway, translating by one of the gateways the instructions to a wireless communication protocol supported by the external device, and transmitting by the at least one gateway the translated instructions to the external device.

In some embodiment, the gateways are configured to allow for mesh communication.

In some embodiment, the database is configured to store user preferences associated with the user, comprising for each portable device, in response to the closest wireless transmitter device being selected, adjusting settings of each external device associated with the closest wireless transmitter device according to the user preferences.

In some embodiment, the at least one external device comprises at least one of: a light; an adjustable desk; and an air-temperature unit, and wherein the settings comprise at least one of: a light intensity, a light colour, a desk height and a temperature.

In some embodiment, the method comprises broadcasting, by each wireless transmitter device, the corresponding identifier at a set frequency; detecting, by one of the portable devices, identifiers broadcast by the nearby wireless transmitter devices and measuring a signal strength associated with each broadcast during at least one time period; and computing, by each portable device, an indication of the strongest signal received from the nearby wireless transmitter devices for each time period and, in response to one of the nearby wireless transmitter devices having the strongest average signal over at least one of the time periods, selecting said one nearby wireless transmitter as the closest wireless transmitter device.

In some embodiment, selecting the closest wireless transmitter device comprises selecting the one of the nearby wireless transmitter devices having the strongest average signal over at least a configurable proportion of the time periods.

In some embodiment, the method comprises avoiding selecting the nearby wireless transmitter devices having the signal strength below a minimal configurable strength threshold.

In some embodiment, the signal strength associated with each broadcast corresponds to a received signal strength indicator (RSSI).

In some embodiment, the method comprises determining, by one of the portable devices, from the set frequency and the detected broadcasts, a number of broadcasts that were undetected and, in response to the number of undetected broadcasts being above a configurable threshold, increasing a duration of each time period.

In some embodiment, the method comprises continuously detecting the nearby wireless transmitter devices and, in response to a new transmitter device being the closest, storing at least one of the identifier corresponding to the new closest wireless transmitter device and a new arrival timestamp in the database.

In some embodiment, the method comprises detecting an absence of nearby wireless transmitter devices and storing at least one an indication that the user has left the venue in the database and a departing timestamp.

In some embodiment, the database is an organizational database, comprising transmitting by one of the portable devices at least the identifier corresponding to the closest wireless transmitter device and at least one of an identifier corresponding to the portable device and an identifier corresponding to the user to the organizational database, and storing by the database at least one of the transmitted identifiers and the arrival timestamp.

In some embodiment, the method comprises transmitting by each of the portable devices a keepalive message to the database on a regular basis and, in response to a configurable number of keepalive messages being missed, storing by the database at least one of an indication that the user has closed the portable device and a closing timestamp.

In some embodiment, the method comprises performing at least one function selected from the group consisting of: processing a reservation of one of the locations within the venue; displaying usage statistics about the venue; displaying usage statistics about one of the users; displaying usage statistics about a group of the users; displaying usage statistics about one of the portable devices; displaying usage statistics about a group of the portable devices; and displaying a location within the venue of a plurality of users in real-time.

In some embodiment, at least one of the usage statistics is computed from identifiers and timestamps stored in the database with respect to a specifiable time interval, and wherein the usage statistics about the venue comprise an occupancy rate of a plurality of venue locations and the usage statistics about at least the one of the users, the group of users, the one of the portable devices and the group of portable devices comprise at least one of an indication of time spent at the venue, a minimal arrival time, a maximal arrival time, a minimal departure time, a maximal departure time, an indication of time spent in meeting rooms, an indication of a preferred location within the venue, an indication of a preferred type of desk, and an indication of a preferred type of room.

In some embodiment, the method comprises a plurality of wireless interfacing devices, each wireless interfacing device comprising: wirelessly emitting a power signal, by a power-transmitting antenna of a plurality of wireless interfacing devices, wherein each wireless interfacing device comprises one of the wireless transmitter devices; detecting the power signal, by a power-receiving antenna of a wireless power receiving module operably coupled to each of at least some of the portable devices; and transferring the power from the power signal to the portable device to power the portable device.

In some embodiment, the method comprises pairing, by each of at least some of the wireless interfacing devices, with one of the portable devices, the pairing comprising: sending, by the power-transmitting antenna of the wireless interfacing device, one or more power beacons; broadcasting, by the wireless power receiving module, advertisement signals in response to said one or more power beacons to pair the wireless interfacing device with the portable device coupled with the wireless power receiving module; transmitting, by the wireless interfacing device, the corresponding identifier to the coupled portable device in response to a validation of the pairing; and selecting, by the portable device, the wireless interfacing device as the closest wireless transmitter in response to the coupled portable device receiving the identifier.

In some embodiment, the method comprises measuring, by at least one of the wireless interfacing devices and the transmitter selection submodule, at least one time difference between: a moment when one of the wireless interfacing devices detects at least one event; and a moment when a corresponding portable device detects the at least one event, the pairing between the wireless interfacing devices and the corresponding portable device being validated in response to at least one condition being verified, the condition being selected from the group consisting of: a first configurable proportion of the time differences are below a threshold; a second configurable proportion of the time differences with respect to the one of the wireless interfacing devices are lower than the corresponding time difference with respect to other wireless interfacing devices.

In some embodiment, the at least one event comprise the wireless interfacing device transferring power to power the wireless power receiving module.

In some embodiment, the at least one event comprise the wireless interfacing device transferring power to power the portable device.

In some embodiment, the at least one event comprise the wireless interfacing device and the portable device exchanging timing information.

In some embodiment, the method comprises measuring, by at least one of the plurality of the wireless interfacing devices and the portable device, at least one of a time difference between one of the power beacons and one of the advertisement signals, a time difference between a power increase of the wireless power transfer compatible with charging the portable device and the power transfer to the portable device, and a signal strength of a signal received from the other device; transmitting, by the wireless transmitter device of each of the wireless interfacing devices, the at least one time difference and the signal strength to at least one of the portable device and each of the other wireless interfacing devices; receiving, at least one of each of the wireless interfacing devices and the portable device, from the wireless transmitter device, the at least one time difference and the signal strength from each of the other wireless interfacing devices; computing, by at least one of the transmitter selection submodule of the portable device and one or more of the wireless interfacing devices, a location of the wireless power receiving module within the venue by triangulation and to determine a closest wireless interfacing device; and validating a pairing between the portable device and the closest wireless interfacing device and invalidating pairings between the portable device and each of the other wireless interfacing devices.

In some embodiment, the method comprises validating the pairing in response to an impedance change being measures at the power-transmitting antenna.

In some embodiment, the method comprises validating the pairing in response to a match of at least one of a signal strength of the advertisement signals, a power sent by a communication module of the wireless power receiving module, and a gain of the power-receiving antenna.

In some embodiment, the method comprises validating the pairing in response to the signal strength of the advertisement signals received by the wireless interfacing device being at least one of below an advertisement signal strength threshold and stronger than a signal strength of the advertisement signals received by the other wireless interfacing devices.

In some embodiment, the signal strength of the advertisement signals corresponds to a received signal strength indicator (RSSI).

In some embodiment, the method comprises varying a power parameter by the wireless power transmission module, detecting the variation by the wireless power receiving module, and confirming the validated pairing in response to the variation being detected by the power receiving module.

In some embodiment, the power parameter is one of voltage and current.

In some embodiment, the method comprises confirming the validated pairing in response to a power efficiency measure of the power transfer being within a configurable range.

In some embodiment, the power efficiency measure is a proportion that power transferred by the wireless power transmission module is of power received by the wireless power receiving module.

As can be appreciated, different embodiments of the invention provide at least one of the following capabilities: precise location of users in a venue/environment; collection of data related to the occupancy of the venue or related to the habits of the users (time of occupancy, preferences of the users, and the likes); possibility to wirelessly charge portable devices. Other features and advantages of the embodiments of the present invention will be better understood upon reading of preferred embodiments thereof with reference to the appended drawings.

Figure 1A:
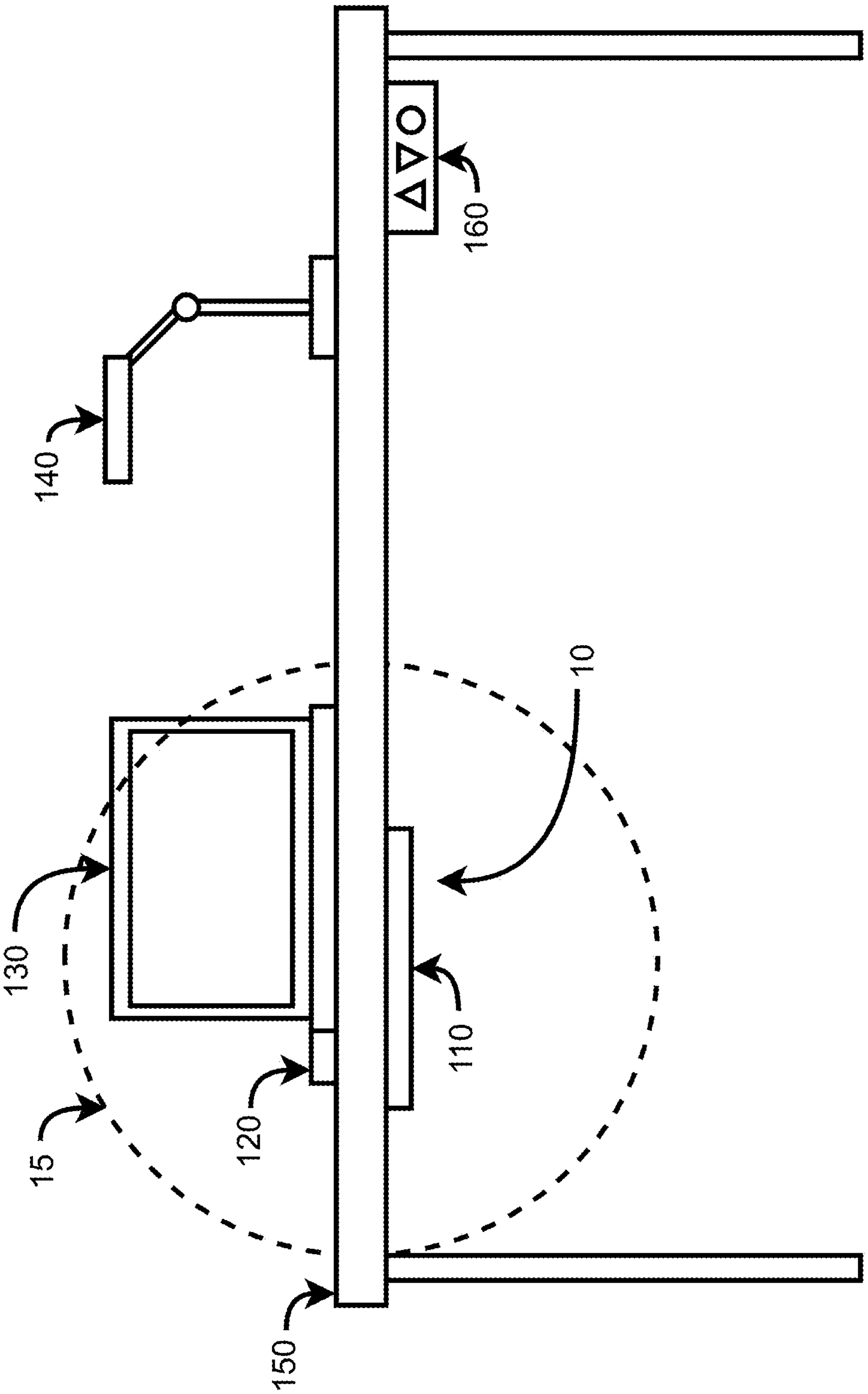
FIG. 1A is a schematic illustration of components of a system according to a possible embodiment, where the system is a wireless powering and interfacing system.

It should be noted that the appended drawings illustrate only exemplary embodiments of the invention and are therefore not to be construed as limiting of its scope, for the invention may admit to other equally effective embodiments.

DETAILED DESCRIPTION

In the following description, similar features in the drawings have been given similar reference numerals and to not unduly encumber the drawings, some elements may not be indicated in some figures if they were already introduced in a preceding figure. It should be understood that the elements of the drawings are not necessarily depicted to scale, since emphasis is placed on illustrating the elements and the interactions between elements.

The system and method presented herein relate to the management of venues or environments, such as offices, and the occupancy of these venues, using wireless transmitting devices placed at different locations of a venue. In some embodiments, the wireless transmitting devices can be used with additional components to provide the capacity to wirelessly charge portable devices of the users, such as their laptops or tablets. In this case, we refer to "wireless powering and interfacing devices. The connections and communications between the wireless transmitting devices (with or without charging capacities) and the portable devices of the users can be used to locate users within the venue, but also to collect statistical data on the occupancy of the venue and on user preferences, on a "per user" basis or for a group of users.

The system and method described in the present application thus relate to power and/or communication management and optimization. The exemplary systems and methods illustrated in FIGS. 1 to 11 are especially adapted for wireless work environments and shops. The portable devices of users may comprise, for example, laptops, personal data assistants, cellular telephones, smartphones, wearable devices, tablets or portable video game devices. The proposed system and method can be adapted to and used in different environments or venues, such as classrooms, public libraries, and airports, as examples only.

Broadly described, the proposed system comprises at least a wireless communication device, which can for instance correspond to a standalone ID-transmitter communication device or to a wireless communication module (or assembly) included in a wireless-power transmitter, which also includes a power transmission module. The portable device is, on its side, provided with one or more communication modules, one of which can optionally be a part of a corresponding wireless-power receiver including a power receiving module.

In embodiments of the system providing charging/powering capabilities, the wireless-power receiver can be external to, or integrated in the portable device. The wireless powering and interfacing system thus allows, in possible implementations, to wirelessly charge and/or power the portable device by pairing the portable device's wireless-power receiver with the wireless-power transmitter. Once the pairing is done, identification information related to the wireless transmitter can be exchanged via the wireless-power transmitter and receiver. This process provides an advantage of minimizing potential unwanted cross-communications, since the pairing of the wireless-power transmitter with the wireless-power receiver limits the exchange of information between intended targets only.

The pairing of the wireless-power transmitter and receiver creates a communication channel. By using the wireless communication channel between the transmitter and the receiver, and a wired connection between the wireless-power receiver and the portable device, the proposed invention ensures that the portable device receives identification-related information, indicating to the portable device which table or work station and/or which wireless-power transmitter it is associated with, in a multiple charger environment.

In some embodiments, the identification-related information of the wireless-power transmitter can be exchanged between the wireless-power transmitter and the portable device using a direct wireless communication channel. Unwanted cross-communications can still be minimized using various methods such as signal strength measurement and comparison, and timing criteria.

In embodiments not comprising charging capabilities, the wireless communication device can for instance broadcast identification-related information to all portable devices in range, delegating the responsibility of determining the closest device to the portable device, using various methods such as signal strength measurement and comparison.

In some embodiments, a software application module may be installed on the portable device. The software application module can include a standalone application and/or a plugin, and additionally or alternatively can comprise capabilities accessed as a web-based application. It can be appreciated that, in embodiments where the wireless-power receiver is external to the portable device, the wireless-power receiver can comprise a firmware that implements a portion or all of the features of the software application module. The software application module is configured to connect to a local and/or a centralized, organizational database to add information and/or retrieve additional information, based on the identification-related information exchanged between the wireless-power transmitter and the wireless-power receiver or the portable device. Such additional information can be broadly described as association information, localization information and/or timestamping information, in some embodiments. Both the software application module and the database may be part of a back-end system or a cloud-based back-end system, in some embodiments. The portable device may then use the additional information retrieved to trigger various actions based on the additional information and/or send various control signals to external devices. In some embodiments, the software application module described may be composed of more than one software application modules each having specific functions. For example, a web-based application may be used to activate or select features like place reservation, finding colleagues in a workspace, data analysis and interactions with the database while another a plug-in portion of the software application may interact with the hardware of the portable device to retrieve the identification-related information, but also write and read in the database, connect with external devices, and send the external devices control signals. One of the advantages of the proposed system and methods is the limitation of interconnections between a portable device, external devices, and a wireless transmitter of the system. Indeed, there is no need for connecting the external devices to the wireless transmitter such that the use of cables or wireless bandwidth is reduced. The provision of such as system has beneficial impacts when using a single wireless powering and interfacing system, the advantages are even more substantial when multiple systems are installed in an open working environment, for example, by reducing the overuse of cables or saturation of wireless communications.

In the present application, the term "portable device" refers to any type of portable processing device such as, without being limited to, portable computers, laptops, smart tablets, notebooks, smart phones and two-in-one laptops.

By "power-conditioning circuitry," we refer to electric and/or electronic circuits capable of functions such as regulating, amplifying and modifying a power signal, at any frequency, and matching its impedance to another signal.

By "wireless transmitter device", we refer to a device (or a set of components/modules) that is configured to wirelessly transmit identification-related (ID) information to a portable device, for instance allowing a software module installed on the portable device to determine where in a venue the portable device is located. A "wireless transmitter device" comprises the components to wirelessly transmits its corresponding identifier. In some embodiments, the wireless transmitter device may also receive information, and it this case, it can be referred to as a "wireless communication device".

By "wireless-power transmitter" or "wireless interfacing device", we refer to a device that comprises or has the capabilities of a "wireless transmitter device" (in that it can transmit its corresponding ID), as well as additional capabilities, for instance emitting a power signal to charge or power a portable device.

By "identification-related information" or "identifier", we refer to any information that may be used to identify a transmitter, an external device, and any relevant device. The identification-related information may be an identification (ID), for instance a PTU ID for a wireless-power transmitter, or information that can be used to retrieve an ID, such as an identification-related information that can be used for searching a database.

By "external device", we refer to any device that is present in the environment but that it not physically connected to the portable device and that is not a wireless transmitter device or a wireless interfacing device. Such external devices may include, without being limited to, a height-adjustable electrical desk, a lighting system, a heating or ventilation system, an electronic photo frame, electrical windows, or electric blinds. In the context of the present description, the "external devices" are devices with wireless communication capabilities. Further, in some embodiments, the external devices include peripheral devices, such as devices that may be connected to and interfaced with portable devices. Such peripheral devices may be, without being limited to, a display monitor, a computer monitor, a projector, any screen device, a television, a wireless mouse, a speaker, an audio system, and a wireless keyboard. In such embodiments, the peripheral devices are wireless devices. However, some peripheral devices are built without wireless capabilities. In such cases, external dongles may be connected to those peripheral devices to provide them with wireless communication capabilities needed to establish a wireless connection with a portable device. Those external dongles can thus be considered as peripheral devices in combination with the actual peripheral device (such as keyboards and mice). Some of the peripheral devices may also be wirelessly powered using the system and methods described herein. In other words, an external device does not necessarily need to interact with the portable device (for example a lamp, a desk or the heating system), while a peripheral device is typically used with the portable device (keyboard, mouse, display screen, speakers).

By "power signal", we refer to any flow of electrical energy through the wireless powering and interfacing system from a power connector to any device being charged or powered by the system. The terms "input power signal", "converted power signal", and "device-compatible power signal" may only refer to a flow of electrical energy, and may or may not contain information. The term "input power signal" may be replaced by "input DC power" or other synonyms. The term "converted power signal" may be replaced by "RF power" or other appropriate synonyms. The term "device-compatible power signal" may be replaced by "device-compatible output DC power" or other synonyms.

By "advertisement signal", we refer to any type of message, signal or information that can be sent by a wireless-power receiver or a portable device to confirm its presence. The advertisement signal can be general, such as simply enabling the acknowledgement of the presence of any wireless-power receiver or the portable device. Alternatively, the advertisement signal could be specific, containing identification-related information of, or an identifier corresponding to, a particular wireless-power receiver or portable device, for example.

By "control signal", we refer to any type of message, signal or information that can be sent by the portable device to an external device. An exemplary control signal can be an activation command, which would activate or deactivate a functionality of the external device. Another exemplary control signal may be an adjustment command which would adjust a parameter of the external device to a desired value.

Referring now to FIG. 1A, there is presented a possible embodiment of a wireless powering and interfacing station or device 10. The interfacing station or device 10 comprises a wireless-power transmitter 110 having a charging zone 15. A portable device 130, connected to a wireless-power receiver 120, is located in a charging zone 15 and is being charged by the wireless-power transmitter 110. An external device 140, such as a desk lamp, is located on a table, or workstation 150, on which the interfacing station 10 is installed. The wireless-power transmitter 110 wirelessly transfers a power signal to the wireless-power receiver 120, which transfers power to the portable device 130 for charging or powering it. The wireless-power transmitter 110 is connected to a power source (not shown) which provides an input power signal to the wireless-power transmitter 110, allowing the wireless-power transmitter to generate an alternating field, such as a magnetic field oscillating at a given frequency. The alternating field allows the wireless-power transmitter 110 to transfer the power signal to the wireless-power receiver 120. The interfacing station or device 10 can be part of a system that includes a plurality of other similar powering and interfacing devices, and which allows locating users within a venue, via connections of the users' portable devices with corresponding interfacing station or devices 10. The system also includes a database that is accessible by the portable device, via a software application module, that is run/executed by each portable device. Details of the database of and the different software application modules are provided in more detail later in the description.

The wireless-power transmitter 110 and the wireless-power receiver 120 may further exchange identification-related information using communication means, the identification-related information being sent to the portable device 130 by the wireless-power receiver 120. The software application module on the portable device can then retrieve this identification-related information and use it to enable various interfacing and locating features by exchanging information with a database. The system and methods described herein are advantageously configured to minimize information exchanged between the wireless-power transmitter and the portable device, which in turn allows for storing little information in the wireless-power transmitter itself.

Figure 1B:
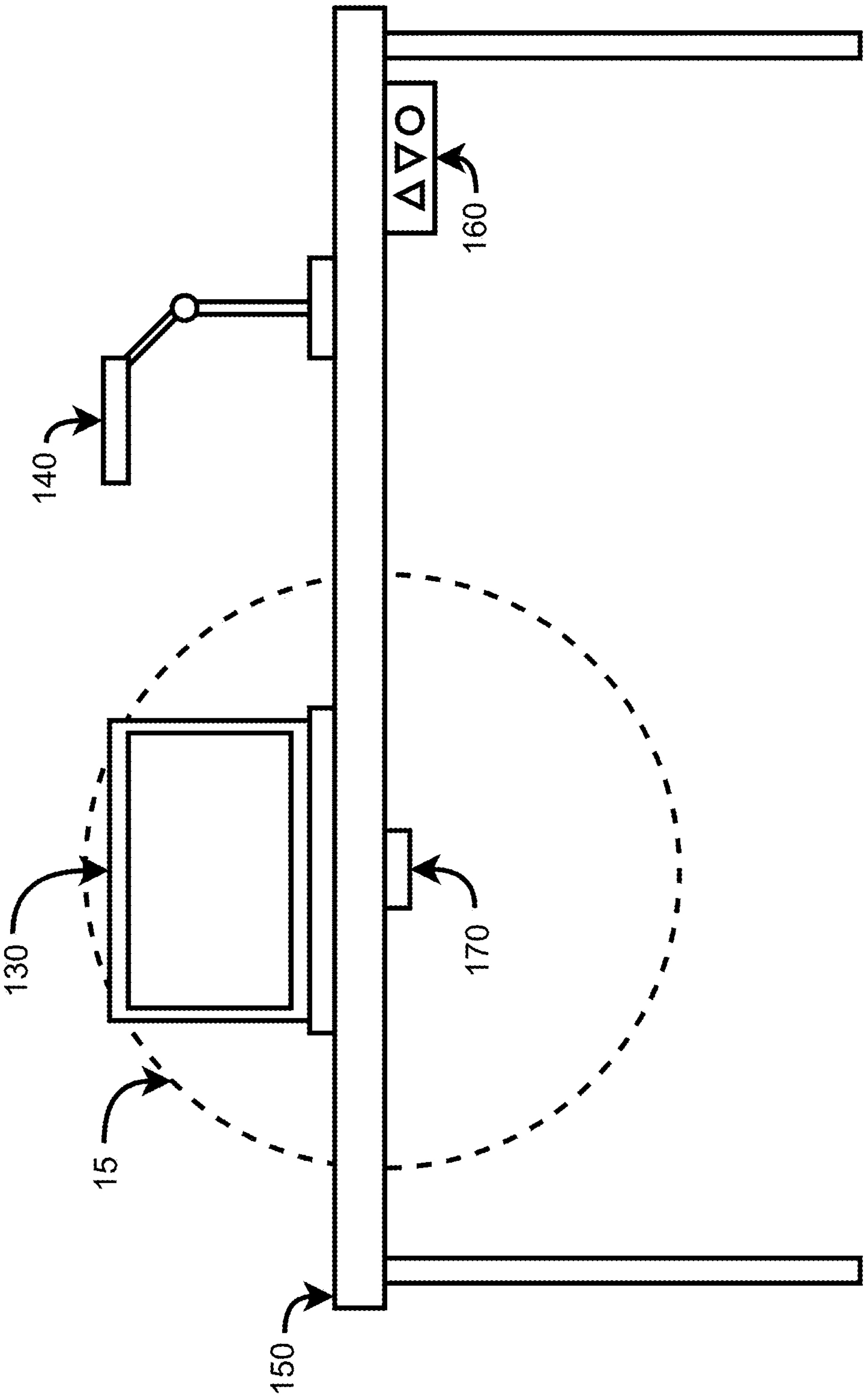
FIG. 1B is a schematic illustration of components of a system according to another possible embodiment, where the system is an interfacing system without charging capabilities.

Referring now to FIG. 1B, a possible embodiment of an interfacing station/device with no charging capability is presented. The interfacing device comprises a wireless transmitter device 170 which can broadcast identification-related information using communication means, such as Ultra Wide Band (UWB), BLE (Bluetooth® Low Energy) and Near Field Communication (NFC) chips or modules, the ID-information being receivable by any portable device within the communication range of the wireless transmitter, but destined to a portable device 130 that is located within a vicinity zone 15 of the interfacing station.

As will become apparent in the following description, such devices as illustrated in FIGS. 1A and 1B allow for simplifying deployment and management of wireless stations in an open-space environment. When used with a database and with a software application module, both embodiments allow to wirelessly locate users, via the connections of their portable devices with the wireless devices, in a venue where the devices are deployed, and allow gathering occupancy data of specific locations within the venue, as well as users' presence/time spent at specific locations within the venue.

Using the database and specific submodules of the software application, the identification-related information allows the portable device 130 to automatically exchange information or send instructions to the external device 140, such as a lamp provided with wireless communication capabilities. Information and instructions may also be sent to a plurality of external devices located on or near the interfacing station or in its neighbourhood. For example, in FIGS. 1A and 1B, an external device consists of the table 150 which is an electrically height-adjustable using a control panel 160. The control panel 160 may include wireless communication capabilities allowing the portable device 130 to wirelessly send instructions related to the desired height of the desk. In a preferred embodiment, the identification-related information exchanged between the wireless-power transmitter 110 and the wireless-power receiver 120 when initiating communications or transmitted by transmitter device 170 allows the portable device 130 to automatically identify, and connect, directly or indirectly e.g., through a gateway, to the external device 140 located at the workstation 150. The portable device 130 can attempt to automatically connect to the external device 140 with wireless communication means, with or without the need for user authorization. When the connection is successful, the portable device 130 may then exchange instructions and information with the external device 140 through an established wireless communication means. Wireless communication means between the portable device 130 and the external device 140 may include, but are not limited to Wi-Fi, Bluetooth®, broadband cellular network and any other communication means supported by the portable device and the external devices. The external device 140 not provided with wireless communication means may also be connected to an external dongle providing said wireless communications means.

External devices that can be activated or controlled by the portable device 130 when entering zone 15 include, without being limited to, electrically adjustable tables or desks, lighting systems, local heating or cooling systems (or air-temperature units), digital photo frames, or any other device with wireless communication capabilities. Settings of an external devices that can be controlled by the portable device include, without being limited to, light intensity, light colour, desk height and temperature. The instructions sent to an external device can be based on user preferences associated with the portable device. For example, a person may prefer to keep the desk lamp off when he arrives at a working station, but another person may want to turn it on. Those preferences can be stored in a database, or on the portable device 130, for example. It will be noted that the user preferences can be associated with a user independently of a given portable device. Therefore, a user may use various portable devices while keeping the same user preferences, by logging into the software application module and accessing those user preferences on the portable devices, for example.

The wireless-power transmitter 110 or wireless transmitter device 170 described herein is positioned under the workstation 150. However, in alternative embodiments, the wireless-power transmitter 110 or wireless transmitter device 170 may be positioned on top of the workstation, or integrated to the workstation, for example. The wireless-power receiver 120 of FIG. 1A is shown as an external dongle, connected to one or more ports of the portable device 130. However, in other embodiments, the wireless-power receiver 130 can be integrated to the portable device, or further directly integrated to the main board of the portable device 130.

Still referring to FIG. 1A, when the portable device 130, connected to the wireless-power receiver 120, is placed on the workstation 150 in the charging zone 15, a pairing process between the wireless-power transmitter 110 and the wireless-power receiver 120 is started. The pairing process may comprise one or more pairing methods used for limiting potential cross-connections between unintended wireless-power transmitters and receivers, such as in an environment comprising a multitude of workstations 150. Once the pairing process is completed, the portable device 130 may be charged or powered by the wireless-power transmitter 110 via the wireless-power receiver 120, and may additionally receive the identification-related information exchanged between the wireless-power transmitter 110 and wireless-power receiver 120. In preferred embodiments, the wireless-power transmitter 110 and the wireless-power receiver 120 may further exchange data other than identification-related information using the wireless communication channel, such as monitoring data for regulating the power transferred, the transfer efficiency, and the rectified voltage, for example. The wireless-power transmitter 110 and the wireless-power receiver 120 may also use different technologies for exchanging power, such as inductive coupling, resonant inductive coupling, any implementation related to these technologies, and any technology using fields.

In some embodiments, the exchange of the identification-related information may also be performed without using the wireless-power receiver connector. The portable device 130 may connect to the wireless-power transmitter 110 using a wireless communication channel when it enters the charging zone 15. Various methods can be used to limit cross-connection such as signal strength measurement and comparison, and timing criteria. All subsequent steps described in this document, such as connection to and communication with external devices 140 and 160 and data entries in a database can then be performed once connection between the wireless-power transmitter and the wireless-power receiver or the portable device is established.

Figure 2A:
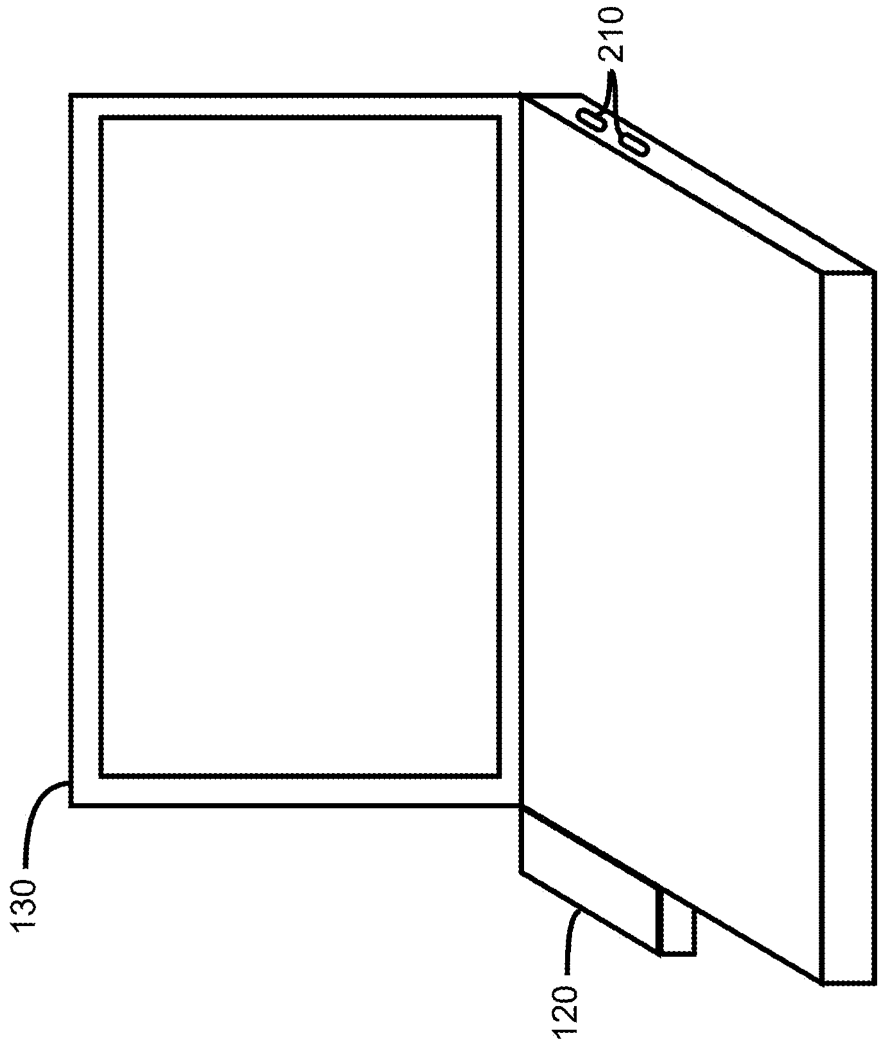
FIG. 2A is a schematic diagram of a portable device provided with a wireless power receiving module, according to a possible embodiment.

Referring now to FIG. 2A, the portable device 130 is shown being charged and/or powered by the external wireless-power receiver 120. The wireless-power receiver 120 may have different dimensions and appearances and the drawing is only a conceptual representation. The wireless-power receiver 120 may be plugged in one or more external connector 210 to allow the transfer of power and identification-related information to the portable device 130. External connector 210 may include, without being limited to, USB Type-C connectors, other USB connectors, barrel connectors and other standard ports well known in the art. In some embodiments, the wireless-power receiver 120 may have only one connector (not shown) for power transmission and data transmission to the portable device 130. Alternatively, the wireless-power receiver 120 may have two separate external connectors, one connector being used for power transmission and the other connector for data transmission to the portable device 130.

In embodiments where the wireless-power receiver is integrated inside the portable device 130, no external connectors are needed. The power and data transmission may be directly carried by appropriate electronic circuitry to the portable device 130 circuitry.

Figure 2B:
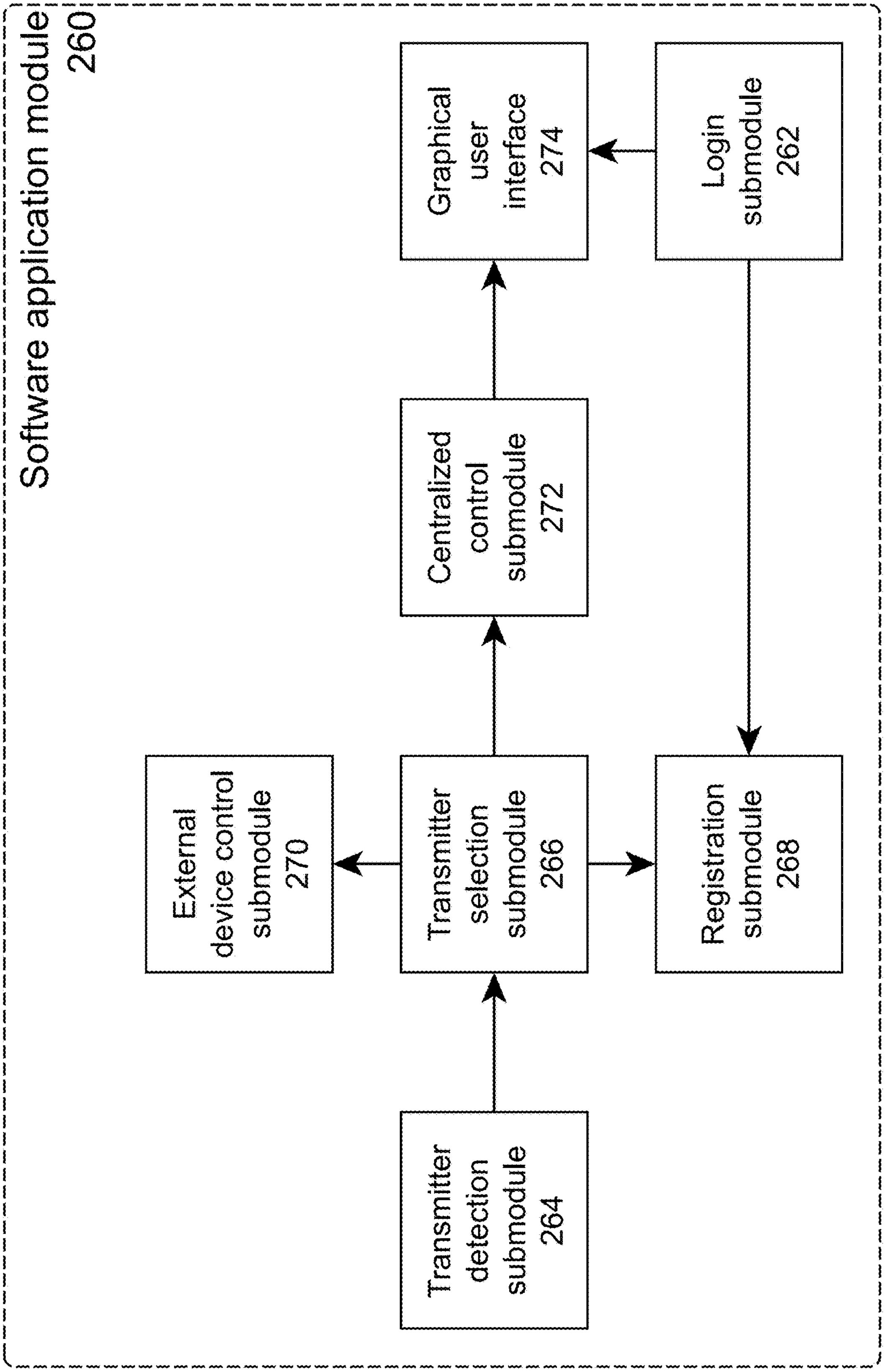
FIG. 2B is a schematic diagram of a software application module provided that can be installed on a portable device, according to a possible embodiment.

FIG. 2B shows a possible organization of the software application module 260 operating on portable device 130. It can be appreciated that all submodules can be implemented as part as one application or plugin, or that the functionalities implemented by the submodules may be distributed among more than one application and/or plugin, that some or all functionalities may be implemented as part of a firmware operating on a device external to the portable device 130 such as for instance a wireless-power receiver coupled with the portable device 130, and that some or all functionalities may be implemented as part of a web application, accessible for instance via a web browser of portable device 130, and in which the some operations can be implemented on an external device such as for instance a server operating in the cloud or in the venue which executes an HTTP server to serve the web application to the portable device 130.

The software application module 260 can comprise a login submodule 262, which is configured to identify the user of the portable device 130. In some embodiments, the identification is performed by requesting the user to enter a username and a password using a data entry device integrated in or coupled with the portable device 130. The username and/or password, or a string corresponding to the password such as a salted or unsalted hash, may for instance be stored in a database of the portable device 130 accessible by the login submodule 262 and/or in a database included in or accessible by a centralized server associated with the venue. Once a user has been authenticated and/or identified, the login submodule 262 may provide an identifier associated with the user, which can be stored in a database for instance to allow computing statistics about the user or to allow other individuals in the venue to find the user.

The software application module 260 can comprise a transmitter detection submodule 264, which is configured to detect signals emitted or broadcast by nearby wireless transmitter devices and/or nearby wireless interfacing devices. Nearby wireless transmitter devices can for instance include all wireless transmitter devices of which the portable device 130 is in communication range, for instance such that a communication module of the portable device 130 is capable of perceiving the signals broadcast by the wireless transmitter devices. Nearby wireless interfacing devices can for instance include all wireless interfacing devices of which the portable device 130 or an external device such as a wireless-power receiver coupled with the portable device 130 is in the charging zone such that a power-receiving antenna of the portable device 130 or the wireless-power receiver is capable of perceiving the power beacon transmitted by the wireless interfacing device. The signals can for instance comprise radio signals corresponding to a wireless transmitter device broadcasting its identifier, a wireless-power transmitter in bidirectional wireless communication with the portable device 130, and/or power beacons emitted by a wireless interfacing device. Once a signal is detected, parameters of this signal can be measures, including for instance a signal strength such as the RSSI of a radio signal, a voltage and/or current of a power beacon, or a precise time of signal detection. The collected information can be transmitted to a transmitter selection submodule 266.

The software application module 260 can comprise a transmitter selection submodule 266, which is configured to select the closest wireless transmitter device. The transmitter selection submodule 266 can implement a number of techniques that will be described in detail below, in particular with respect to FIG. 3A to 4D. Broadly described, the closest wireless transmitter device selected by the transmitter selection submodule 266 can for instance correspond to the wireless transmitter device of an interfacing device with no charging capability that has the strongest radio signal as averaged over one or more time periods or intervals, or to the wireless transmitter device of the wireless powering and interfacing device that is paired with the portable device 130 following pairing validation and/or confirmation procedures described in detail below, in particular with respect to FIGS. 3A and 3B.

The software application module 260 can comprise a registration submodule 268, which is configured to ensure that relevant information is stored in a database, which can be a local database accessible to the portable device 130 and/or a centralized, organizational database located on or accessible to a server that the portable software application module 260 is capable of communicating with through the registration submodule 268. Relevant information can for instance include a unique identifier corresponding to the closest wireless transmitter device, a unique identifier corresponding to the portable device itself or to the user identified through the login submodule 262, indications as to whether the portable device and/or associated user are, e.g., arriving at or departing from a position associated with the closest wireless transmitter device, and timestamps associated with such events. As an example, the relevant information stored in the database can be these that make it possible to implement the capabilities of the centralized control software submodule 272, as described below and in FIGS. 6 to 10.

The software application module 260 can comprise an external device control submodule 270, which is configured to control external devices associated with the closest wireless transmitter device. The external device control submodule 270 can communicate directly with the external devices and/or can communicate indirectly with them through one or more gateways, as will be described in detail below, in particular with respect to FIG. 3C. The instructions sent by the external device control submodule 270 can comprise manual instructions to change settings of an external device sent by the user of the portable device and/or automatic instructions to change settings of the external device to default user-associated values selected by the user and stored in a database.

The software application module 260 can comprise a centralized control submodule 272, which is configured to allow all features allowed by operating a centralized, organizational database accessible by the portable device 130, or alternatively a distributed database operating on one or more portable devices located in the venue that are communicating together to make aggregated data accessible. Such features include for instance displaying the respective locations within the venue of one, some or all the venue users, reserving a location in the venue, and displaying various statistics. The features are described in more detail below, in particular with respect to FIGS. 6 to 10.

The software application module 260 can comprise a graphical user interface 274, configured to display information and allow user to input information, for instance for the login submodule 262 and for the centralized control submodule 270. As can be appreciated, the graphical user interface 274 can be configured to generate a graphical user interface (GUI) in the form of a web application consisting of code in one or more computer languages, such as HTML, XML, CSS, JavaScript and ECMAScript. In some embodiments, the GUI can be generated programmatically, for instance on a server located within the venue or in the cloud hosting an HTTP server, and rendered by an application such as a web browser on the portable device 130. In other embodiments, the software application module can be configured to generate the GUI via a native application running on the portable device, for example comprising graphical widgets configured to render information received from a server hosting organizational database. In some embodiments, some feature can be implemented with a native GUI and some other features can be implemented in a web application.

The software application submodules are preferably implemented in a high-level programming and/or scripting language, for instance an imperative e.g., procedural or object-oriented, or a declarative e.g., functional or logic, language, to communicate with a computer system. However, they can be implemented in assembly or machine language if desired. In any case, the language may be a compiled or an interpreted language. Each such submodule is preferably stored on a storage media or a device readable by a general or special purpose programmable computer for configuring and operating the computer when the storage media or device is read by the computer to perform the procedures described herein. In some embodiments, the system may be embedded within an operating system running on the programmable computer. Furthermore, the system, processes and methods of the described embodiments are capable of being distributed in a computer program product comprising a computer readable medium that bears computer-usable instructions for one or more processors. The computer-usable instructions may also be in various forms including compiled and non-compiled code.

Figure 3A:
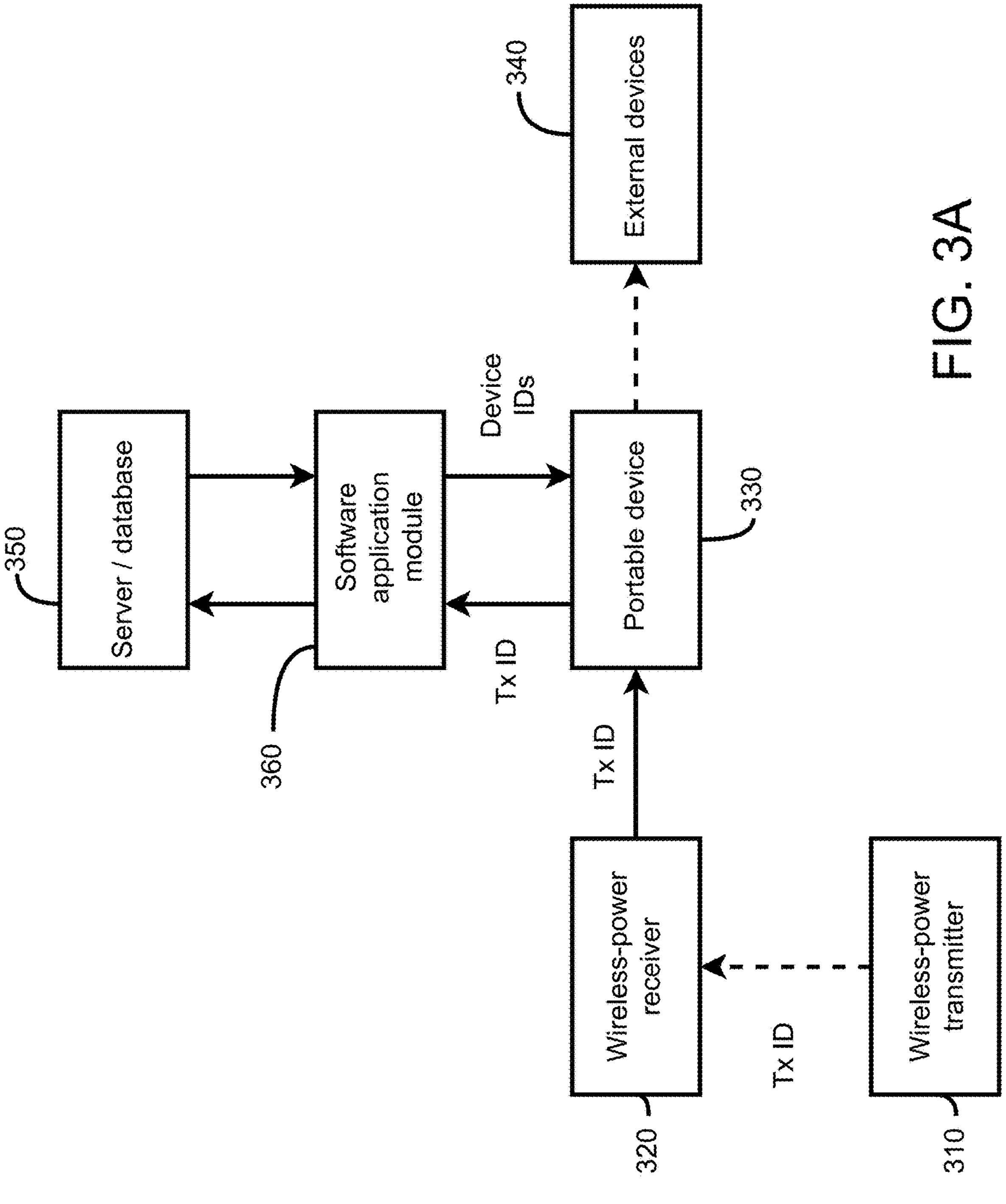
FIG. 3A is a functional block diagram of a wireless powering and interfacing system, according to a possible embodiment.
Figure 3B:
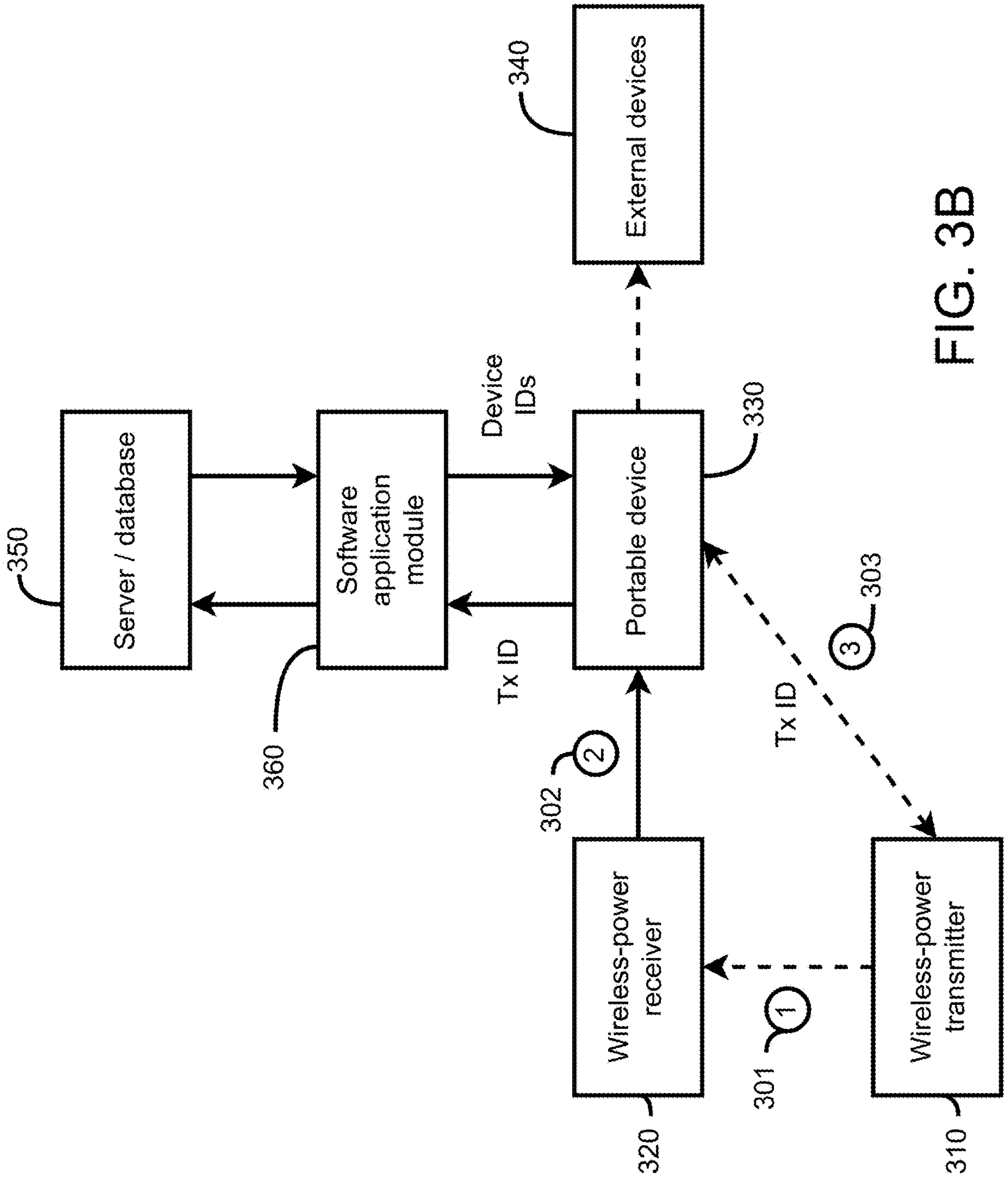
FIG. 3B is a functional block diagram of a wireless powering and interfacing system, according to another possible embodiment.
Figure 3C:
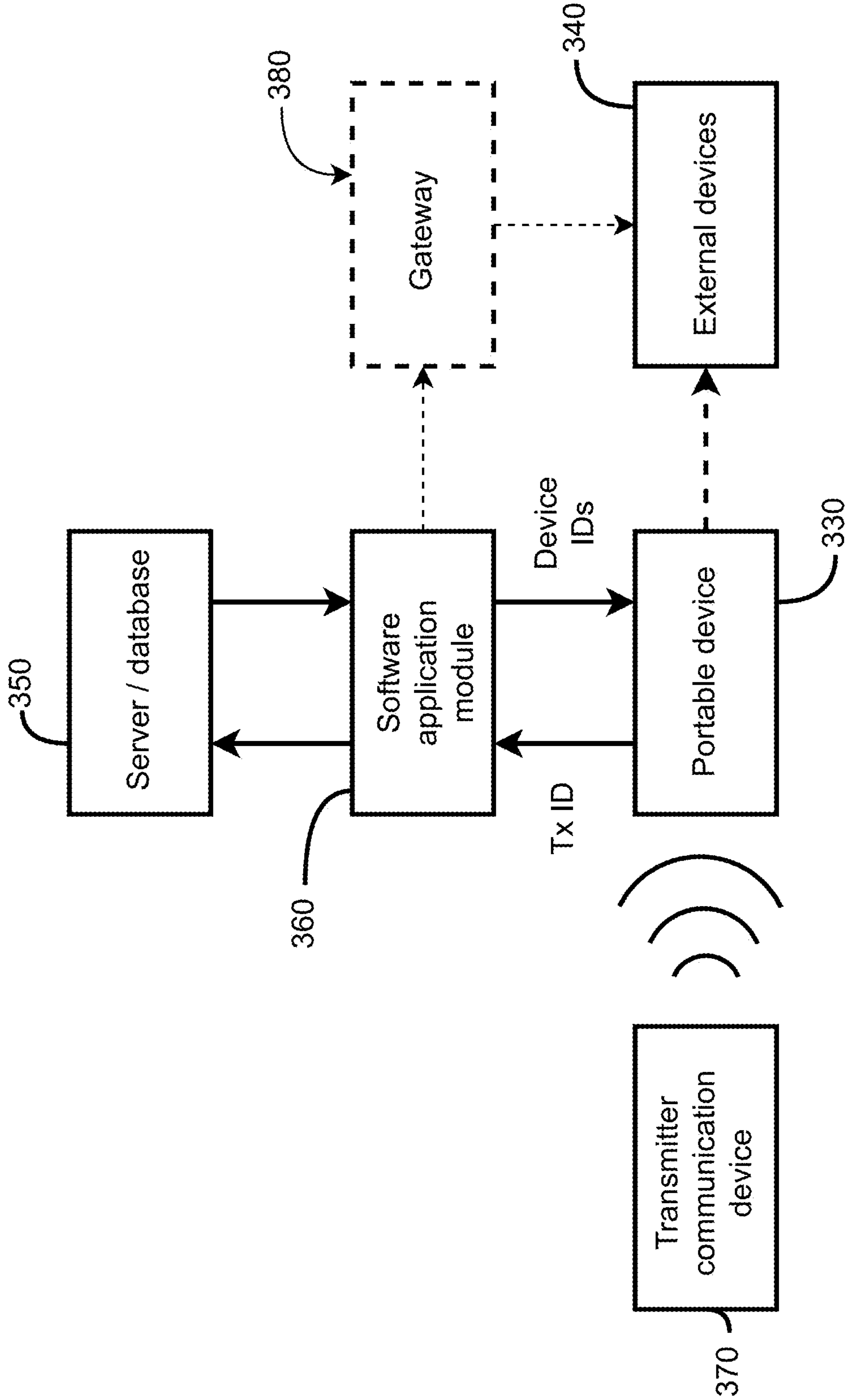
FIG. 3C is a functional block diagram of an interfacing system without charging capabilities, according to another possible embodiment.

FIG. 3A to 3C show possible flows of information through the different components and devices, allowing a software application module 360 used by the portable device 330 to store information in a database 350 that can be useful to offer a plurality of features. One of the features, described above, allows the portable device 330 to automatically and wirelessly connect to external devices 340 through the software application module 360, thereby removing the need for the user to activate or control each device manually.

Referring to FIGS. 3A and 3B, before the flow of information may start, a pairing process between the wireless-power transmitter 310 and the wireless-power receiver 320 is performed. The pairing process allows for ensuring that the wireless-power transmitter properly connects with a wireless-power receiver 320 located in the charging zone of the transmitter, and advantageously limits possible cross-connections, which provides an advantage of sending an appropriate identification-related information (i.e., the identifier of the wireless transmitter device) to the portable device and thus limiting cross-communication between the portable device and unintended external devices, such as external devices located on other workstations or tables. Depending on the embodiments, various pairing methods may be performed.

Figure 4A:
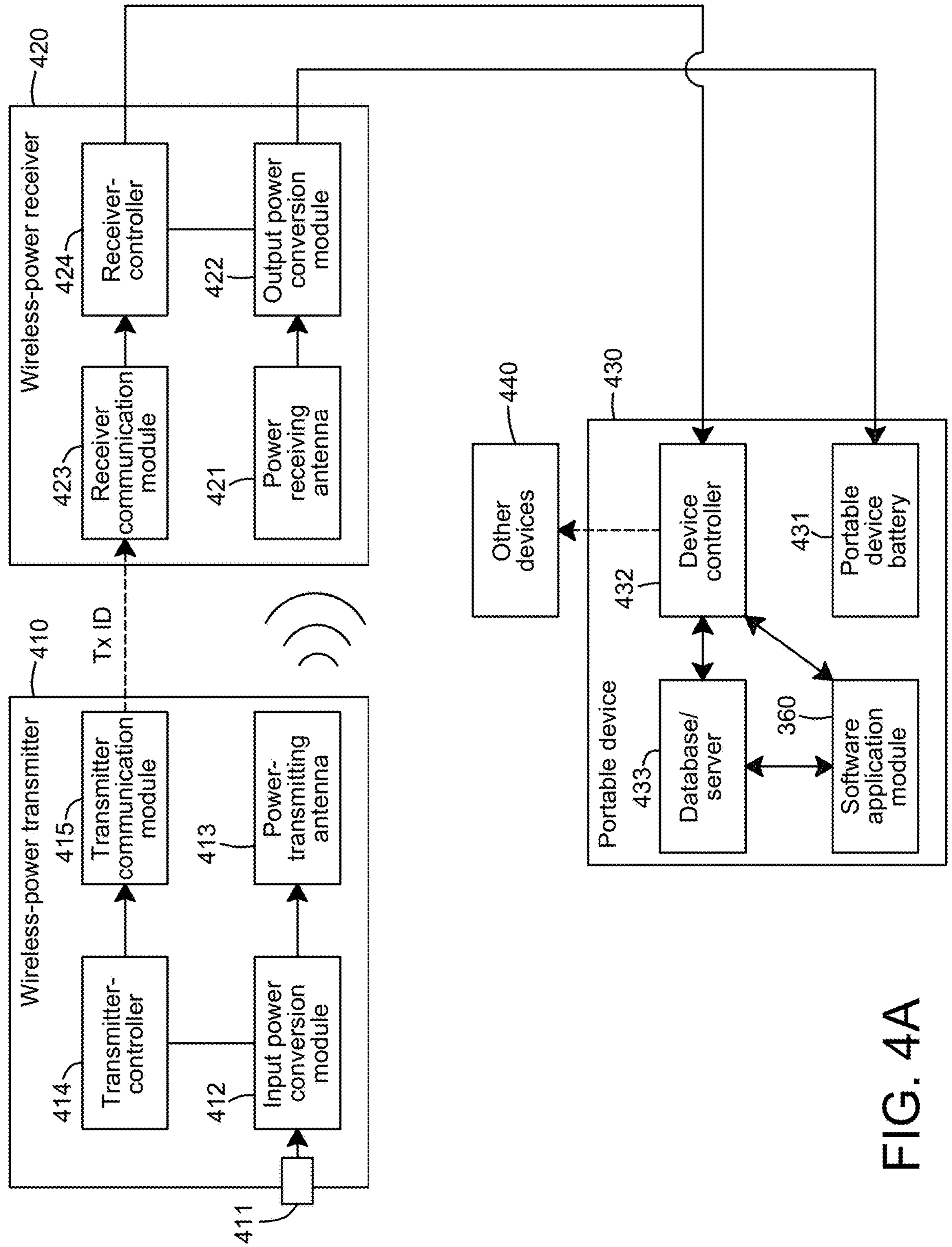
FIG. 4A is another functional block diagram of a wireless powering and interfacing system, according to a possible embodiment.

One pairing method comprises having the wireless-power transmitter 130 emit power during short periods of time, those emissions being also called power beacons, providing enough power and time for the wireless-power receiver 320 to boot and broadcast an advertisement signal using a receiver communication module (423 in FIG. 4A). When the wireless-power transmitter 310 receives the advertisement signal from the wireless-power receiver 320, and if additional parameters for limiting cross-connection are respected, the wireless-power transmitter may begin emitting more power to start the exchange of static and dynamic parameters between the wireless-power transmitter 310 and the wireless-power receiver 320. For example, the static parameters can include maximum power that can be received by the wireless-power receiver and identification of the company associated to the workstation or wireless-power transmitter. Dynamic parameters can include instant DC voltage and current, and ideal DC voltage and current. Further, the static and dynamic parameters can be defined by a standard adopted for the communication channel, such as Airfuel Alliance. For example, the static parameters can further include wireless-power receiver category and wireless-power transmitter class.

In some embodiments, once the wireless-power transmitter receives the advertisement signal, the wireless-power transmitter starts transmitting more or continuous power signals to the wireless-power receiver. However, before the wireless-power receiver starts transferring the power to the portable device, the static and dynamic parameters may be exchanged between the wireless-power transmitter and the wireless-power receiver.

With reference to FIG. 3A, one of the additional parameters or criteria used during pairing is a timing criterion. A timing of reception of the advertisement signal from a wireless-power receiver 320 by the wireless-power transmitter 310 is analyzed. If the timing does not match an emission of a beacon by the wireless-power transmitter 310, or if the timing corresponds to a moment when no power was emitted (using for example timestamps associated with the power beacons), the criterion may be invalid, preventing the pairing, as the mismatch in timing may be indicative that the advertisement signal was sent by an unintended wireless-power receiver. Conversely, the criterion is valid when the timing matches sending a beacon by the wireless-power transmitter 310.

However, the power beacon timing criterion alone may not be sufficient to limit cross-connections in a context of an interfacing station powering more than one device. For example, when receiving an advertisement signal from a second device trying to pair with the wireless-power transmitter of the interfacing station, the wireless-power transmitter 310 may already be transferring power in the charging zone to power a first device. Therefore, the timing criterion may be wrongly considered valid if advertisement signal from an unintended wireless-power receiver is received while the wireless-power transmitter 310 is transferring continuous power to the first device. Accordingly, an impedance criterion may additionally be used during the pairing process to further limit possible cross-connections. The impedance criterion comprises comparing impedances in the wireless-power transmitter. An impedance at the power-transmitting antenna is measured before a new wireless-power receiver enters the charging zone. Such measurements can be made periodically or continuously, according to various embodiments. When the wireless-power receiver and portable device enter the charging zone, a change in the measured impedance may be detected, indicated that a wireless-power receiver indeed entered the charging zone. Further, the electrical load of the wireless-power receiver may be rapidly fluctuated to create a more easily noticeable change in impedance at the power-transmitting antenna.

Additionally, or alternatively, physical characteristic data related to physical characteristics of the power or information exchange, may be used for validating the pairing process. Such physical characteristic data may include the received signal strength indicator (RSSI) of the advertisement signal, the power sent by a receiver communication module (423 in FIG. 4A) during the broadcast of an advertisement signal, and power-receiving antenna gain. Any one or more of the timing criterion, impedance criterion, and physical characteristic data can be used to validate or invalidate the pairing process between a wireless-power receiver and a wireless-power transmitter. It will be understood by a person skilled in the art that those criteria have some limitations and, in some cases, cross-connection may still happen. However, using one or more of the methods lowers the potential for cross-connections.

In some embodiments, monitoring methods are used once the pairing is established to detect and confirm that the pairing and communication channel are properly established between a wireless-power transmitter and an intended wireless-power receiver in the charging zone of the wireless powering and interfacing station. The monitoring methods generally allow for effecting a change on exchanged signals or power signals between a wireless-power transmitter and a wireless-power receiver, and monitoring that the change is received, thereby validating that a wireless-power transmitter is properly connected to the desired wireless-power receiver. For example, one monitoring method comprises varying, for a given period of time, a current that flows into the power-transmitting antenna, measuring or monitoring, during that same period of time, the voltage of the wireless-power receiver and sending voltage measurements to the wireless-power transmitter using the wireless communication module. If no significant change is detected in the voltage measurements of the wireless-power receiver or if the voltage changes do not correspond with the current variations of the power-transmitting antenna, the interfacing station may detect that cross-connection has occurred. More than one iteration of this method may be performed to confirm proper connection or detect cross-connection, since a mismatch between voltage measurements of the wireless-power receiver and current variation of the power-transmitting may not necessarily be indicative of a cross-connection. For example, the mismatch may be caused by the wireless-power receiver being moved within the charging zone while performing the method.

Another monitoring method is to monitor the power being sent into the power-transmitting antenna or at any other point in the wireless-power transmitter and compare it to the measured power at the wireless-power receivers in the charging zone. The wireless power transfer efficiency may vary from one use case to another, but a possible range of efficiency may be defined as a reference to detect cross-connection. For example, if the wireless-power transmitter uses 8 W of power and one of the wireless-power receivers measures 5 W of power being delivered to the portable device battery, the interfacing station may determine that the wireless-power receiver is properly paired to the wireless-power transmitter. However, if one of the wireless-power receivers delivers 30 W to a portable device, the interfacing station may determine that cross-connection has occurred since the power delivery efficiency is above 100%. In such a case, the interfacing station may then unpair the wireless-power receiver from the wireless-power transmitter.

As mentioned above, the wireless-power transmitter 310 and the wireless-power receiver 320 may first establish a wireless communication channel by pairing, the pairing process comprising making some validations to limit cross-connection, using for example timing, impedance, and characteristic criteria. Various monitoring methods described previously, such as power or voltage regulation and monitoring, may further be used by the wireless-power transmitter 310 and the wireless-power receiver 320 after the pairing is successful to ensure that the communication connection is properly established between the wireless-power receiver 320 and the wireless-power transmitter 310 sending power to the wireless-power receiver 320. This reduces the risk of cross-connection and cross-communication with any wireless-power transmitter not sending power to the wireless-power receiver 320, such as for example a wireless-power transmitter located at a different workstation.

Once the pairing process is successful, the wireless-power transmitter 310 sends identification-related information identifying itself (referred to as Tx ID in FIGS. 3A to 3C), or alternatively identifying the interfacing station, through the wireless communication channel using the communication means to the wireless-power receiver 320, and the wireless-power receiver 320 sends the identification-related information to the portable device 330 using wired communication to ensure no cross-communication with unwanted devices. A software application module 360 is used to retrieve the information sent by the receiver and for communicating with a database 350 using the retrieved identification-relation information. In some embodiments, the software application module 360 may be installed on the portable device 330 as a standalone application and/or a plugin, and 360 may a additionally or alternatively comprise a web-based application instead accessed on the portable device.

In some embodiments, a portion of the software application module 360 or a separate plug-in is configured to frequently probe a memory address related to the wireless communication channel established between the wireless-power receiver 320 and the wireless-power transmitter 310 and detect new identification-related information that the portable device 330 may receive. A driver may be installed to retrieve the identification-related information on the portable device, depending on the type of portable device and connector used. The software application module 360 subsequently uses the retrieved identification-related information to create connection data entries in the database 350. The connection data entries may include a unique identifier of the connection, the identification of the wireless-power transmitter or its position, the identification of the person using the portable device, the moment when the portable device entered the wireless charging zone and eventually the moment it left the wireless charging zone. These entries in the database 350 allow for providing a plurality of features through the software application module 360. Exemplary features in different environments will be explained in relation to FIG. 5A to 5C. To include the identification of the person in the database entries, the software application module requests a login/sign-in from a user through the portable device in order to allow the features described herein. For example, this login/sign-in request may be displayed when the portable device enters the charging zone of a wireless-power transmitter. Alternatively, the login/sign-in may be displayed or requested only once or periodically, for example.

In some embodiments, the portable device may send an acknowledgement message to the wireless-power receiver indicating that identification-related information (or identifier) was received. Further, the wireless-power receiver may repeatedly transfer the identification-related information to the portable device until the acknowledgement message is received from the portable device. The wireless-power receiver may also send an acknowledgement message to the wireless-power transmitter once the identification-related information transmitted by the wireless-power transmitter is received by the wireless-power receiver. Further, the wireless-power transmitter may repeatedly transmit the identification-related information to the wireless-power receiver until this acknowledgement message is received.

FIG. 3B shows another exemplary method of transferring a unique identifier of the wireless-power transmitter 310 to the portable device 330 within its charging zone while limiting probabilities of cross-connection. The method involves the portable device 330 establishing a wireless communication connection with the wireless-power transmitter 310 after a given event to receive the unique identifier associated with the wireless-power transmitter. The event may be for example the portable device getting power sent to its power connector. This may be an indication that a wireless-power receiver connected to its power connector just entered the charging zone of a wireless-power transmitter. When this event happens, the portable device 330 may broadcast an advertisement signal using one of its wireless communication capabilities (for example, a Bluetooth® module/antenna) to signal its intention of connecting with any wireless-power transmitter in proximity. To identify the appropriate wireless-power transmitter, specific criteria may be applied.

One criterion to limit cross-connection between the portable device 330 and the wireless-power transmitter 310 may be done inside the firmware code of the wireless-power transmitter. This criterion may be to not establish a wireless communication connection with a portable device if the wireless-power transmitter did not recently start powering a wireless-power receiver (shown as step 1 301) or transferring enough power to a receiver to charge a portable device (step 2 302). For example, by using this criterion in a multiple wireless-power transmitters environment, only one or a few wireless-power transmitters within reach of the advertisement signal would try connecting to the portable device. The wireless-power transmitter may also use a measure of signal strength such as RSSI or other signal characteristics to not connect if the portable device is detected as being too far from the wireless-power transmitters. The one or more wireless-power transmitter who tries to connect to the portable device may send information to the portable device, including for example a unique identifier and additional information needed for criteria validation used to limit cross-connection such as RSSI and timing information. This information can then be used by the portable device to identify the appropriate wireless-power transmitter identifier from all the received identifiers.

In other embodiments, the wireless-power transmitters that receive the advertisement may all try connecting to the portable device and send various information such as RSSI and timing information that the portable device can then use to identify the appropriate wireless-power transmitter from all the received identifiers.

One criterion that can be used to identify the appropriate wireless-power transmitter is based on the timing of at least one of step 1 301 or step 2 302, and in some cases step 3 303 which corresponds to the time when the timing information is exchanged. Both the wireless-power transmitter 310 and the portable device 330 can detect these steps happening and can therefore store the time of each event or delay between any two steps. Timing comparison can then be performed and the wireless-power transmitter which has the lowest error on the timing criteria is identified as the desired wireless-power transmitter, from which the information transmitted is used by the software application module for the various features described herein. Step 1 301 corresponds to when the wireless-power transmitter 310 starts sending continuous power to the wireless-power receiver 320 but only to power the wireless-power receiver circuitry and receiver controller. The time at which it happens can be noted/stored in the wireless-power transmitter controller or external memory, such as flash. When this step happens, a signal, such as a small voltage, for example 5V, can be applied on a pin of the power connector of the wireless-power receiver to be detected by the portable device 330 with a software application module. Consequently, the wireless-power transmitter and the portable device can note/store the time of this event with a very small time difference between them. Step 2 302 corresponds to when the wireless-power transmitter starts to send more power to the wireless-power receiver in order to charge the portable device battery while still powering the wireless-power receiver circuitry and receiver controller. This change of power transferred can be measured on the wireless-power transmitter and the time at which it happens can be stored locally in the wireless-power transmitter controller or external memory, such as flash memory. The portable device can also detect when the power starts to be transferred to its battery with the software application module. Once the portable device starts charging, the software application module can note/store the time of the event, and then attempt to connect to wireless-power transmitters to receive their unique identifier and the timing of step 1 and or step 2. Step 3 303 is the exchange of timing information either from the portable device to the wireless-power transmitter or vice versa. It may be useful for the wireless-power transmitter to note the time associated with this step and send it since the wireless-power transmitter may not have the same absolute clock as the portable device. It may also be preferable to send the difference between step 3 and step 1 and/or between step 3 and step 2, to mitigate an internal clock difference between the wireless-power transmitter and the portable device.

The timing criteria validation described above may be performed in the transmitter controller, or in the portable device through the software application module, for example. If the wireless-power transmitter is the one verifying the criteria, it may only send its unique identifier once the criteria is met. It may alternatively be useful to do the validation in the portable device since the software application module may be configured to receive more than one unique identifier and simply take the one with the minimal error between the various timings received. By putting less strict criteria validation in the wireless-power transmitter controller or no criteria validation at all, the probability of having a portable device receiving no unique identifier when entering a charging zone is minimized. However, in some embodiments where there are too many wireless-power transmitters in the local environment for the software application module 360 to handle rapidly, a stricter validation inside the wireless-power transmitter may be useful. For example, the delay or timing value used for validating the timing criteria (or timing comparison) may be shortened to have a stricter criteria validation, and inversely the delay or timing value may be increased to have a less strict criteria validation.

Another criterion that may be used in some embodiments is to compare power sent to the receiver with the power received by the computer. For example, if the portable device is currently receiving 50 W of power and a wireless-power transmitter having established a wireless communication connection with the portable device only delivers 20 W of power to its one or more receiver, then it cannot be the appropriate wireless-power transmitter and its unique identifier should be discarded.

In some embodiments, the signal strength, RSSI or other signal characteristics may be used as an additional criterion to localize the portable device to the appropriate wireless-power transmitter. In some cases, this information may even be transmitted periodically from the nearest wireless-power transmitters to the portable device, even if the portable device is not currently inside a charging zone. With this information, the portable device can be located in an environment with multiple wireless-power transmitters. Various triangulation techniques may be used for this purpose such as using time delays between a minimum of three wireless-power transmitters and the portable device. For example, each time delay allows to create a circle of possible location of the portable device around the wireless-power transmitter. The radius of the circle is calculated using the time for the signal to go from the wireless-power transmitter to the portable device and back or vice versa. The zone where the three circles drawn around the three wireless-power transmitters intersect gives the approximated position of the portable device.

The wireless communication protocol used between the portable device and the wireless-power transmitter to exchange the information-related information, such as the unique identifier and other information, may be one of various communication protocols supported by both devices, including, but not limited to, Wi-Fi, Bluetooth®, and Bluetooth® Low Energy (BLE).

Both FIG. 3A and FIG. 3B show ways for the wireless-power transmitter to send the identification-related information to the portable device when the portable device enters the charging zone of the wireless-power transmitter. The wireless-power transmitter may send the identification-related information to the wireless-power receiver that then sends it to the portable device (such as in FIG. 3A) or directly to the portable device (such as in FIG. 3B). By doing so, many features are made available to the user or the building managers, using the database 350, such features including external device 340 activation and precise localization of persons within an environment. Similar descriptions as the ones in FIG. 3A can be used for the steps following the wireless-power transmitter identification-related information retrieval in FIG. 3B.

Both methods show a way to send information from wireless-power transmitters to the database. In some embodiments, in may be useful to send information regarding the wireless-power transmitter performance. For example, the wireless-power transmitter could send logs of system errors it encountered and associated measurements to help identify the cause. This information could then be stored in a database and later indicate to the company or manufacturer how often some bugs happen and what could be the reason of these bugs.

Furthermore, the portable device 330 may send requests to the wireless-power transmitter using the communication path described. Such requests may include a request to limit completely or partially the power delivery to the wireless-power receiver. These requests may be useful for example when a user enters the charging zone of a wireless-power transmitter associated with a station that someone else reserved at this moment. The software application module 360 may identify that someone else reserved the station associated with the wireless-power transmitter using the database and its reservation entity (see FIG. 11). The user that is currently using the position reserved by someone else may then be noticed of this information by a pop-up window sent by the software application module and displayed on the portable device, and the portable device may not receive power from the wireless power-receiver.

Figure 3D:
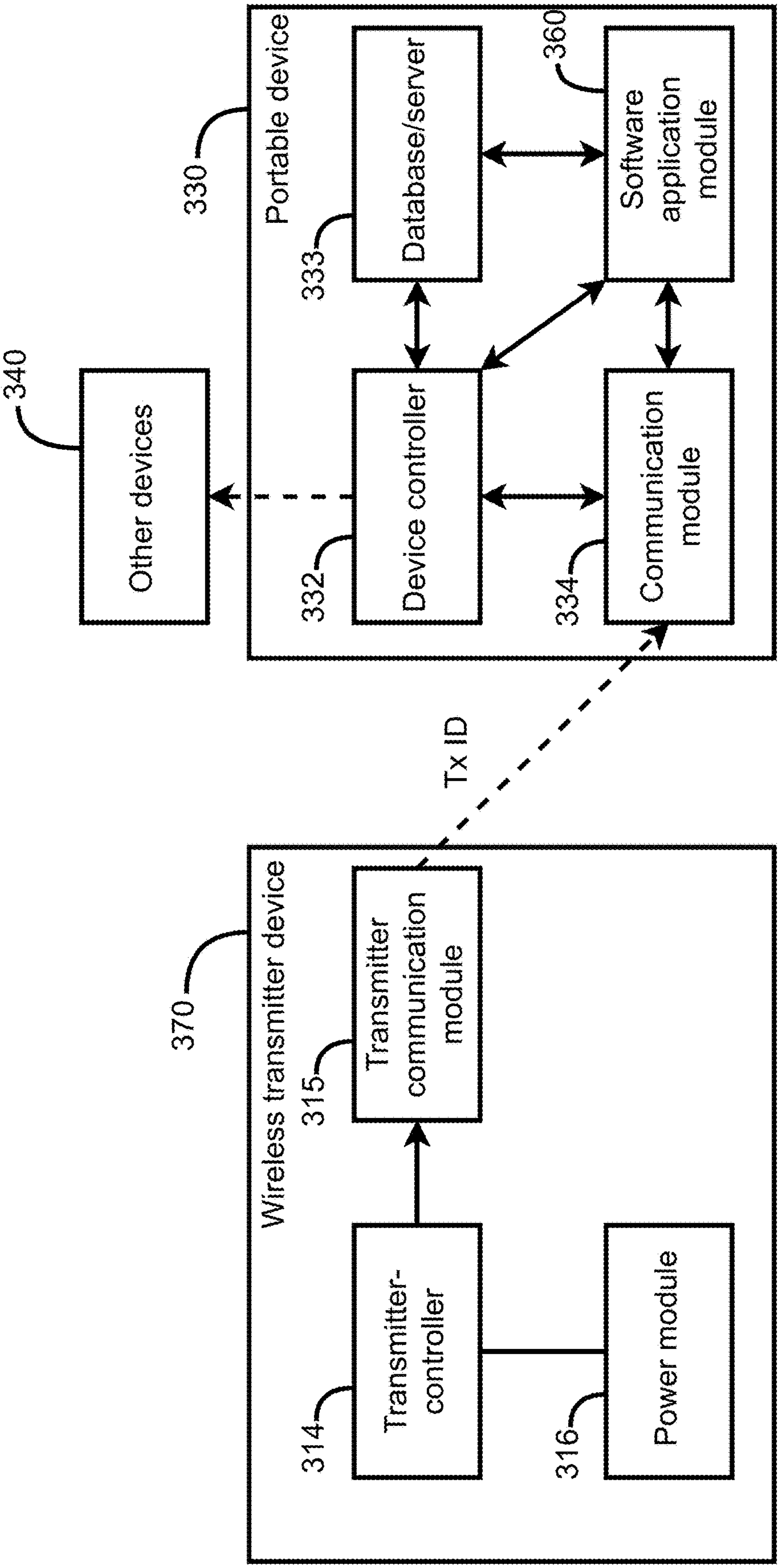
FIG. 3D is a functional block diagram of the transmitter communication device, as part of the interfacing system without charging capabilities, according to a possible embodiment.

FIG. 3C shows another exemplary method of transferring a unique identifier to the portable device 330 in order to locate this device in its environment/venue. The method described herein does not require the use of wireless charging, but only uses a wireless transmitter device, also called transmitter communication device 370. An exemplary wireless communication device 370 is illustrated in FIG. 3D. The communication device 370 comprises a transmitter controller 314 (similar to the controller 414 in FIG. 4A) and a transmitter communication module 315 (similar to the communication module 415 in FIG. 4A). The controller 314 and the communication module 315 are powered by a power module 316, for instance comprising a power connector and/or a battery. It can be appreciated that the wireless transmitter device 370 can correspond to a component or a subset of the components of the wireless-power transmitter 410 of FIG. 4A, comprising the transmitter controller 414 and the transmitter communication module 415 but not the power-transmitting antenna 413 of wireless-power transmitter 410, and also therefore that wireless-power transmitter 410 can implement any method illustrated in FIG. 3A to 3C.

Similarly to the wireless-power transmitter 110 shown in FIG. 1A, the transmitter communication device 370 may be installed under the table or workstation (150 in FIGS. 1A & 1B). The communication device 370 and the wireless-power transmitter both comprise a casing or housing that can be attached or maintained underneath or behind a workstation. In alternative embodiments, the communication device 370 and/or the wireless-power transmitter 410 are shaped and configured to stand on the workstations. By doing so, the transmitter communication device 370 is located closely to the portable device 330 destined to be used on the same table or workstation. This proximity between the portable device 330 and the transmitter communication device 370 makes the signal strength (e.g., RSSI) between them generally higher than with transmitter communication devices 370 installed on surrounding tables or workstations.

The method uses transmitter communication devices 370 positioned at different locations in a venue. In this embodiment, the transmitter communication devices 370 broadcast messages comprising their unique identifiers/identification-related information. By analogy with the methods of FIGS. 3A and 3B, these messages can be called advertisement signals, although they are being broadcast by the transmitter communication device 370 (in the embodiment of FIG. 3C) rather than by the wireless-power receiver 320 (in the embodiment of FIGS. 3A and 3B) or by the portable device 330 (in the embodiment of FIG. 3B). A software application module 360 on the portable device 330 retrieves the advertisement signals and the signal strength of each one. A set of criteria may then be used to locate in which transmitter communication device's 370 zone the portable device 330 is in.

A first criterion that may be used is the highest average signal strength (e.g., RSSI) in a given time interval, for example 15 seconds. With the transmitter communication device 370 installed under the table and therefore in proximity with the portable device 330, this criterion may often lead to accurate results.

However, in some cases, such as environments/venues with individual desks in proximity there is a need for more criteria. In such environments, it is possible, once in a while, to detect a stronger signal average from an adjacent table transmitter communication device. As an example, FIG. 5D illustrates an environment in which a number of transmitter communication devices 370 have a partially overlapping communication zones 542, 543 over which they broadcast identification-related information. This can be problematic for example in the case where external device are activated in response to a user's laptop arriving at a given working station because the external devices of the adjacent table would then be activated for a short period of time even if no one is there. To ensure this does not happen, an additional criterion may be used, in addition to the highest average signal strength, which is to use multiple time intervals to select a closest communication device (or wireless transmitter device) among the nearby wireless transmitter devices. For example, in each time interval, the software application module 360, via for example its transmitter selection submodule, finds the transmitter communication device with the highest strength signal and temporarily stores its identification-related information. To confirm the location of the portable device within the venue, and before pushing data into the database 350, the software application module 360 may for example wait for a transmitter communication device to have won two consecutive time intervals or two time intervals out of the last three time intervals. Any other numbers of time interval may be used depending on the rapidity of localization that is desired and the length of each time interval. By "winning two consecutive time intervals", it is meant that the transmitter selection submodule of the software application selects one of the nearby wireless transmitter devices having the strongest average signal over at least two or more time periods (or time intervals). The number and duration of the time periods can be configured, as will be explained in more detail below. By "nearby wireless transmitter devices", it is meant the transmitter wireless devices that are within the vicinity/range of the portable device. Nearby wireless transmitter devices are devices that transmit signals, which can include their identifier, and which can be sensed/detected by the portable device.

Additionally, all the identification-related information and their rank in terms of average signal strength in each time interval may be temporarily saved to select the closest wireless transmitter device based on more advanced criteria, using data from the latest time intervals. By "closest transmitter wireless device", it is meant the transmitter wireless device that should be paired with the portable device, and that allows associating the portable device with a specific location within the venue. In possible implementations, the closest transmitter wireless device is also the transmitter wireless device that allows the portable device to control the external devices associated with the workspace/locations in which the portable device is placed. For example, a score may be given to each transmitter communication device 370 based on their rank (based on RSSI) and the transmitter communication device 370 with the highest score in the last n time intervals is determined as the actual location of the portable device 330, where n can correspond to, e.g., 3 time intervals.

Another criterion that may be used to reduce cross-connection is to determine for each transmitter communication device 370 a minimum signal strength necessary to be even considered in the ranking of the average signal strength. This may be useful in environments where some transmitter communication devices that are associated with an individual desk or workstation are located near to a large room covered by just a few distant transmitter communication devices 370. In such environments, there may be some places where the user can use his portable device in the large room but be closer to the transmitter communication devices associated with the individual desks than the transmitter communication device associated with the large room. In this case, the minimum signal strength of the transmitter communication devices associated with the individual workstations can be chosen so anywhere on the desk the portable device 330 receives a signal with a signal strength bigger than the minimum, but anywhere further the signal is lower than the minimum. In the example of the person sitting in the large area, even if a transmitter communication device associated with the individual desk has the best average strength signal, it will not be considered in the ranking. This is also useful to limit the size of the areas where a user can be located so users are not localized when they are in zones that are not covered by transmitter communication devices.

The advantage of this method when compared to the methods described in FIG. 3A and FIG. 3B is the fact that the hardware requirements are much simpler since there is no need for wireless charging capabilities. However, the method of FIG. 3C may require more time to confirm the localization of the portable device 330.

Additional modifications to the method may be implemented through the software application module to address some challenges proper to the use of laptops and the large number of different models of laptops that exist on the market. A first modification consists of detecting when a laptop is closed so that the localization of the person logged in on this computer can be updated and the external devices 340 can return to their standby state. A desktop application, part of the software application module 360, is necessary on laptops to acquire the advertisements, but this type of application stops to run when the laptop is closed. There needs to be a way for the database 350 to receive the updated information even if the desktop application is shutdown. In a possible implementation, a web application can be used, and runs constantly. The desktop application sends a "maintain signal" at a periodic time interval to indicate it is still operating and still located at the same place. When the web application has not received data from a desktop application during more than the defined time interval, the web application detects that the laptop has been closed and can update the information relating to the portable device locations within the venue, in the database.

Another method that may be implemented via the software application module 360 in order be compatible with various portable device models is to dynamically adjust the duration of the time interval of the averaging periods used for measuring or determining the average advertisement signal strength. This implementation may be required as some portable devices, depending on their manufacturing/specifications, will require longer time than others to retrieve/detect at least one advertisement signal from each of the surrounding transmitter communication device 370. If the time interval is fixed at a too short value/duration, slower computers will be hard to detect and locate. Otherwise, if the time interval is fixed at a duration that works for the slowest portable devices, the time required for the portable device to select a closest wireless transmitter device will too long for the majority of other portable devices. Therefore, in a possible implementation, the method may comprise launching the software application module 360 with a fixed time interval/period for the measurement/determination of the signal strength, and to continuously monitor the number of lost advertisements in the n last time intervals. For example, the software application module 360 may count, for each time interval, how many of the transmitter communication devices with the X best averages in the last time interval were not received during the current time interval. A condition can be set such that, if in the last Y intervals, more than a given percentage of lost advertisements were obtained (percentage=(# of loss)/(X*Y)*100%), then the time interval for the average signal strength should be increased. Otherwise, if no advertisement were lost or only an acceptable percentage, the time interval can be decreased to accelerate the localization with this portable device.

In a preferred implementation, the transmitter selection submodule is configured such that the transmitter communication devices 370 with the X best averages are used to calculate the number of loss advertisement signals, since the transmitter communication devices with a signal strength that is too weak are more likely not to be detected for reasons unrelated to the speed of the portable devices.

With reference to FIG. 3A to 3C, in some embodiments, the software application module can directly retrieve, from the database, a unique position or location associated with the identification-related information of the wireless transmitter device, where the unique position may identify a physical position within the venue, for example a building floor and room, and a workstation row and position in the row associated to the wireless transmitter device. Based on the respective physical locations within the venue, identifications for all external devices 340 associated with these physical locations, and corresponding additional information necessary to establish a connection therewith, can be stored and accessed from the database. The additional information may include SSID of the external devices and a wireless communication type to use for specific external devices. Using the database for storing and retrieving the information associated with the external devices may allow, for example, reducing information stored in the wireless-power transmitter. This in turn reduces information exchanged between the transmitter and the receiver (or portable device) and simplifies processes such as relocating external devices or wireless-power transmitters, as there is no wired or wireless connection necessary between the external devices and the transmitters. Further, managing the associations between the external devices and the wireless-power transmitters can be performed completely independently from the wireless-power transmitter as their associations are logically created rather than physically created.

Alternatively, only a subset of identifications of the external devices 340 and corresponding additional information may be stored and accessed via the database, according for example to user preferences. The set of requests used may depend on user preferences, type of device, wireless protocol compatible with the device and other criteria. The portable device 330 may then use the identifications (Device IDs in FIGS. 3A to 3C) of the external devices 340 and corresponding additional information to automatically connect to one or more external devices 340 with appropriate wireless communication protocols. The connection process depends on the type of wireless communication protocol used by the external devices but may often include an acknowledgement message sent by the external device indicating that the connection was successful. Instructions to the external devices may then be sent based on user preferences or organization preferences. For example, upon entering a charging or vicinity zone and receiving the unique identification of the transmitter communication device or the wireless-power transmitter, a portable device, through the software application module may retrieve, in the database, identification and ways to communicate with the electrically adjustable desk associated with the transmitter. The portable device may then ask the desk to move to the preferred height of the user connected on the portable device.

Eventually, wireless-power transmitters or external devices may be moved and/or replaced from one workstation to another. The database 350 may then store non-accurate information. Different methods may be used to keep the database 350 up to date. For example, when performing a manual connection between the portable device 330 and an external device 340 not associated with the wireless-power transmitter 310 in the database 350 using the software application module 360, an update of the database 350 may be triggered. The updated database 350 will subsequently allow the software application module to automatically connect to the given external device on subsequent connection attempts at this specific position in the environment.

In possible embodiments, external devices 340 may be activated or controlled by a different device than the portable device 330 in response to someone being located at a specific place. For example, as illustrated in FIG. 3C, the software application module 360 can communicate the Device IDs and the instructions that need to be sent to each device to a gateway 380. The gateway may for example receive Wi-Fi messages addressed to specific external devices 340 from a part of the software application module 360 and translate these messages to a wireless communication protocol supported by the external device 340. Such wireless communication protocol can either be mesh communication, such as Zigbee, BLE mesh and Thread or non-mesh such as Bluetooth® and BLE. In the case of mesh communication network the gateway 380 may include a first gateway, often called the coordinator, and subsequent gateways or devices that relay the information to the right external device 340. Using a gateway 380 instead of the portable device 330 to send the instructions has a first advantage of being compatible with external devices 340 that use a wireless communication protocol not supported by the portable device. Another advantage is to reduce the power consumption of the battery in the portable device 330 by limiting the computing and wireless communications the portable device has to do. On the other hand, Gateways 380 are often devices connected in permanence to a main power outlet, so they do not require the use of a battery. This advantage is only significant in the case where the portable device does not run entirely on the portable device 330 of the user but has a delocalized portion either web-based or on a local server in the office that can communicate the Device IDs and the instructions to the gateway 380.

The database 350 may be stored on storage means, such as non-volatile memory, located on the portable device 330, on an accessible local network, or in a remote location accessible with an internet connection, according to various embodiments. For example, one or more servers comprising non-volatile memory may store the database thereon, the servers being accessible within a certain network using an internet connection. Therefore, managing the interfacing stations, wireless-power transmitters, and external devices can be performed completely remotely from those devices.

The software application module 360 further provides, as a non-limiting example, functions for wirelessly connecting to external devices 340, functions for defining user preferences, functions for allowing the user to update the database manually and other related functions. In some embodiments, the software application module 360 may further include submodules, or functions, for securing the connection between the database 350 and the devices allowed to access and/or edit the database 350. The software application module may also include functions for automatically disconnecting the wireless communication channel between the portable device 330 and external devices 340 when the portable device 330 is moved out of the zone. This may be done with or without the user approval depending on the user preferences or the organization who manages the working space for example. Additionally, some types of communication protocols need the external device to be in pairing mode in order to connect to them, as for example Bluetooth. The software application module 360 may be configured to put external devices in pairing mode before connecting to it if the software application module has the proper permissions. Further, in some embodiments, the software may additionally put an external device back in pairing mode when disconnecting them from a portable device. In other embodiments, the software application module may further include other features such as battery management.

Referring now to FIG. 4A, a functional block diagram is shown comprising a wireless powering and interfacing station, in which a portable device 430 is being charged by a wireless-power receiver 420 receiving power from a wireless-power transmitter 410 and further receiving identification-related information to automatically and wirelessly connect to external devices 440 or allow other features described in this application in the software application module 360. It will be noted that in FIG. 4A, the direction of the arrows is indicated to better explain the flow of the identification-related information between different components, but in other embodiments, or for other types of information, the communication can be bidirectional. A power source (not shown) is connected to the wireless-power transmitter 410 using a power connector 411. An input power conversion module 412, containing circuitry for conditioning an input power signal from the power connector 411 into a converted power signal, or simply power signal, is operatively connected to the power connector 411. The conversion module 412 typically includes different submodules, such as an amplification module and a module to reduce power signal reflections. Input power signal conditioning may include regulating the input power signal, amplifying the input power signal at any frequency, modifying, and matching an impedance of parts of the circuitry, for example. A power-transmitting antenna 413 is configured to emit an alternating field corresponding to the power signal going through it. The power-receiving antenna 421, comprised in the wireless-power receiver 420, receives the alternating field of the power signal, and an output power conversion module 422, comprised in the wireless-power receiver 420 and containing circuitry for converting the power signal, converts the power signal into a device-compatible power signal adapted to charge a portable device battery 431. In some embodiments wherein the wireless-power receiver 420 is external to the portable device 430, the device-compatible power signal is transferred from a power connector of the wireless-power receiver 420 connected to the portable device 430. In other embodiments in which the wireless-power receiver 420 is integrated to the portable device 430, the device-compatible power signal may be transferred using circuitry integrated in the portable device 430.

In preferred embodiments, the power-transmitting antenna 413 and the power-receiving antenna 421 are tuned to be resonant at a determined similar frequency, which may also correspond to the frequency of the converted power signal.

Further referring to FIG. 4A, the wireless-power transmitter 410 includes a transmitter-controller 414. The transmitter-controller 414 may be configured for a variety of functions such as acquiring different measurements related to the wireless-power transmitter, controlling at least partially the input power conversion module 412 and controlling a transmitter wireless communication module 415. The measurements may include DC voltage and current measurement, AC voltage and current measurement and internal temperature measurement, for example, and may be used by some of the methods and/or criteria evaluation for limiting cross-connection as previously described. The transmitter communication module 415 communicates with the receiver communication module 423 using one of various communication protocols, including, but not limited to, Wi-Fi®, Bluetooth®, and Bluetooth® Low Energy (BLE), to exchange the identification-related information, for example. The transmitter-controller 414 comprises a storage medium for storing computer-executable instructions that can be executed by the transmitter-controller to perform the functions and further for storing identification-related information or timing information, for example. Further, the transmitter wireless communication module 415 may also comprise a storage medium for storing communication-specific computer-executable instructions that can be executed by the transmitter wireless communication module.

In some embodiments, the identification-related information may alternatively be exchanged between the wireless-power transmitter 410 and the wireless-power receiver 420 using signal modulation of the power signal.

The receiver-controller 424 controls the identification-related information exchanged from or to the receiver communication module 423 and may additionally be configured for performing other functions such as acquiring measurements related to the wireless-power receiver 420 and adjusting the output power conversion module 422. Further, the receiver-controller 424 comprises a storage medium for storing computer-executable instructions that can be executed by the receiver-controller to perform the functions and further for storing identification-related information, for example. Further, the receiver wireless communication module 423 may also comprise a storage medium for storing communication-specific computer-executable instructions that can be executed by the receiver wireless communication module.

The transmitter-controller and the receiver-controller described herein may comprise, without being limited to, microcontrollers, microprocessors, and field-programmable gate arrays (FPGA). The term "controller" is meant to encompass software and hardware modules, such as chips, expansion cards, processors, or any stand-alone device, which can manage or direct communications between two entities, or which interfaces and controls data flow between devices.

As described hereinabove, in order to limit cross-connection and cross-communication, the wireless-power transmitter 410 may transmit power beacons, using the transmitter modules comprised in the wireless-power transmitter 410, and the wireless-power receiver 420 may use power received from the power beacons to activate different modules comprised in the wireless-power receiver 420 to establish a pairing and a wireless communication channel with the wireless-power transmitter 410. Further, the pairing may then be validated by a monitoring method, such as varying transmitted power, using the power-transmitting antenna 413 and verifying changes in the power received by the power-receiving antenna 421 of the wireless-power receiver 420. Other methods as previously described may be additionally or alternatively used to validate the pairing between the wireless-power receiver 420 and the wireless-power transmitter 410.

Once the wireless communication channel is established between the wireless-power transmitter 410 and the wireless-power receiver 420, the transmitter-controller 414 may request that the transmitter communication module 415 transmits a unique information signal, or identification-related information, identifying the wireless-power transmitter, for example. The receiver communication module 423 receives this signal and sends it to the receiver-controller 424. In embodiments where the wireless-power receiver 420 is external to the portable device 430, the receiver-controller 424 sends this identification-related information to the portable device 430 using either the connector used for transferring power to the portable device 430 or another data connector. A device controller 432 may then retrieve this information using a software application module and/or a driver. The identification-related information may be used by the software application module to retrieve external device information identifying external devices 440 associated to the wireless-power transmitter 410 from a database 433 and may also be used to create entries of connection in the database including information such as the wireless-power transmitter identification, a person or employee identification associated with or connected to the portable device, the time of connection and the time of disconnection. Additional information may further be retrieved from the database 433. The device controller 432 may use the external device information to automatically attempt connection, with or without user approval, with one or more of the external devices 440 identified in the database 433. Various control signals may then be sent to the external device such as activation commands or adjustment commands.

Further, the database 433 may be used to compare the user identification with reservations associated with this position. For example, if the user identification does not match a user identification associated with a reservation of the station and the current time or in the near future, a pop-up window can be displayed on the portable device to indicate to the user this information and indicate the moment at which the station will be available next. In some embodiments, the charging from the wireless-power system may stop if the software application module uses the portable device to send a control signal to the wireless-power transmitter or the wireless-power receiver using the communication paths described in FIGS. 3A and 3B. For example, information may be exchanged from the software application module to the wireless-power transmitter for stopping the power transfer to the wireless-power receiver, or to the wireless-power receiver for stopping the power transfer to the portable device.

In some embodiments, the transmitter and receiver communication modules 415 and 423 may be physically integrated with the transmitter-controller 414 and the receiver-controller 424, respectively, but they are considered separate herein to illustrate their purpose.

In possible embodiments, the wireless-power receiver 420 may be integrated to the portable device 430 and the modules comprised in the wireless-power receiver 420 may be integrated to the main circuit board of the portable device 430. In other embodiments, one or more of the modules comprised in the wireless-power receiver 420 may be located on a different circuit board while also integrated into the portable device 430, and may communicate with the rest of the portable device circuitry using wires or circuit board junction.

The method described in FIG. 3B to send the identification-related information of the wireless-power transmitter via a wireless communication channel between the wireless-power transmitter 410 and the portable device 430 is not included in this description but may be used instead of the method described herein that refers to FIG. 3A. In such embodiments, the device controller 432, including a communication module, would attempt to connect to the transmitter controller 414 to acquire its identification-related information such as its unique identifier, timing information or any other information that would confirm the unique identifier to be the one of the wireless-power transmitter 410 currently providing power to its portable device battery 431. From there, all other interactions with the database and the external devices described herein may apply.

Figure 4B:
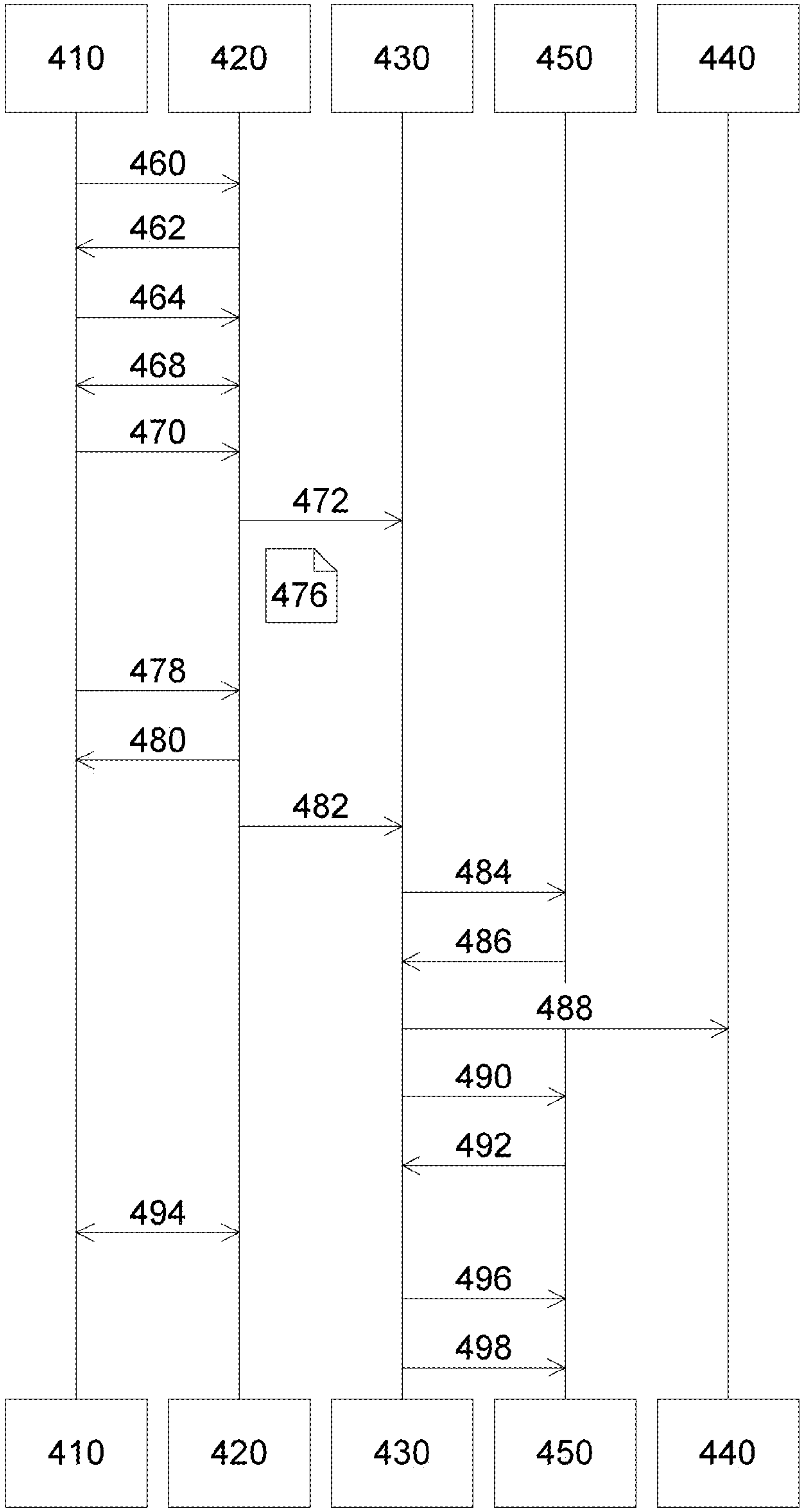
FIG. 4B is a sequence diagram of the interactions within a wireless powering and interfacing system according to a possible embodiment.
Figure 4C:
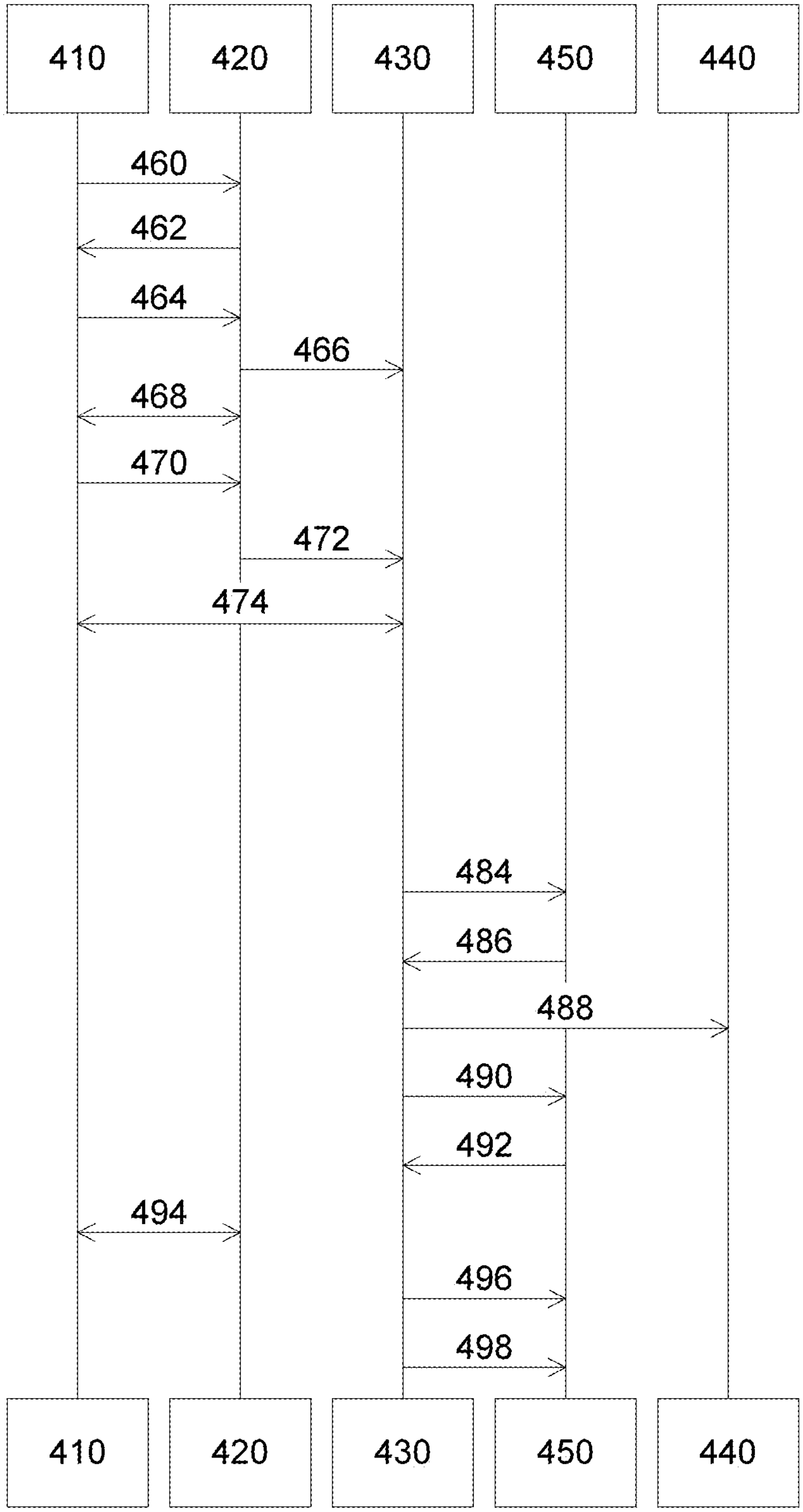
FIG. 4C is a sequence diagram of the interactions within a wireless powering and interfacing system according to another possible embodiment.
Figure 4D:
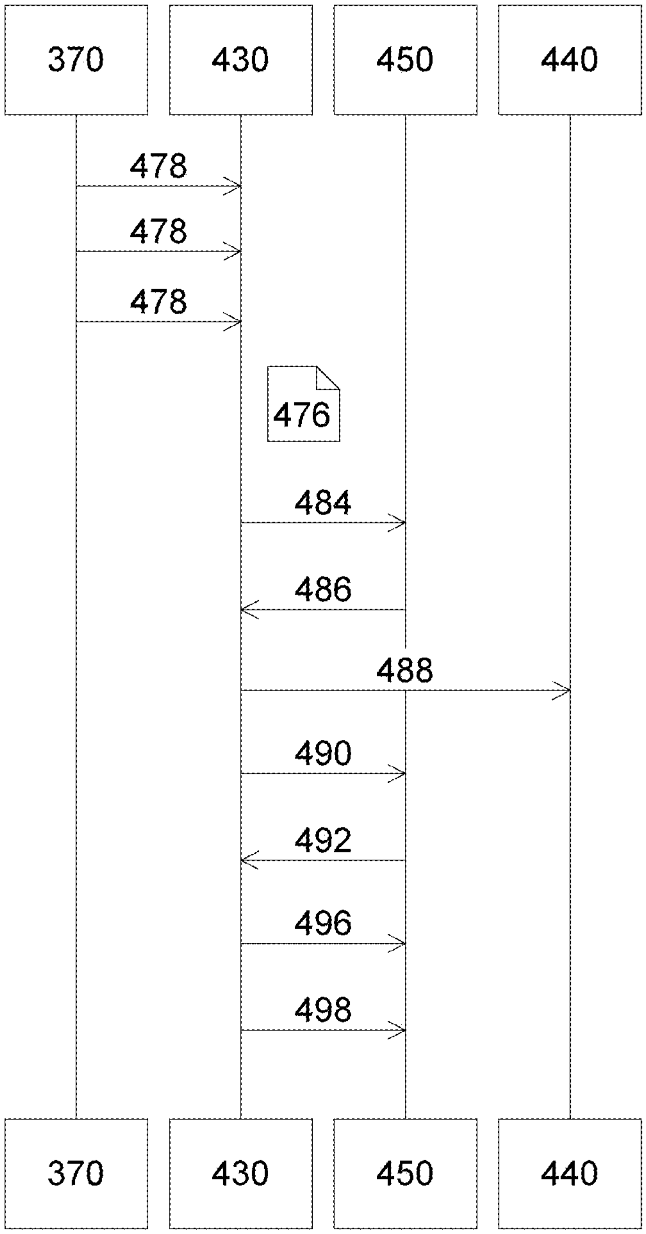
FIG. 4D is a sequence diagram of the interactions within an interfacing system without charging capabilities according to another possible embodiment.

Referring now to FIG. 4B to 4D, sequence diagrams are shown to illustrate the interactions between a wireless-power transmitter 410 or a wireless transmitter device 370, an optional wireless-power receiver 420, a portable device 430, external devices 440 and a server 450 comprising or having access to a database, according to exemplary embodiments.

Referring to FIG. 4B, an example mode of operation of a system comprising a wireless-power transmitter 410, a wireless-power receiver 420, a portable device 430, other devices 440 and a server 450 is illustrated. On a regular basis, the wireless-power transmitter 410 emits 460 a power beacon that can be detected by a transmitter detection firmware and/or software submodule of the wireless-power receiver 420 from readings on the power-receiving antenna of the wireless-power receiver. As soon as the wireless-power receiver 420 has received sufficient power to boot up, it can react by sending 462 an advertisement signal to the wireless-power transmitter 410. Upon detecting the advertisement signal, the wireless-power transmitter 410 can transmit 464 sufficient power to the wireless-power receiver 420 as to allow it to carry on its operations. The wireless-power transmitter 410 and wireless-power receiver 420 can then exchange 468 static and dynamic parameter information, such as maximum power, current voltage and current, or ideal voltage and current. Once the wireless-power transmitter 410 and wireless-power receiver 420 have agreed on charging parameters, the wireless-power transmitter 410 can increase 470 the power sent to the wireless-power receiver 420, a part of which is transmitted 472 to the portable device 430.

At one point during this process, the wireless-power receiver 420 can validate 476 a pairing with exactly one wireless-power transmitter 410 by a transmitter selection firmware and/or software submodule, for instance using the criteria described in detail above with respect to FIG. 3A. Once the pairing is validated, the wireless-power transmitter 410 transmits 478 identification-related information, which is acknowledged 480 and forwarded 482 to the portable device 430 by the wireless-power receiver 420. A registration software submodule operating on the portable device 430 can then transmit 484 an arrival message to the server 450 along with the wireless-power transmitter 410 identifier, indicating that the portable device 430 and the user that has logged on the software module running on the portable device 430 through its login software submodule is now located within the charging zone of the wireless-power transmitter 410. The server can then store this information along with an arrival timestamp in the database and transmit 486 back information about the external devices 440 that are associated with the location of the user. This information can be used by the portable device 430 to control 488 settings of the external devices 440 by an external device control submodule, either manually by the user or by applying preferences saved on the portable device 430 or in the database of the server 450.

The user of the portable device 430 can also, by a centralized control software submodule, send 490 a request for information to the server 450, for instance using an HTTP request, to which the server can respond by serving 492 the requested information, for instance using an HTTP reply. Information that can be requested can for instance include usage statistics about the venue, one or a group of users and/or one or a group of portable devices, the location of one, many or all users within the venue, and/or occupancy rates of the venue, locations within the venue, one or a group of users and/or one or a group of portable devices. The user of the portable device 430 can also, for instance, send 490 a request for reserve a location within the venue, to which the server can respond by serving 492 a confirmation of whether the reservation was successfully made.

The registration submodule operating on the portable device 430 can transmit 496 to the server 450 on a regular basis, for instance every minute, a maintain message, or a keepalive message, indicating that the portable device 430 is still operating at the same location. Upon not receiving a certain number of expected such messages, for instance two in a row, the server 450 can enter in the database an indication that the portable device 430 was probably closed without properly signing off, along with a closing timestamp. Additionally or alternatively, the wireless-power transmitter 410 and the wireless-power receiver 420 can vary and confirm 494 power parameters on a regular basis, for instance by implementing the pairing monitoring methods described in detail above. Finally, if the portable device 430 is moved in such a way that the closest wireless-power transmitter 410 changes or that there are no nearby wireless-power transmitter 410 detected by the transmitting detection submodule anymore, the registration submodule can transmit 498 an indication to the server 450 indicating that the user has changed location within the venue or that the user has departed the venue, which the server can store in the database along with, respectively, a new arrival or a departure timestamp.

Referring to FIG. 4C, another example mode of operation of a system comprising a wireless-power transmitter 410, a wireless-power receiver 420, a portable device 430, other devices 440 and a server 450 is illustrated. As described above with respect to FIG. 4B, the wireless-power transmitter 410 emits 460 a power beacon, which can be detected by the wireless-power receiver 420, which can react by sending 462 an advertisement signal to the wireless-power transmitter 410, which can cause the wireless-power transmitter 410 to transmit 464 sufficient power to the wireless-power receiver 420 as to allow it to begin operations, at which time it commits the precise time to its memory, for instance using a timestamp in milliseconds. Upon starting to receive this power, the wireless-power receiver 420 immediately sends 466 a signal to the portable device 430, which commits the precise time at which the signal was received to its memory. The wireless-power transmitter 410 and wireless-power receiver 420 can then exchange 468 parameter information, after which the wireless-power transmitter 410 can increase 470 the power sent to the wireless-power receiver 420 and again commit the precise time to its memory, a part of which is immediately transmitted 472 to the portable device 430, which also commits to memory the precise time at which the power started being received.

The wireless-power transmitter 410 and the portable device 430 can then establish a direct wireless communication link, for instance using BLE, and exchange 474 the timing information that was committed to memory by both as well as the identifier. The transmitter selection module can then compare the time at which the wireless-power transmitter 410 and the portable device 430 measured steps 464/466, 470/472 and 474 occurring. If the time difference as measures by both devices is below a threshold and/or is smallest than the time difference measured as by the portable device 430 and all the wireless-power transmitters for which a communication link was established, the transmitter selection module can validate the pairing with the wireless-power transmitter 410. One benefit of the wireless-power transmitter 410 and the portable device 430 communicating directly in step 474 of this method is avoiding using the intermediary wireless-power receiver 420 to route information in steps 478 to 482. Once the pairing is validated, steps 484 to 498 as described above can be performed.

Referring to FIG. 4D, an example mode of operation of a system comprising a wireless transmitter device 370, a portable device 430, other devices 440 and a server 450 is illustrated. In this mode of operation, the wireless transmitter device 370 repeatedly broadcast 478 its identification-related information such that it is detectable by a transmitter detection software submodule operating on the portable device 430 using a communication device of the portable device 430. The transmitter detection submodule detects all such broadcasts 478 during a time period having a set duration, for instance initially 20 seconds. If the transmitter detection submodule detects that a number of expected broadcasts 478 was missed, the set duration can be increased. Information about each detected broadcast 478, for instance including the signal strength, can be passed on to a transmitter selection software submodule also operating on the portable device, which selects 476 the best signal to determine the identification-related information of the nearest transmitter, for instance by averaging the signal strength of each detected broadcast from each detected transmitter. In some embodiments, the transmitter selection submodule waits over more than one time period, and can for instance select the transmitter having the best signal over a configurable proportion of the time periods, for instance at least two out of three time periods. In some embodiments, the transmitter selection submodule does not select a transmitter that is associated with an average signal strength below a configurable threshold. Once the nearest transmitter is selected, steps 484 to 492 and 496 to 498 as described above can be performed.

Figure 5A:
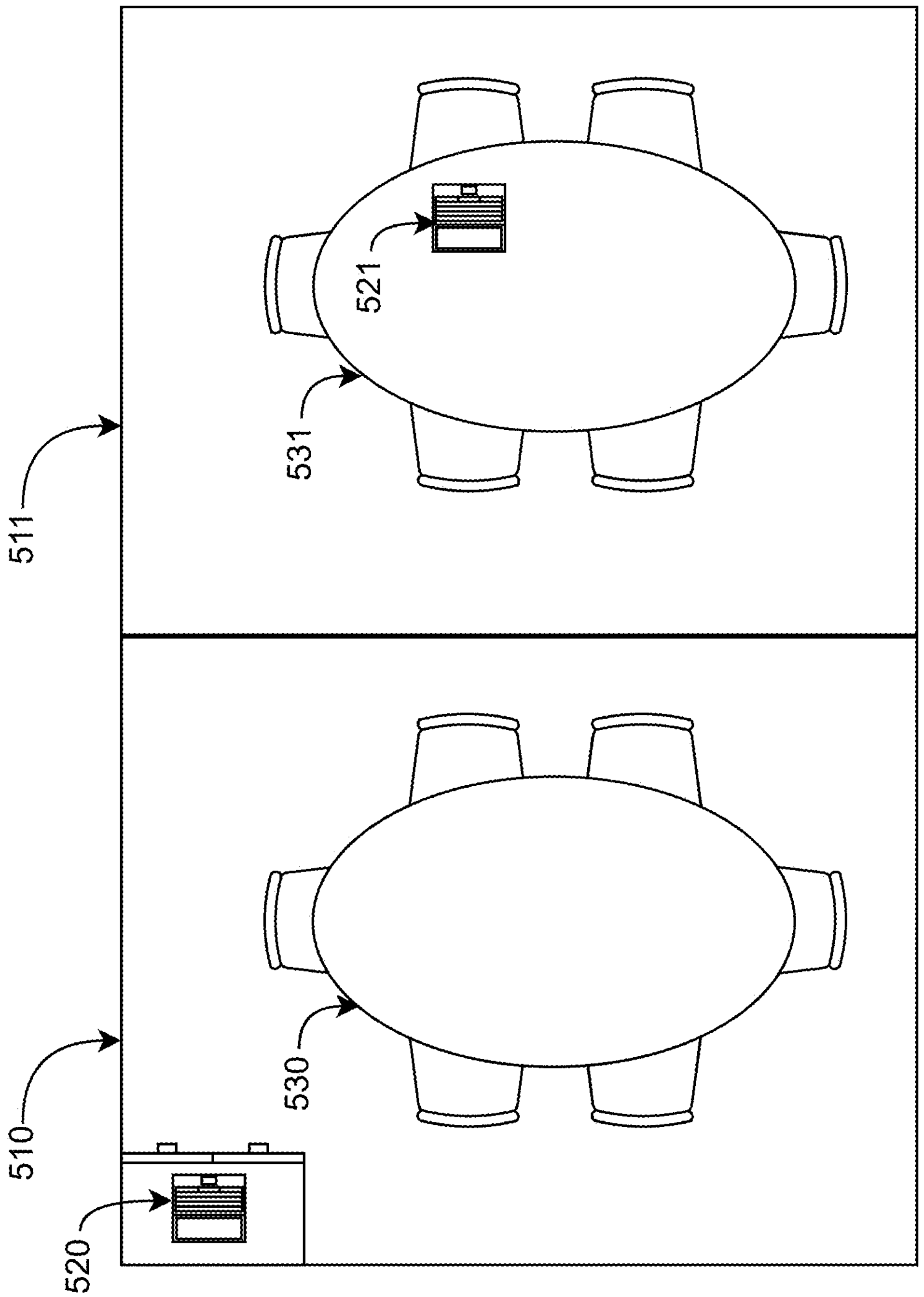
FIG. 5A an illustration showing locations within a venue wherein the methods and systems described herein can be implemented.

FIG. 5A shows an exemplary environment in which the system and methods described herein can be deployed or used. A first and second meeting rooms 510 and 511 are located next to another in a working environment, such as an office building. Under the first meeting room table 530 and the second meeting room table 531 are installed one or more transmitter devices to create charging or vicinity zones for portable devices of people attending meetings or using the meeting rooms. In this example, a person is using a portable device 521 in the second meeting room. When this person enters the charging zone of a wireless-power transmitter or the vicinity of the transmitter communication device, one of the processes described in FIG. 3A to 3C are used to send the identification-related information of the wireless-power transmitter or transmitter communication device to the portable device 521. Using a software application module or other similar methods the portable device 521 may retrieve this identifier and interact with a local database and/or an organizational database to allow a plurality of features.

A first feature that may be used in this example is to use the database to identify which meeting room the transmitter device, and thus the portable device, are located in. This information can then allow to search all wirelessly controllable external devices or systems associated with this meeting rooms. Such external devices or systems may for example be the local lighting systems, the local heating/cooling system, electrical blinds on windows and also audio and visual devices like a TV, a projector, speakers and microphones. Once these devices are identified, the portable device may save this information and automatically attempt to wireless connect to some or all of these devices. Once the connection is established, various controls can be sent depending on the type of device and the preferences previously set. Controls may be as simple as on/off activation or may also be more complex like activating only some components/features of the external device. For example, for a local lighting system, only partial lighting may stay activated when nobody is located in the meeting room, but full lighting may be activated once a portable device enters a charging zone, retrieves the lighting system identification and connects to it. Electronically dimmed lights may allow more precise control such as changing the lighting intensity to 50%. The software application may require a login/sign-in in order to have the user identification and preferences.

One of the advantages of the system and methods described herein is acquisition of the precise location of the portable device 521. Since all the wireless-power transmitters and/or transmitter communication devices in the second meeting room 511 are associated with this meeting room, only the devices and systems in this meeting room are controlled, and none of other meeting rooms, like first meeting room 511. Furthermore, there is no need for manually managing wireless connections to one or more different devices. As the association between the external devices and the transmitter devices is stored in the database, replacing a wireless-power transmitter is facilitated and only necessitates modifying the information associated with the transmitted in the database.

Other features include adding information in the database for occupancy data gathering such as the transmitter device ID, the time of connection, the user identifier and the time of disconnection. This allows for example to see in real time which meeting rooms are occupied by an active user or where a specific user is located in the workspace. This information can be displayed in a software application module interface in the form of a map of the floor with a colour map or simply a list showing which rooms are currently occupied. This occupation status may then be compared to the reservation status to see if the room is actually used when it is reserved. The time at which the portable device quits the charging or vicinity zone may also be noted in the database. This can later allow managers to see the occupancy rate of all their meeting rooms equipped with wireless-power transmitters and much more information by cross-referencing with other data. For example, managers could obtain a report showing the occupancy rate of meeting rooms depending on their capacity (4 places, 6 places, 8 places) or their position in the workspace.

In some embodiments, portable devices that are not within a charging zone of a specific wireless-power transmitter or a vicinity of a transmitter communication device, may still be recognized by transmitters in proximity with signal characteristics between them like RSSI or latency. For example, portable device 520 in the first meeting room 510 may still be located in this meeting room using one or more signal characteristics with many transmitters near it. The more transmitters are used for localizing the portable device, the better the localization may be. Once this identification is complete, all features previously described may be used.

In some embodiments, the portable device 521 in a charging or vicinity zone or portable device 520 may be inactive, which would suggest that nobody is currently in the room. In this case, some organizations can set preferences according to which the software application module or a part of it, like a plug-in program, controls the devices and systems in the room to return to their default state. For example, when a portable device becomes inactive for a few minutes or one hour, the lighting system may close or return to lower intensity.

Meeting rooms are often used to receive clients. When clients arrive for the first time in a workspace, they often do not have the Wi-Fi information. Using one of the methods described to send the wireless-power transmitter identification information, the guest Wi-Fi name and password may also be sent using the same communication channel. So, when a client arrives in a meeting room, it may use a wireless-power receiver, either external or integrated into its device to automatically start charging and connect to the guest Wi-Fi.

In a pandemic context, the precise localization offered by the invention can also be useful when someone who visited an environment gets a positive test. The organization may then notify other persons who were at some point near or in the same room as the infected person. In many cases, the organization may notify everyone in the building, but it may also use the location information to notify only people that were in the vicinity of the infected person, such as for example every person that used a station in a given radius of the station associated with the infected person.

Figure 5B:
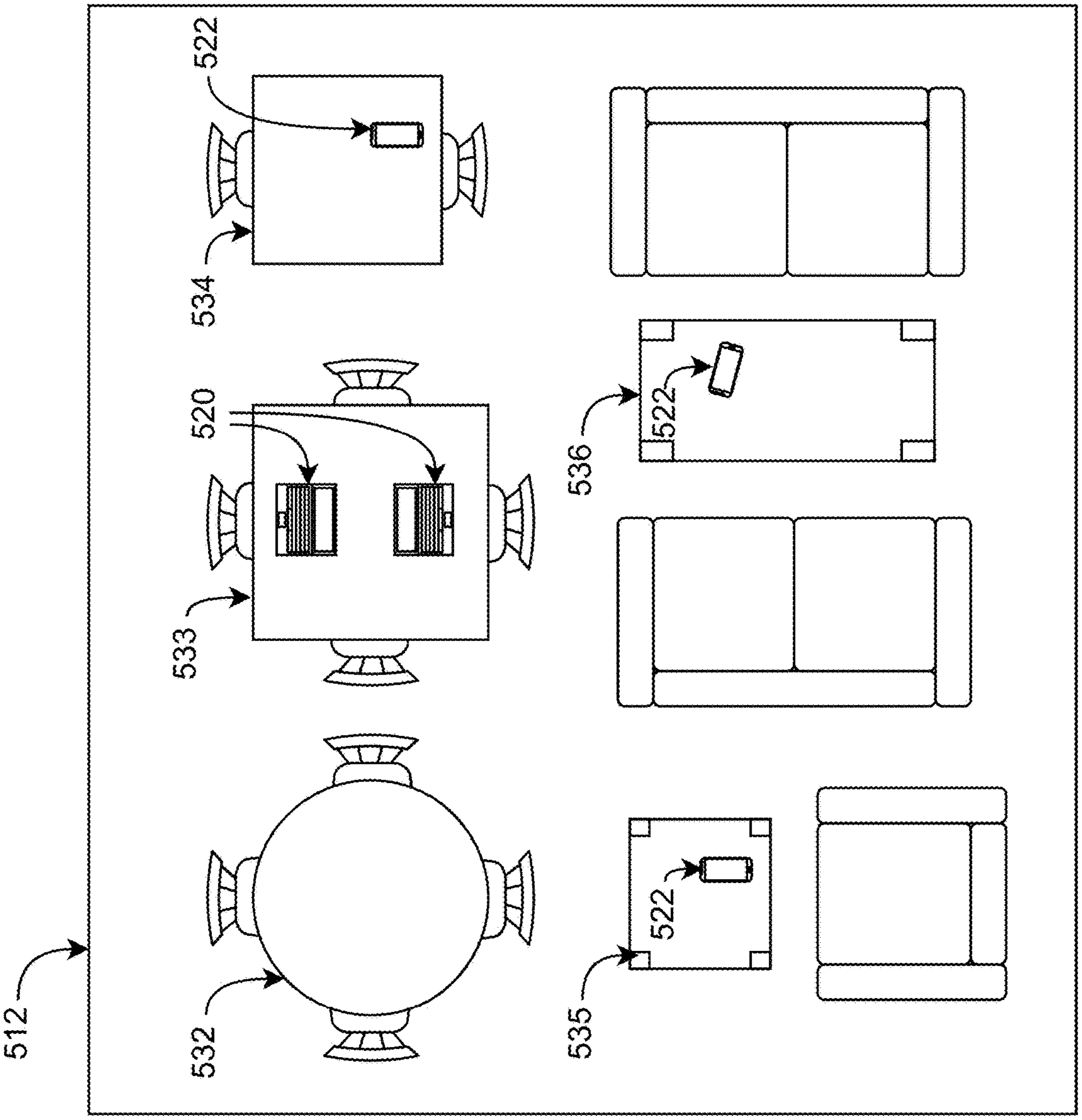
FIG. 5B is an illustration showing another venue wherein the methods and systems described herein can be implemented.

FIG. 5B shows another environment or venue 512 in which the system and methods described may be used, such as a coffee shop or a restaurant. Similar to the descriptions of FIG. 5A, the portable device can be precisely located in the environment using the system and methods described herein. Portable devices may be portable computers 520 or smart phones 522, or any other personal devices, as long as a software application module which can retrieve the transmitter identification-related information and can interact with the associated database is installed. In this case, the transmitter identification information may first identify in which shop the client is located in order to access the associated database. The entries in the database may include the client identification, the transmitter identification and/or the positions associated with it, the time of connection and the time of disconnection (when the user will leave the charging zone). These entries create useful data showing precisely where people are in the environment and for how long.

In this exemplary environment, local devices and systems may not be controllable by the clients, but the invention still allows to gather data on the occupancy of the environment. For example, managers can acquire the average time a client spends at a specific table, type of table or generally in its store. It may also acquire the occupancy at a given time, as a function of the moment of the day, moment of the week and much more. It can then help management take decisions on furniture such as table choices, where to put the tables, how many tables to make available. It can also help identify which feature of the environment people seem to prefer such as the presence of windows, more isolated places, more comfortable seating options, and more, by analyzing which stations attract a bigger number of people or which stations have a bigger time average, for example. To do what is described here, the position associated with the wireless-power transmitter identification-related information also needs to be associated with complementary information such as the table model and environment characteristics. In FIG. 5B, a few table models and associated seating options 532 to 536 are shown. With all the information gathered, managers can make better adjustments to their environments or choose better location for other shops. The occupancy information acquired with the methods described may also be used by managers to make better decision regarding shift schedules especially in shops with service offered to the tables.

In some embodiments, shops may want to charge users for the time spent wirelessly charging. The system and methods described herein allow for such an option as the time of connection and the time of disconnection for each user can be known. It could also create a client profile and identify at which moment this client usually visits this shop. It could then help send notification at specific moments to suggest promotions or invite the client to come at the location. The client may also consult the occupancy information to identify if his favourite table is currently available. In some embodiments, the shops may allow a client to reserve the table he wants.

As described in FIG. 5A, Wi-Fi information may also be sent to the clients' portable devices using the same method as the one used for exchanging the wireless-power transmitter identification-related information.

In coffee shops or any other public places such as university campuses, users can allow sharing of their location based on which wireless-power transmitter charging zone they are connected to or based on RSSI and triangulation methods. In some embodiments they may also select which users can access their precise location or which cannot.

Figure 5C:
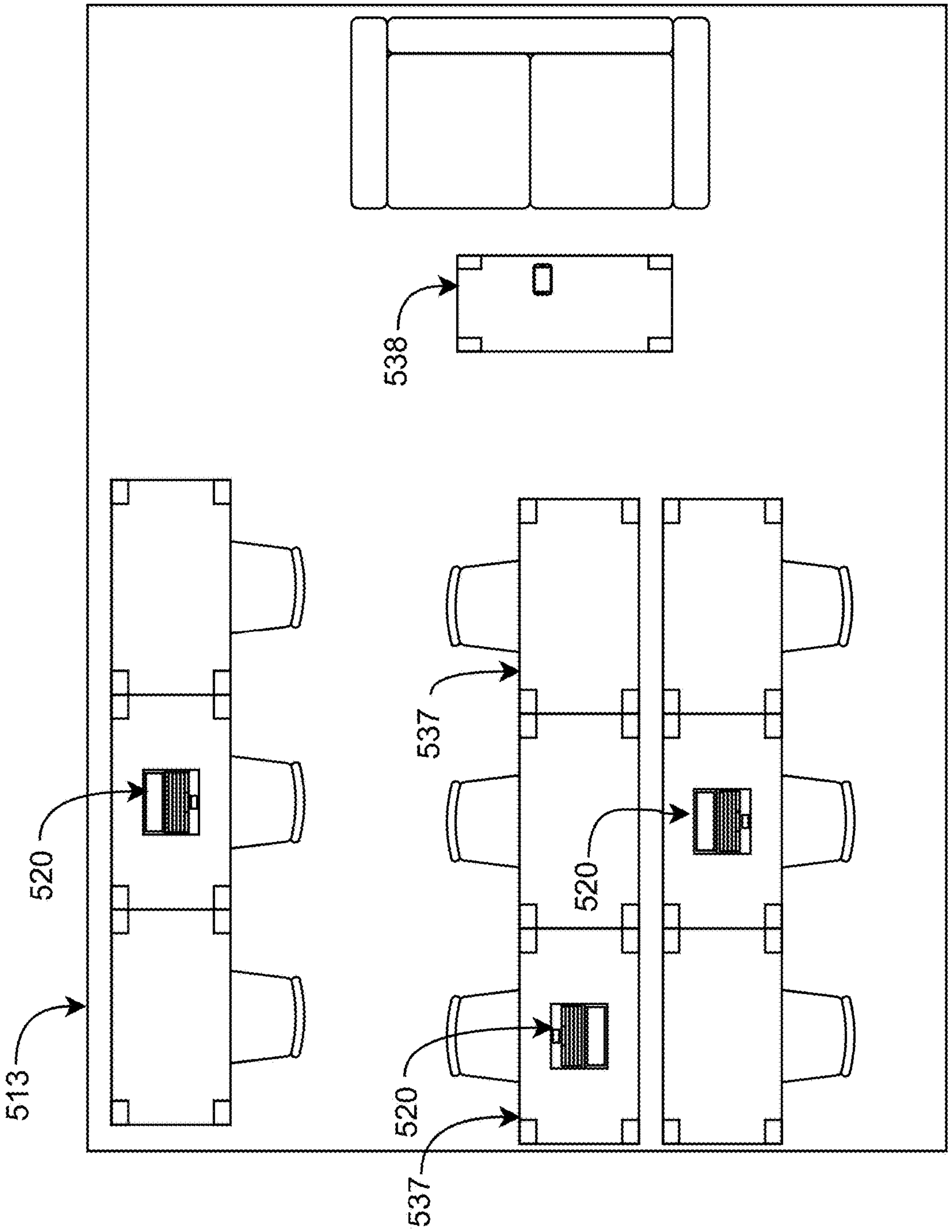
FIG. 5C is an illustration showing another environment or venue wherein the methods and systems described herein can be implemented.
Figure 5D:
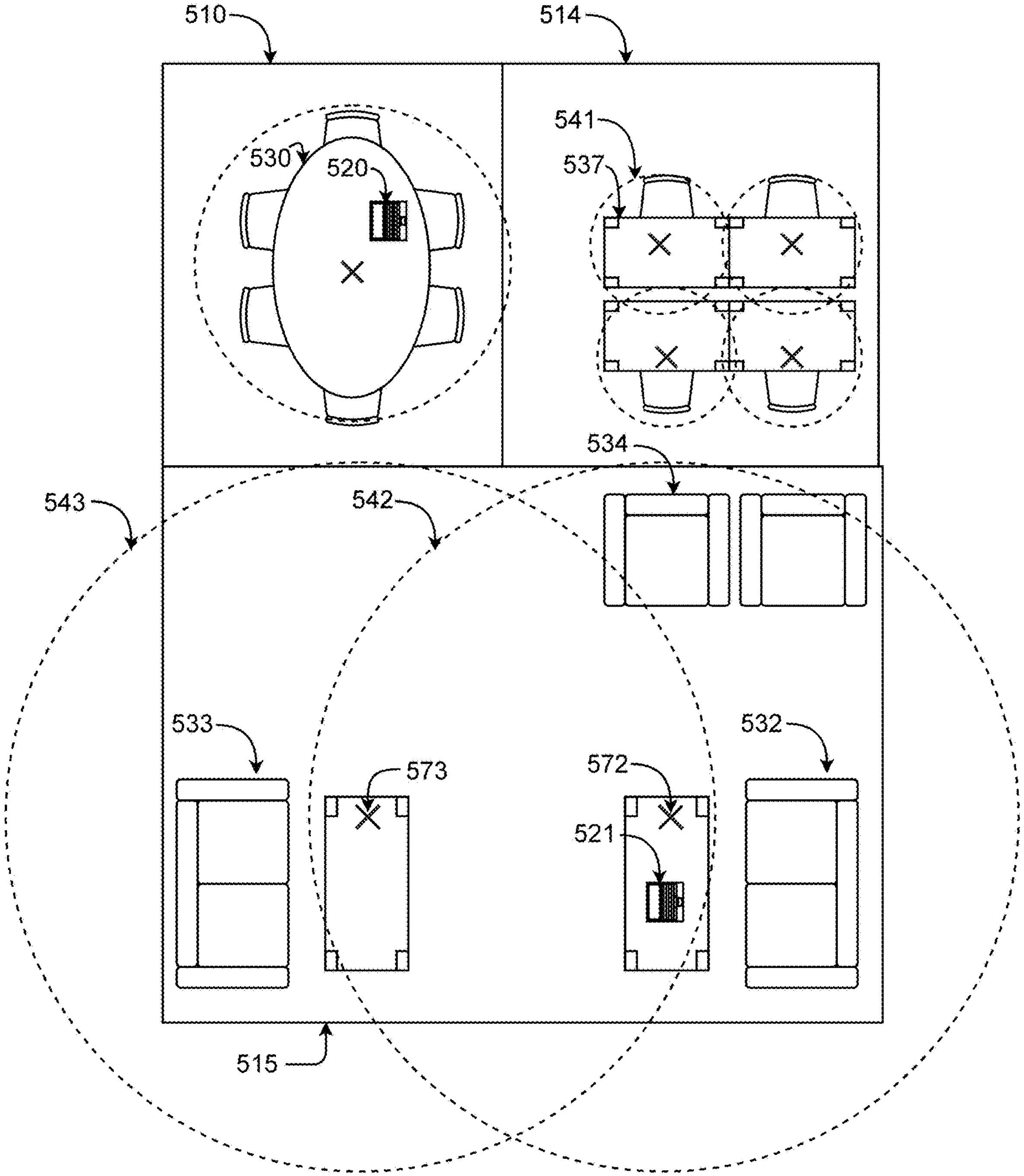
FIG. 5D is an illustration showing yet another environment or venue wherein the methods and systems described herein can be implemented.

FIG. 5C shows another exemplary environment in which the invention and methods described may be used. Similar methods as the ones described in FIG. 5A may be useful in a workspace environment with many desks and workstations in a same room 513 that can be reserved and used by anyone. In these environments, employees can work at different places every day and work near the people they want, thereby enhancing collaboration. However, workstations may need adjustments every time an employee wants to use it, such as the height of the desk, the adjustments of the chair, the lighting controls and also local heating/ventilation systems controls. The system and methods described herein allow the portable device to locate itself precisely at the workstation and control wirelessly some external devices and systems associated with user preferences or last parameters used. When a portable device 520 enters the charging zone of a wireless-power transmitter or the vicinity of a transmitter communication device installed on one of the workstations 537, the wireless-power transmitter may send its identification-related information to the portable device 520. The portable device 520 may retrieve this information with a software application module and use it to interact with a database and offer various features to the employees or the managers coming from the precise localization this invention allows.

FIG. 5D shows yet another exemplary environment in which the system and methods described may be used. This exemplary environment includes a meeting room 510, a second room 514 comprising a number of traditional workstations 537, and a foyer 515 comprising a number of seating options 532 to 534. A table 530 in the meeting room 510 and each workstation 537 may comprise one or more transmitters to create charging or vicinity zones 541 for portable devices of people using the meeting room or working at one of the workstations, as described in FIGS. 5A and 5C. For instance, a person in meeting room 510 may have their device 520 paired with a transmitter under table 530. In the example, the foyer 515 is provided with many non-traditional seating options 532-534 and not as many tables, reducing the number of transmitters that can be installed, and therefore requiring each transmitter 572, 573 to have larger zones 542, 543 in order to encompass all the seating options. It can be appreciated that zones 541-543 may partially overlap and that, as is the case for the large foyer 515 with few transmitters, the overlap may be substantial. As a consequence, a user device 521 may be included within two zones 542, 543. The pairing and/or transmitter selection processes described in FIG. 3A to 3C can be used to allow for more precision in locating the device 521. In this example, the transmitter detection submodule of device 521 would detect at least transmitters 572 and 573 as nearby transmitters and therefore would need the transmitter selection submodule to use the process of one of FIG. 3A to 3C in order to correctly select 572 as the closest transmitter.

As described in FIG. 5A, the transmitter identification-related information can be used to identify associated devices or systems controllable wirelessly. For example, the workstations 537 could be electrically adjustable desks that are wirelessly controllable. In some embodiments, users can set their preferred height for these desks in the user interface of the software application module and save it in the database. The software application module may also save locally the last parameters used for each type of device or save it in the database. Some work environments may also offer other types of devices such as digital photo frame. When an employee enters the charging zone of a workstation, the transmitter ID received and the database may allow the portable device to communicate to the frame and ask to show one or more pictures that the employee chose. This type of device and others like local lighting systems or local heating/ventilation systems may be deactivated when a user quits the charging zone of the wireless-power transmitter. Office pods are a great example of work environment with local systems that could be easily controlled by the portable device with this invention, such as local heating/cooling systems, lighting systems, audio systems.

As described in FIG. 5A, managers may also have useful features from data gathered using the methods described herein. With entries in the database containing the employee identification, the transmitter identification, the time the portable device entered the zone and the time it exited the zone, the system provides managers with useful information on the occupancy of their workspace, the type of workstation that are more used, and the use of non-traditional places like 538 to help improve the environment and their use of space. It can also help track an employee and identify how long they worked in different places. It can also give insight on the occupancy for different days of the week to see if they can let people choose which day they want to come, or if the managers should decide.

Other types of environments than the ones described in FIG. 5A to 5D may benefit from the same features described here, such as universities, cafeteria, shared workspaces, airports, bus and train stations, and much more.

Figure 6:
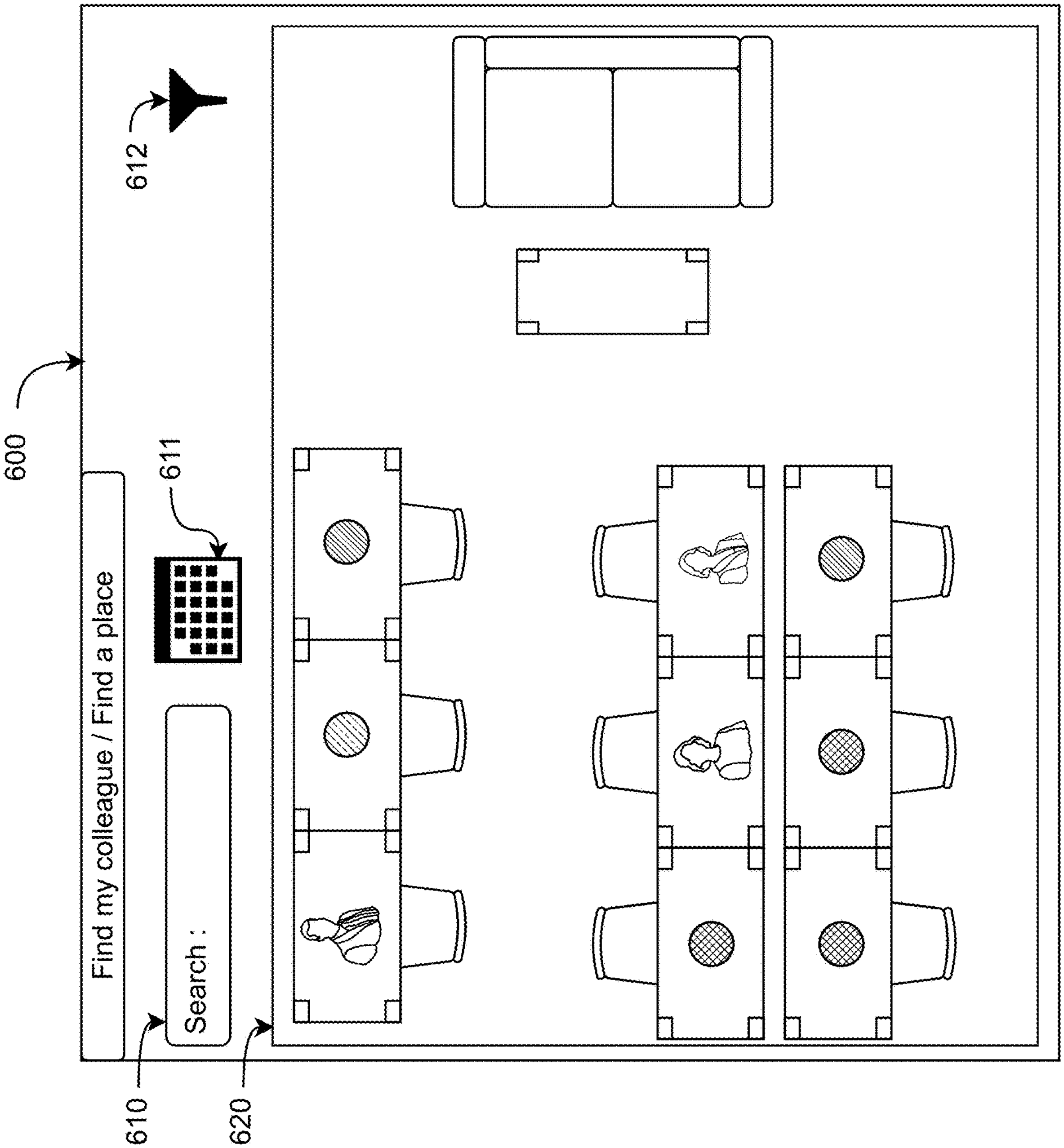
FIG. 6 is schematic illustration of a page or pane of a graphical user interface, according to a possible embodiment.

FIG. 6 shows another exemplary feature that benefits from the precise localization of people in their environment, which is the reservation of places and a way to find your colleague in a work environment with no assigned desks. FIG. 6 shows an exemplary user interface 600 in the software application module to help find colleagues in a workspace or to find available places to work. A search bar 610 may be included to enter the name of a colleague. When a user enters an employee's name in the search bar, the database can be interrogated to see if this employee has an active connection (still in a wireless charging zone) with a transmitter and if so, where is located this transmitter. The results would then appear in the result window of the user interface 620. An exemplary result window is shown which would show for a part or the entirety of the workspace the people currently in a charging or vicinity zone. This may include, for example, their picture or their name displayed on the associated workstation. In other embodiments, results may be displayed in a list. The interface may also show where employees were last connected and the time since their last disconnection if they are not currently in an active connection (not in a wireless charging zone of a wireless-power transmitter or in a vicinity of a transmitter communication device). The graphical user interface is thus configured to display respective positions within the venue of at least some of the users.

In some embodiments, some employees may have the option not to show their name or their picture. In this case, a red circle or another pictogram may be used to indicate that the workstation is currently used by someone without telling who it is. The result window 620 can be useful to help employees find available places without needing to physically move to this location and search available places. Other colours or pictograms may be used to indicate other information. For example, yellow circles may be used to indicate a reserved but non-occupied workstation. Green may for example be non-reserved and non-occupied places.

Other tools may be included in the user interface 600. For example, a filter section 612 may allow the user to search for non-occupied places that include specific devices or systems. For example, a user may only want to search workstations with an electrically adjustable desk. The filter section 612 may also be used to only show a specific group of colleagues in the interface, such as an engineering team. The calendar section 611 is included to show that the same interface that can help find a colleague or a place to work in real time can also allow for the reservation of a working station at a future time. When trying to reserve a station, the filter 612 may also be used to filter for specific external devices, and employees having already reserved a place may be shown to help the user choose a place close to another place reserved by a colleague, so as to help collaboration with some colleagues. Once a reservation is made, a new entry is created in the database as described in FIG. 11.

The user interface is only shown as an example. There are many ways to create an interface with similar features and similar ways to use the localization methods described herein to obtain similar features regarding the localization of colleagues and available workstations.

Figure 7:
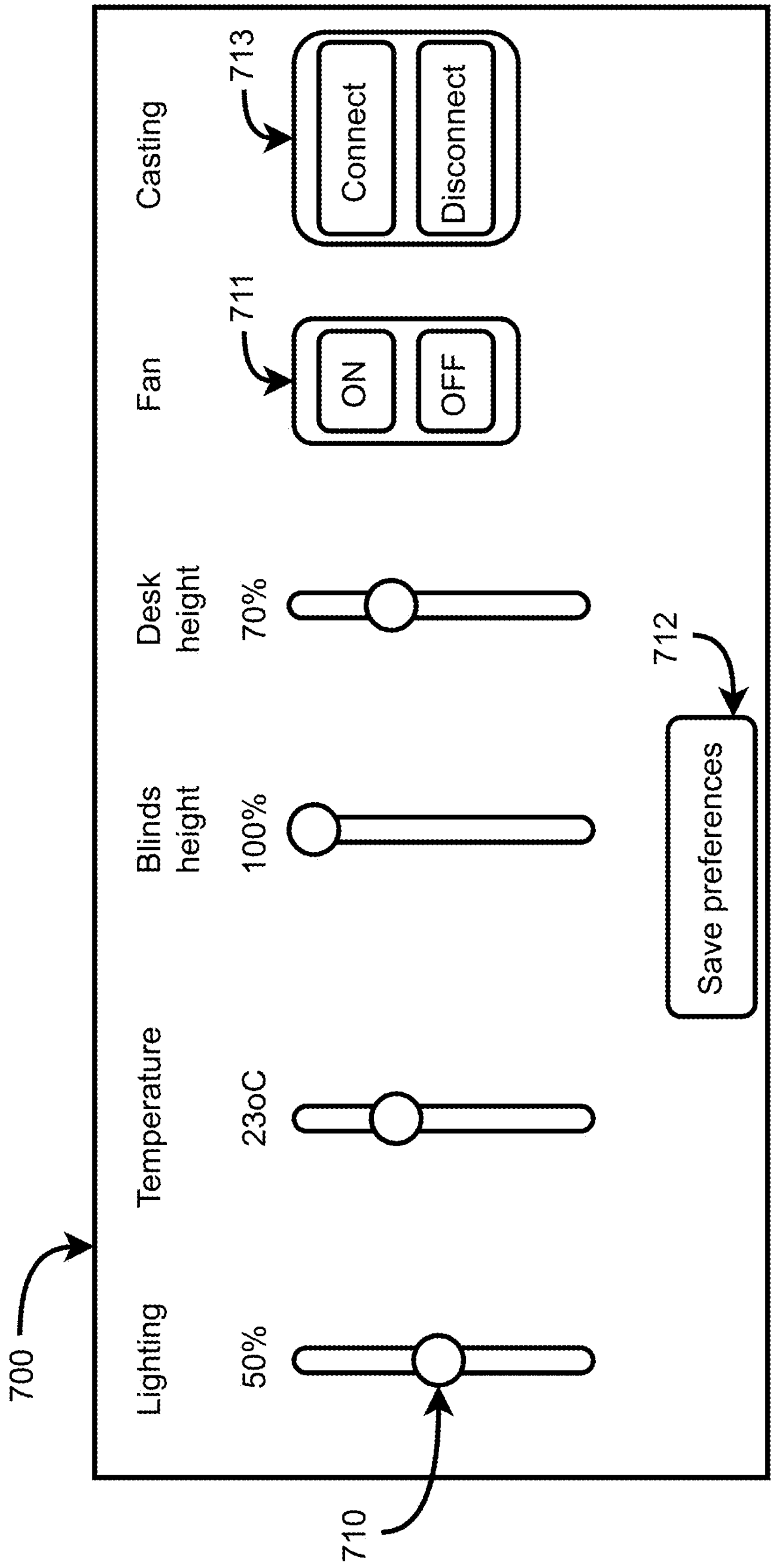
FIG. 7 is schematic illustration of another page or pane of the graphical user interface, according to a possible embodiment.

FIG. 7 shows another exemplary user interface in a software application module that offers a centralized control of all the external devices and systems associated with the position of the user and its portable device in an environment. The user interface 700 includes ways for the user to control various devices and systems such as sliders 710 and on/off activation buttons 711. The type of control may depend on the type of device and what the wireless communication controls allow. The software application module, which may be installed on the portable device of a user, may have locally stored the preferences of the user for each type of devices and systems to control. It may also request these preferences in a web-based database. Once this information is retrieved, the software application module can establish a wireless communication channel with each device or use the one already established and send the control parameters to adjust and/or control the external devices. The user may also manually change the parameters using the user interface to adjust the external devices. In such a case, or whenever there is a change in the controls on the user interface, the software application module communicates with the associated device and sends a new control parameter to adjust.

In some embodiments where user preferences are saved in a database with regard to the user preferred controls for various types of devices, a "save preferences" button 712 may be included in the user interface 700. This button may appear greyed out when the user did not manually change controls and appear ungreyed out when a change was made. The user may then decide to push on the "save preferences" button to save the current parameters in a database and have the plug-in retrieve these parameters next time his portable device enters any charging zones or this specific charging zone.

One of the advantages of the system and methods described herein is its capacity to precisely locate, in the environment, any portable device and/or associated user connected with a transmitter or located in an environment comprising multiple transmitters, and the identification of only the relevant devices and systems associated with this position using a database. Using the system described herein, the external devices are controllable without having to search through long lists containing all the devices within communication reach, which can include a lot of workstations and rooms. Therefore, an added advantage of the system and methods described herein is an increased efficiency in getting installed at a workstation.

In the case of a meeting room, the identification-related information of many transmitters may point to the same external devices in the database. In this case, the organization may allow every portable device connected to one of those transmitters to control the devices and systems or alternatively just the portable device of the user who reserved the room. Also, there may be ways to cast to a TV, projector or another device to display content. Connect/disconnect buttons 713 can allow multiple users in the meeting room to start casting or stop casting easily using the user interface. This allows for more dynamic and efficient meetings where people do not need to exchange HDMI wires to one another or search through long lists of casting devices before connecting to the right one, increasing the efficiency of such meetings.

In exemplary embodiments, the user interface according to any embodiment described herein may be included in a plug-in application module and always run as a background process once activated.

Figure 8:
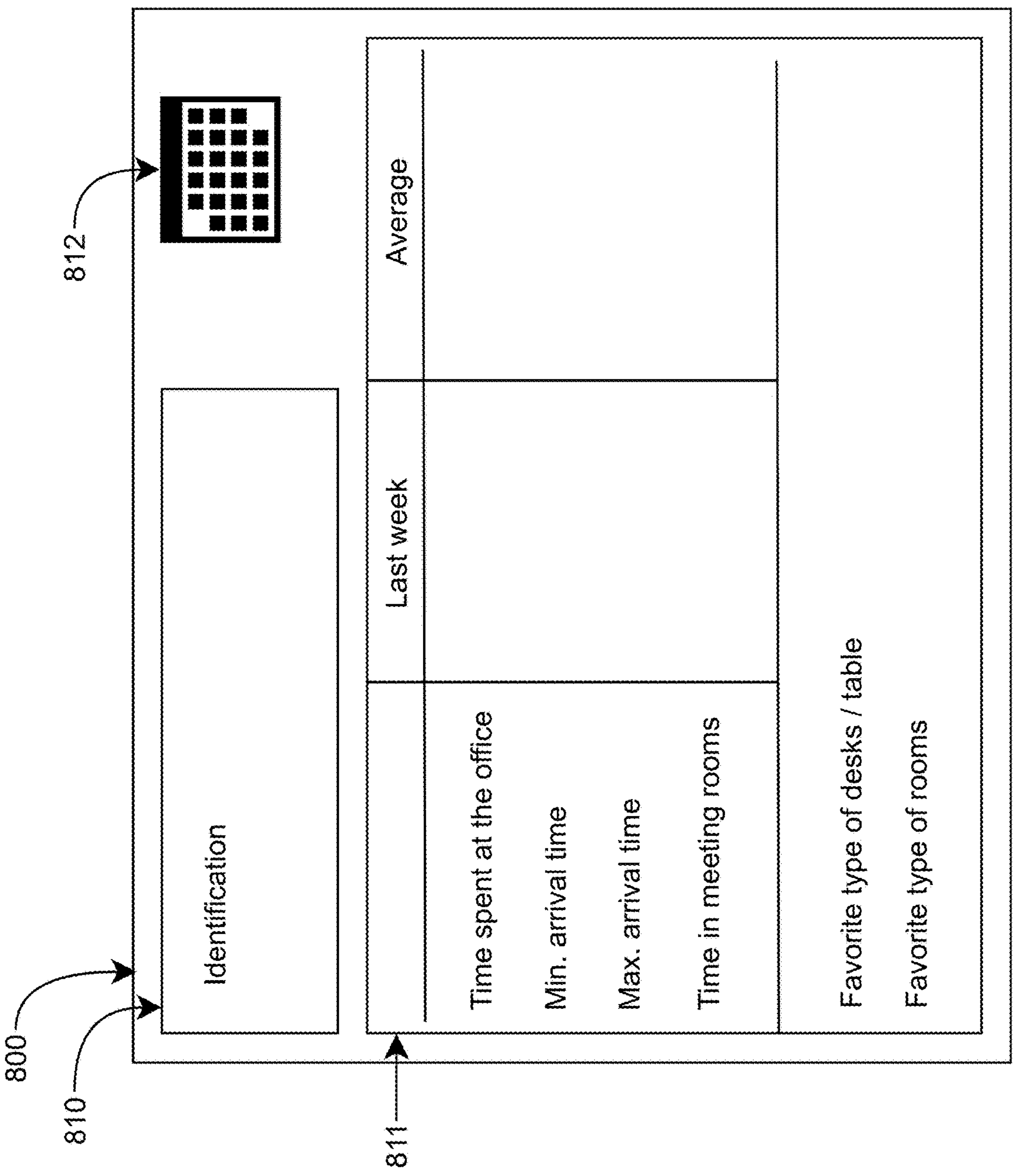
FIG. 8 is schematic illustration of yet another page or pane of the graphical user interface, according to a possible embodiment.

FIG. 8 shows an exemplary report on an employee that managers may consult and that contains processed or unprocessed data gathered using the system and methods described herein. The personal information user interface 800 may contain a section for the employee identification 810 and a section containing additional information on the employee 811. The information may for example be the time spent at the office during a given week, the earliest and latest time of the first connection every day of the week, the amount of time in meeting rooms, and much more. It may also contain the place where the employee is the most often. A calendar section 812 may also be used in the user interface to select custom periods of time for which the manager wants information on the employee.

Similar reports may also be generated on a larger group of people, for example all the employees that a manager manages, to get more general data on the group of people. Similar reports may also be generated for customers or groups of customers with similar demographic characteristics in other environments like coffee shops or restaurants.

The time of connection and disconnection can also be useful for time tracking and such information can be linked with other business-wise systems, such as human resources systems. For example, a specific meeting can have a given time code and by entering and quitting the charging zone of a wireless-power transmitter or the vicinity of a transmitter communication device during this meeting, the time log is automatically filled in the timesheet of the employee. Time logs for the beginning of the day and the end of the day can also be filled by using information generated by the methods described herein, such as associating the first time the portable device of a user enters a charging zone for a specific day as the beginning of the day, and the last time the portable device quits a charging zone as the end of the day. The user could, of course, correct possible errors, but this would give a first guideline to help make the timesheet.

Figure 9A:
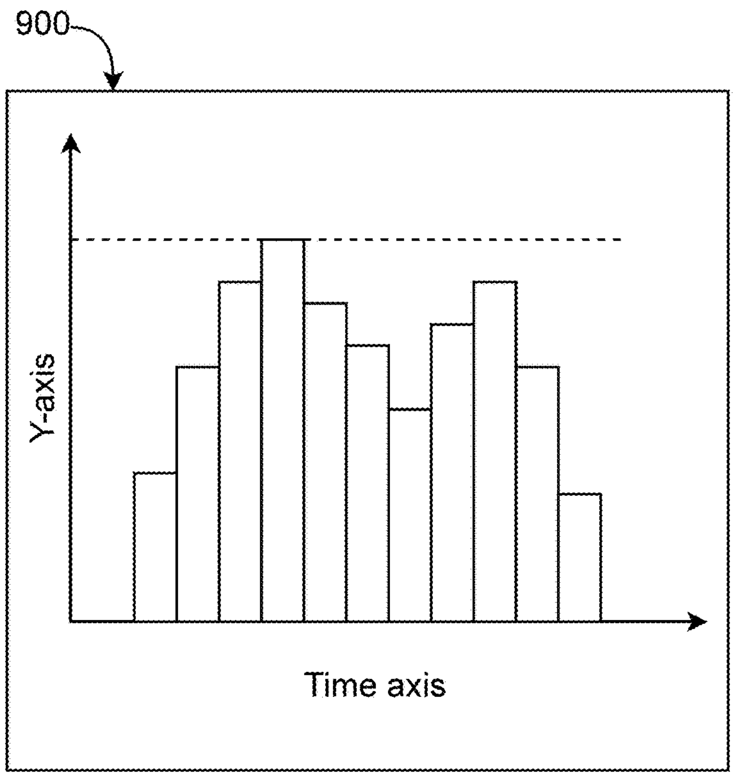
FIG. 9 is schematic illustration of possible reports or graphs using acquired data from the methods and systems described herein.
Figure 9B:
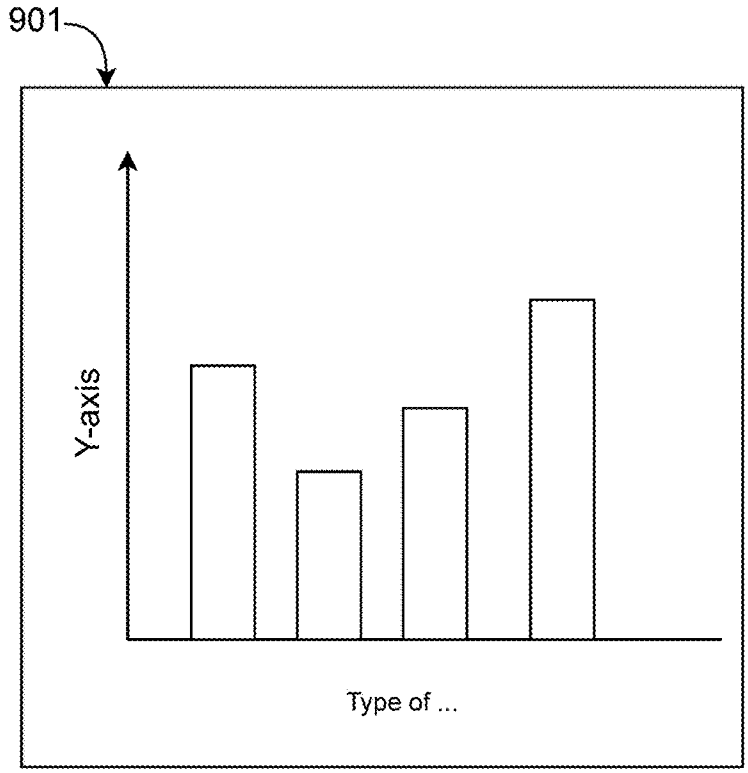

FIG. 9 shows other exemplary reports using the data from the connection and disconnection to transmitters in an environment. A first type of report is a time axis graph 900. In this type of graph, the X-axis/horizontal axis range and how to display it can be chosen by the manager depending on his/her need. For example, the X-axis can be separated into time intervals of a workday. The Y-axis/vertical axis may be the occupancy in terms of the number of people present or the percentage in comparison to maximal occupancy. It may also be the average time spent in the environment. Filters may also be applied for example to see only the meeting-room occupancy and not the whole workspace occupancy or only to a specific type of table, workstation, rooms or type of persons since the connection entries in the database also contain the person identification.

For example, a coffee shop manager may use a time axis graph 900 to identify which days of the week the occupancy is the highest to help with its work shift schedule or digital marketing campaign. Further analysis may use external data such as sales made for each of these days to draw better conclusions.

A second type of graph is a histogram 901 where the X-axis/horizontal axis contain types of a variable which we want to analyze. Depending on the environment to analyze, the X-axis may for example be types of tables, types of meeting rooms, types of desks, types of customers, the age of the persons, the department, etc. The Y-axis/vertical axis may be the occupancy in terms of the number of people present or the percentage in comparison to maximal occupancy, the average time spent in the environment, the average time of each connection, the favourite type of table, room, or desks. Not all the X-axis examples named here can be used with all the examples of Y-axis but are only provided as examples of the types of report that the data gathered from the system and methods could allow.

Bar graphs are shown in this figure, but other types of representation can obviously be used, such as tendency lines, pie charts and much more. Basically, any report that may help the managers take better decisions using the data gathered from the methods described in previous figures can be integrated in a software application module accessible by managers and other persons with permissions. The graph generation and consultation can be a part of the software application module, but only be accessible by authorized personnel.

Figure 10:
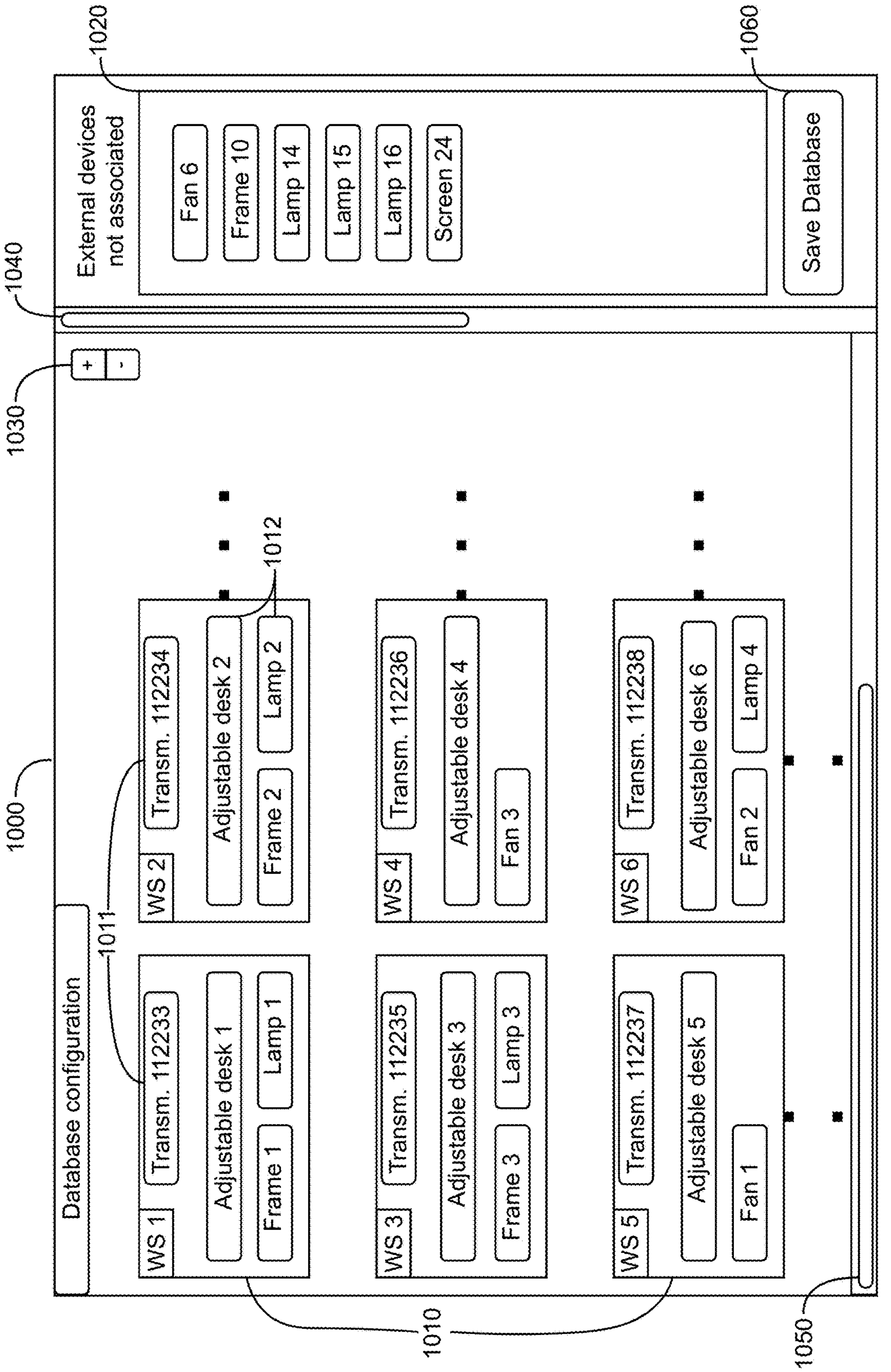
FIG. 10 is schematic illustration of yet another page or pane of the graphical user interface, according to a possible embodiment.

FIG. 10 shows a possible embodiment of another page or pane 1000 of the user interface allowing database configuration. Using the page 1000, a user may associate one or more external devices to one or more transmitters, which may be located at a same working station or table for example. This figure shows an exemplary way to do this, but various methods may be used. In FIG. 10, as an example, six different working station blocks 1010 and one or more associated transmitters 1011 are displayed. A certain number of external devices 1012 may also be associated with the working station and thus with the one or more transmitters. Peripheral devices may also be associated with the working stations using the same user interface.

The user may drag and drop transmitters 1011 and external devices 1012 from one working station to another. The external devices not-associated list 1020 may also be used to drag external devices not currently associated to any working station and drop them on a chosen working station.

Other features may be used to simplify visualization of the working station such as a zoom bar 1030, vertical slider 1040 and horizontal slider 1050. In some embodiments, the working station blocks 1010 may be placed in a way to represent the physical layout of an office or workplace. The working station block 1010 may also adjust in size in the user interface depending on the number of external devices 1012 and transmitter 1011 to display. Working stations may be places where people work, conference rooms or others, as examples.

A "Save Database" button 1060 may be used to manually update the database. In some embodiments, the button may be greyed out when no changes were made since the last save and become ungreyed out, or enabled, when changes are made. The user may click on it to save the changes to the database.

Figure 11:
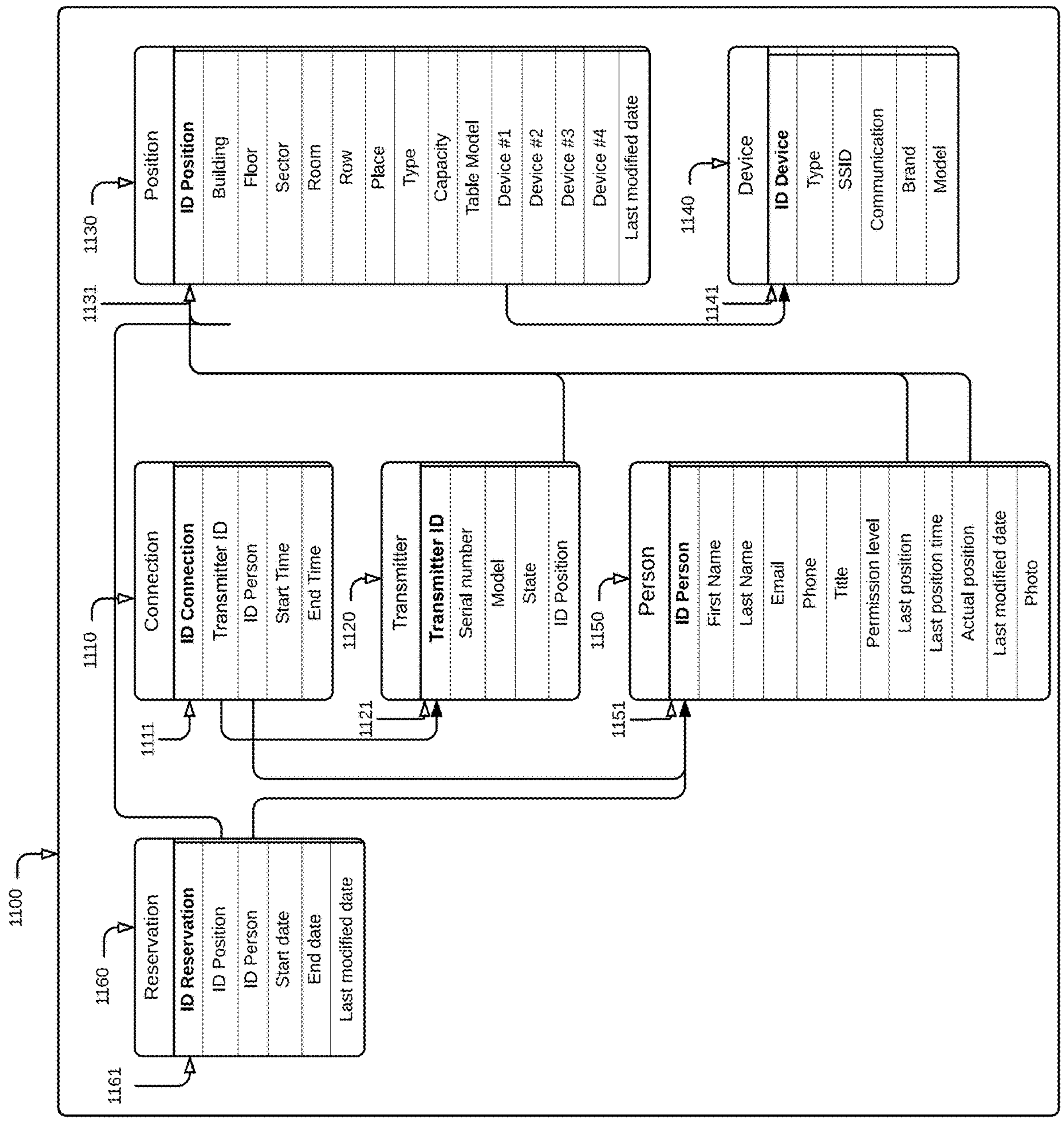
FIG. 11 is an organizational database diagram showing records and database tables containing data relating to users, external devices, interfacing devices and timestamps relating to the occupancy of a location within a venue, according to a possible embodiment.

FIG. 11 shows an exemplary structure of a database in order to provide the features described in this document. The portion of database 1100 shown may be included inside a larger database depending on the organization needs. Those skilled in the art will understand that there are many ways to build a database to produce the same outcome, so this specific embodiment is non-limiting to the scope of the present application. The portion of the database 1100 shown includes six entities which are the connection entity 1110 transmitter entity 1120, the position entity 1130, the device entity 1140, the person entity 1150 and the reservation entity 1160. The connection entity 1110 has a unique connection identifier 1111 (primary key). This unique identifier allows access to all the connection attributes such as the transmitter identification, the person identification, the start time and end time which is the time the portable device of the person enters and quits the charging or vicinity zone of the transmitter. The table associated with this entity is the one that will have a new entry every time someone enters a charging zone. These entries allow the real-time finding of colleagues or of places available to work. It will also allow various post-analysis and reports that managers may want to use to help their decisions.

The transmitter entity 1120 has a unique transmitter ID 1121. This unique identifier allows access to all transmitter attributes, for example the serial number of the transmitter, its model, its state of charge or power delivery, in the case of a wireless-power transmitter, and a unique identification of the position of the transmitter (ID Position). Other attributes may be included in this entity if needed.

The ID position identified from the transmitter entity 1120 is the unique identifier 1131 of the position entity 1130. When retrieving this ID position unique identifier 1131, all the attributes of the position entity can also be retrieved. The position attributes describe the physical location of the transmitter in a given space, such as an open-space working environment. For example, the attributes describe the position of a interfacing station, a workstation, a desk, a table or a specific place in a meeting room, including the building, floor, room, row, table and place at the table. Other combinations of attributes may be provided in other embodiments. The attributes of the position entity may also include unique identifier for all the external devices that are located at this position. For some more advanced analytics such as analysis on the favourite type of table or type of rooms, the database may also need to include some entities on these subjects.

The unique identifier for an external device 1141 retrieved can be used to retrieve additional information on the external device such as a device type and a communication protocol. The additional information can be found in the device entity 1140. The attributes of the external device entity may include the service set identifier (SSID) of the device or any identifier needed to connect the portable device to the external device. It may also be possible to use this identifier as the unique identifier of the external device in some embodiments comprising further database entities. The attributes of the device entity also include the type of communication to use, such as Wi-Fi, Bluetooth or any other communication protocol needed. Another attribute may be the type of device, for example an electrical desk, a lighting system, or visual and audio devices. Other attributes may include the brand and the model of the device.

The person entity 1150 has a unique person identifier 1151 which may be for example a numerical identifier or an e-mail address. Attributes may include the name of the person, his department, his title, permissions or access and where this person is actually connected. In a working environment, all the attributes shown may also be kept in a separate database since the organization may already have many of these information on its employees saved somewhere. User preferences may also be indicated in this entity or point to other entities that would allow to retrieve this information.

The reservation entity 1160 creates a unique reservation identifier 1161 every time someone makes a reservation in the software application module. Some attributes need to be saved for each reservation such as the position that the person reserved, the identification of the person, from when to when the person wants to reserve the place and the date of creation or modification of the reservation.

FIG. 11 further shows an exemplary embodiment of the process of retrieving additional information associated to the external device starting from the identification-related information of the transmitter, or its unique identifier (transmitter ID), and allowing to access the ID and communication type for all devices located at the workstation associated to the transmitter.

When a transmitter is moved at another position, the position attribute of the transmitter entity 1120 should be updated. When devices are moved to a new position, the device identification will be added to the unique position identifier 1131 line in the position entity 1130 and erased from the old unique position identifier if it was already in the database.

The present application provides an advantage of using out-of-band communication, for example Bluetooth® Low Energy, for wireless communication between wireless-power transmitters and wireless-power receivers, thus allowing for charging multiple devices simultaneously using a single wireless-power transmitter while allowing for communication between the wireless-power transmitters and receivers, conversely to in-band communication which only allows for communicating with one receiver at a time. Further, out-of-band communication avoids needing means for creating modulation on the power signal, thereby simplifying the design and various compliance certification processes.

Further, the architecture of the present system and methods avoids having to provide major updates to the wireless-power transmitters and receivers. Only the portable device needs to be updated or changed to work with new communication protocols, for example. This provides an advantage of avoiding updates over-the-air for wireless-power transmitters and wireless-power receivers to be compatible with new communication protocols which can create some cybersecurity issues in a working space or require a lot of efforts to reinforce cybersecurity.

Another advantage over prior art for the localization of people is the identification of the person. Some methods such as sensors installed in office chairs allow to know the occupancy of some space, but do not allow to identify who is where. Also, chairs are more easily moved for one place to another than wireless-power transmitters fixed under working station and can therefore be inadvertently moved into another location, giving false information regarding occupancy of a desk/room. Furthermore, the system and methods described herein do not necessitate additional devices connecting to the wireless network (Wi-Fi) since laptops are used for this purpose. Other methods may need to have each device or sensor connected to a local network.

Also, the hardware combined with a software application module and a database as described herein advantageously allows for large data collection and user/organization personalization for the interaction with external devices.

While the above description provides examples of the embodiments, it will be appreciated that some features and/or functions of the described embodiments are susceptible to modification without departing from the principles of the operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A system for wirelessly locating a plurality of users in a venue via their respective portable device, the system comprising:

- a plurality of wireless transmitter devices positioned at different locations in the venue, each configured to transmit at least a corresponding identifier at a set frequency;
- a database accessible by each of the portable devices; and
- a software application module, each portable device being configured to execute the software application module, the software application comprising:
  - a transmitter detection submodule configured to detect identifiers broadcast by nearby wireless transmitter devices by the portable device and measure a signal strength associated with each broadcast during at least one time period, and
  - a transmitter selection submodule configured to select a closest wireless transmitter device among the nearby wireless transmitter devices by computing an indication of the strongest signal received from the nearby wireless transmitter devices for each time period and, in response to one of the nearby wireless transmitter devices having the strongest average signal over at least one of the time periods, to select the one nearby wireless transmitter as the closest wireless transmitter device.

2. The system of claim 1, comprising at least one external device associated with a corresponding wireless transmitter device, the software application module comprising an external device control submodule configured to connect to the at least one external device associated with the closest wireless transmitter device.

3. The system of claim 2, comprising at least one gateway configured to receive instructions for an external device from the external device control submodule, to translate the instructions to a wireless communication protocol supported by the external device, and to transmit the translated instructions to the external device.

4. The system of claim 2, wherein the database is configured to store user preferences associated with the user, the external device control submodule being further configured, in response to the closest wireless transmitter device being selected, to adjust settings of each external device associated with the closest wireless transmitter device according to the user preferences.

5. The system of claim 1, wherein the transmitter selection submodule is configured to select one of the nearby wireless transmitter devices having the strongest average signal over at least a configurable proportion of the time periods.

6. The system of claim 1, wherein the transmitter selection submodule is configured to avoid selecting the nearby wireless transmitter devices having the signal strength below a minimal configurable strength threshold.

7. The system of claim 1, wherein the transmitter detection submodule is configured to determine, from the set frequency and the detected broadcasts, a number of broadcasts that were undetected and, in response to the number of undetected broadcasts being above a configurable threshold, to increase a duration of each time period.

8. The system of claim 1, wherein the software application further comprises a registration submodule, wherein the transmitter detection submodule is configured to continuously detect the nearby wireless transmitter devices and wherein, in response to a new transmitter device being the closest, the transmitter selection submodule is configured to select the new closest wireless transmitter device and the registration submodule is configured to store at least one of the identifier corresponding to the new closest wireless transmitter device and a new arrival timestamp in the database.

9. The system of claim 8, the software application module comprising a centralized control module configured to perform at least one function selected from the group consisting of:

processing a reservation of one of the locations within the venue;

displaying usage statistics about the venue;

displaying usage statistics about one of the portable devices;

displaying usage statistics about a group of the portable devices; and displaying a location within the venue of the portable devices in real-time.

10. A system for wirelessly locating a plurality of users in a venue via their respective portable device, the system comprising:

a plurality of wireless transmitter devices positioned at different locations in the venue, each configured to transmit at least a corresponding identifier;

a database accessible by each of the portable devices;

a software application module, each portable device being configured to execute the software application module, the software application comprising:

a transmitter detection submodule configured to detect nearby wireless transmitter devices by the portable device, and a transmitter selection submodule configured to select a closest wireless transmitter device among the nearby wireless transmitter devices;

a plurality of wireless interfacing devices, each wireless interfacing device comprising:

one of the wireless transmitter devices;

a wireless power transmission module having a power-transmitting antenna configured for wirelessly emitting a power signal; and wherein at least some of the portable devices are each operably coupled with a wireless power receiving module having a power-receiving antenna for:

detecting the power signals, the wireless power receiving module implementing the transmitter detection submodule, and initiating communication between the receiving module and the wireless interfacing device, and receiving the power signal emitted from the wireless power transmission module to power the portable device.

11. The system of claim 10, wherein a given one of the wireless interfacing devices is configured to pair with any one of the portable devices, wherein:

the wireless power transmission module of the wireless interfacing device is configured to send one or more power beacons;

the wireless power receiving module coupled to the portable device is configured to broadcast advertisement signals in response to said one or more power beacons to pair the portable device with the wireless interfacing device;

the wireless transmitter device of the wireless interfacing device is configured to transmit the corresponding identifier to the coupled portable device in response to a validation of the pairing; and the transmitter selection submodule is configured to select the wireless interfacing device as the closest wireless transmitter in response to the coupled portable device receiving the identifier.

12. The system of claim 11, wherein at least one of the wireless interfacing devices and the transmitter selection submodule is configured to measure at least one time difference between:

a moment when one of the wireless interfacing devices detects at least one event; and a moment when a corresponding portable device detects the at least one event, the pairing between the wireless interfacing devices and the corresponding portable device being validated in response to at least one condition being verified, the condition being selected from the group consisting of:

a first configurable proportion of the time differences are below a threshold; and a second configurable proportion of the time differences with respect to the one of the wireless interfacing devices are lower than the corresponding time difference with respect to other wireless interfacing devices.

13. The system of claim 11, wherein:

at least one of the plurality of the wireless interfacing devices and the portable device is configured to measure at least one of a time difference between one of the power beacons and one of the advertisement signals, a time difference between a power increase of the wireless power transfer compatible with charging the portable device and the power transfer to the portable device, and a signal strength of a signal received from the other device;

each of the wireless interfacing devices is configured to transmit, by the wireless transmitter device, the at least one time difference and the signal strength to at least one of the portable device and each of the other wireless interfacing devices;

at least one of each of the wireless interfacing devices and the portable device is configured to receive, from the wireless transmitter device, the at least one time difference and the signal strength from each of the other wireless interfacing devices;

at least one of the transmitter selection submodule of the portable device and one or more of the wireless interfacing devices is configured to compute a location of the wireless power receiving module within the venue by triangulation and to determine a closest wireless interfacing device; and a pairing between the portable device and the closest wireless interfacing device is validated and pairings between the portable device and each of the other wireless interfacing devices are invalidated.

14. The system of claim 11, wherein the pairing is validated in response to an impedance change being measured at the power-transmitting antenna.

15. The system of claim 11, wherein the pairing is validated in response to a match of at least one of a signal strength of the advertisement signals, a power sent by a communication module of the wireless power receiving module, and a gain of the power-receiving antenna, and/or wherein the pairing is validated in response to the signal strength of the advertisement signals received by the wireless interfacing device being at least one of above an advertisement signal strength threshold and stronger than a signal strength of the advertisement signals received by the other wireless interfacing devices.

16. The system of claim 11, wherein the wireless power transmission module is configured to vary a power parameter and the wireless power receiving module is configured to detect the variation, wherein the validated pairing is confirmed in response to the variation being detected by the power receiving module.

17. The system of any one of claim 11, wherein the validated pairing is confirmed in response to a power efficiency measure of the power transfer is within a configurable range.

18. A method for wirelessly locating a plurality of users in a venue via their respective portable device, the method comprising:

transmitting, by each of a plurality of wireless transmitter devices positioned at different locations in the venue, a corresponding identifier at a set frequency;

detecting, by each portable device, identifiers broadcast by nearby wireless transmitter devices and measuring a signal strength associated with each broadcast during at least one time period;

computing, by each portable device, an indication of the strongest signal received from the nearby wireless transmitter devices for each time period;

in response to one of the nearby wireless transmitter devices having the strongest average signal over at least one of the time periods, selecting, by each portable device, said one nearby wireless transmitter as a closest wireless transmitter device among the nearby wireless transmitter devices; and storing at least one of the identifier corresponding to the closest wireless transmitter device selected by each portable device and an arrival timestamp in a database.

19. The method of claim 18, wherein each portable device is connecting to at least one external device associated with the closest wireless transmitter device.

20. The method of claim 19, comprising sending by a portable device instructions for an external device to at least one gateway, translating by one of the gateways the instructions to a wireless communication protocol supported by the external device, and transmitting by the at least one gateway the translated instructions to the external device.

21. The method of claim 19, wherein the database is configured to store user preferences associated with the user, comprising for each portable device, in response to the closest wireless transmitter device being selected, adjusting settings of each external device associated with the closest wireless transmitter device according to the user preferences.

22. The method of claim 18, wherein selecting the closest wireless transmitter device comprises selecting the one of the nearby wireless transmitter devices having the strongest average signal over at least a configurable proportion of the time periods.

23. The method of claim 18, comprising avoiding selecting the nearby wireless transmitter devices having the signal strength below a minimal configurable strength threshold.

24. The method of claim 18, comprising determining, by one of the portable devices, from the set frequency and the detected broadcasts, a number of broadcasts that were undetected and, in response to the number of undetected broadcasts being above a configurable threshold, increasing a duration of each time period.

25. The method of claim 18, comprising continuously detecting the nearby wireless transmitter devices and, in response to a new transmitter device being the closest, storing at least one of the identifier corresponding to the new closest wireless transmitter device and a new arrival timestamp in the database.

26. The method of claim 25, comprising detecting an absence of nearby wireless transmitter devices and storing at least one an indication that the user has left the venue in the database and a departing timestamp.

27. The method of claim 25, further comprising identifying, by each portable device, the user using the portable device, wherein the database is an organizational database, comprising transmitting by one of the portable devices at least the identifier corresponding to the closest wireless transmitter device and at least one of an identifier corresponding to the portable device and an identifier corresponding to the user to the organizational database, and storing by the database at least one of the transmitted identifiers and the arrival timestamp.

28. The method of claim 27, comprising transmitting by each of the portable devices a keepalive message to the database on a regular basis and, in response to a configurable number of keepalive messages being missed, storing by the database at least one of an indication that the user has closed the portable device and a closing timestamp.

29. The method of claim 27, comprising performing at least one function selected from the group consisting of:

displaying, in a graphical user interface, respective positions within the venue of at least some of the users, based on the closest wireless transmitter device selected by the portable device of each user; and performing at least one function selected from the group consisting of:

processing a reservation of one of the locations within the venue, displaying usage statistics about the venue, displaying usage statistics about one of the users, displaying usage statistics about a group of the users, displaying usage statistics about one of the portable devices, displaying usage statistics about a group of the portable devices, and displaying a location within the venue of a plurality of users in real-time.

30. The method of claim 29, wherein at least one of the usage statistics is computed from identifiers and timestamps stored in the database with respect to a specifiable time interval, and wherein the usage statistics about the venue comprise an occupancy rate of a plurality of venue locations and the usage statistics about at least the one of the users, the group of users, the one of the portable devices and the group of portable devices comprise at least one of an indication of time spent at the venue, a minimal arrival time, a maximal arrival time, a minimal departure time, a maximal departure time, an indication of time spent in meeting rooms, an indication of a preferred location within the venue, an indication of a preferred type of desk, and an indication of a preferred type of room.

31. A method for wirelessly locating a plurality of users in a venue via their respective portable device, the method comprising:

transmitting, by each of a plurality of wireless transmitter devices positioned at different locations in the venue, a corresponding identifier;

detecting, by each portable device, nearby wireless transmitter devices;

selecting, by each portable device, a closest wireless transmitter device among nearby wireless transmitter devices;

storing at least one of the identifier corresponding to the closest wireless transmitter device selected by each portable device and an arrival timestamp in a database;

wirelessly emitting a power signal, by a power-transmitting antenna of a plurality of wireless interfacing devices, wherein each wireless interfacing device comprises one of the wireless transmitter devices;

detecting the power signal, by a power-receiving antenna of a wireless power receiving module operably coupled to each of at least some of the portable devices; and transferring the power from the power signal to the portable device to power the portable device.

32. The method of claim 31, comprising pairing, by each of at least some of the wireless interfacing devices, with one of the portable devices, the pairing comprising:

sending, by the power-transmitting antenna of the wireless interfacing device, one or more power beacons;

broadcasting, by the wireless power receiving module, advertisement signals in response to said one or more power beacons to pair the wireless interfacing device with the portable device coupled with the wireless power receiving module;

transmitting, by the wireless interfacing device, the corresponding identifier to the coupled portable device in response to a validation of the pairing; and selecting, by the portable device, the wireless interfacing device as the closest wireless transmitter in response to the coupled portable device receiving the identifier.

33. The method of claim 32, comprising measuring, by at least one of the wireless interfacing devices and the portable devices, at least one time difference between:

a moment when one of the wireless interfacing devices detects at least one event; and a moment when a corresponding portable device detects the at least one event, the pairing between the wireless interfacing devices and the corresponding portable device being validated in response to at least one condition being verified, the condition being selected from the group consisting of:

a first configurable proportion of the time differences are below a threshold; and a second configurable proportion of the time differences with respect to the one of the wireless interfacing devices are lower than the corresponding time difference with respect to other wireless interfacing devices.

34. The method of claim 32, comprising:

measuring, by at least one of the plurality of the wireless interfacing devices and the portable device, at least one of a time difference between one of the power beacons and one of the advertisement signals, a time difference between a power increase of the wireless power transfer compatible with charging the portable device and the power transfer to the portable device, and a signal strength of a signal received from the other device;

transmitting, by the wireless transmitter device of each of the wireless interfacing devices, the at least one time difference and the signal strength to at least one of the portable device and each of the other wireless interfacing devices;

receiving, at least one of each of the wireless interfacing devices and the portable device, from the wireless transmitter device, the at least one time difference and the signal strength from each of the other wireless interfacing devices;

computing, by the portable device and one or more of the wireless interfacing devices, a location of the wireless power receiving module within the venue by triangulation and to determine a closest wireless interfacing device; and validating a pairing between the portable device and the closest wireless interfacing device and invalidating pairings between the portable device and each of the other wireless interfacing devices.

35. The method of claim 32, comprising validating the pairing in response to an impedance change being measures at the power-transmitting antenna.

36. The method of claim 32, comprising validating the pairing in response to:

a match of at least one of a signal strength of the advertisement signals, a power sent by a communication module of the wireless power receiving module, and a gain of the power-receiving antenna; and/or the signal strength of the advertisement signals received by the wireless interfacing device being at least one of above an advertisement signal strength threshold and stronger than a signal strength of the advertisement signals received by the other wireless interfacing devices.

37. The method of claim 32, comprising varying a power parameter by the wireless interfacing devices, detecting the variation by the wireless power receiving module, and confirming the validated pairing in response to the variation being detected by the power receiving module.

38. The method of claim 32, comprising confirming the validated pairing in response to a power efficiency measure of the power transfer being within a configurable range.

39. A system for wirelessly locating a plurality of users in a venue via their respective portable device, the system comprising:

a plurality of wireless transmitter devices positioned at different locations in the venue, each configured to transmit at least a corresponding identifier;

a database accessible by each of the portable devices and configured to store user preferences;

at least one external device associated with a corresponding wireless transmitter device;

a software application module, each portable device being configured to execute the software application module, the software application comprising:

a transmitter detection submodule configured to detect nearby wireless transmitter devices by the portable device, a transmitter selection submodule configured to select a closest wireless transmitter device among the nearby wireless transmitter devices, and an external device control submodule configured to connect to the at least one external device associated with the closest wireless transmitter device and, in response to the closest wireless transmitter device being selected, to adjust settings of each external device associated with the closest wireless transmitter device according to the user preferences.

40. A method for wirelessly locating a plurality of users in a venue via their respective portable device, the method comprising:

transmitting, by each of a plurality of wireless transmitter devices positioned at different locations in the venue, a corresponding identifier;

detecting, by each portable device, nearby wireless transmitter devices;

selecting, by each portable device, a closest wireless transmitter device among nearby wireless transmitter devices;

connecting, by each portable device, to at least one external device associated with the closest wireless transmitter device;

storing at least one of the identifier corresponding to the closest wireless transmitter device selected by each portable device and an arrival timestamp in a database, wherein the database is configured to store user preferences associated with the user; and adjusting settings of each external device associated with the closest wireless transmitter device according to the user preferences.

* * * * *